US011428886B2

(12) United States Patent
Cams et al.

(10) Patent No.: US 11,428,886 B2
(45) Date of Patent: Aug. 30, 2022

(54) MOUNTING BRACKET SYSTEM FOR TELECOMMUNICATIONS EQUIPMENT

(71) Applicant: COMMSCOPE TECHNOLOGIES LLC, Hickory, NC (US)

(72) Inventors: Eddy Luc Cams, Bilzen (BE); Erik David Bishop, Fuquay-Varina, NC (US); Alan Armando Garcia Gonzalez, Chihuahua (MX); Roel Modest Willy Bryon, Kessel-Lo (BE)

(73) Assignee: COMMSCOPE TECHNOLOGIES, INC., Hickory, NC (US)

( * ) Notice: Subject to any disclaimer, the term of this patent is extended or adjusted under 35 U.S.C. 154(b) by 0 days.

(21) Appl. No.: 17/050,210

(22) PCT Filed: Apr. 19, 2019

(86) PCT No.: PCT/US2019/028252
§ 371 (c)(1),
(2) Date: Oct. 23, 2020

(87) PCT Pub. No.: WO2019/209645
PCT Pub. Date: Oct. 31, 2019

(65) Prior Publication Data
US 2021/0103111 A1 Apr. 8, 2021

Related U.S. Application Data

(60) Provisional application No. 62/807,008, filed on Feb. 18, 2019, provisional application No. 62/747,731, (Continued)

(51) Int. Cl.
*G02B 6/44* (2006.01)
*H02G 3/10* (2006.01)
*G02B 6/48* (2006.01)

(52) U.S. Cl.
CPC ............. *G02B 6/4446* (2013.01); *H02G 3/10* (2013.01); *G02B 6/4452* (2013.01); *G02B 6/4458* (2013.01); *G02B 6/483* (2013.01)

(58) Field of Classification Search
None
See application file for complete search history.

(56) References Cited

U.S. PATENT DOCUMENTS 4,922,056 A 5/1990 Larsson
5,495,549 A 2/1996 Schneider et al.
(Continued)

FOREIGN PATENT DOCUMENTS

CN 204928011 U 12/2015
CN 105929511 A 9/2016
(Continued)

OTHER PUBLICATIONS

International Search Report and Written Opinion of the International Searching Authority for International Patent Application No. PCT/US2019/028252 dated Aug. 9, 2019, 13 pages.
(Continued)

*Primary Examiner* — Michael Stahl
(74) *Attorney, Agent, or Firm* — Merchant & Gould P.C.

(57) ABSTRACT

A fiber optic system includes an enclosure and a mounting bracket that cooperate to define a mechanical coupling interface including a slide interface and a snap-fit interface. The slide interface allows the enclosure to mount to the bracket along a first dimension and retains the enclosure at the bracket along second and third dimensions that are transverse to the first dimension and transverse to each other. The snap-fit interface, once triggered, retains the enclosure at the bracket alone the first dimension.

9 Claims, 45 Drawing Sheets

Related U.S. Application Data filed on Oct. 19, 2018, provisional application No. 62/683,962, filed on Jun. 12, 2018, provisional application No. 62/661,351, filed on Apr. 23, 2018.

(56) References Cited

U.S. PATENT DOCUMENTS

| | | | |
|---|---|---|---|
| 6,135,624 | A | 10/2000 | Masters et al. |
| 7,038,127 | B2 * | 5/2006 | Harwood ............... H05K 7/186 174/37 |
| 7,477,824 | B2 | 1/2009 | Reagan et al. |
| 7,558,458 | B2 | 7/2009 | Gronvall et al. |
| 7,627,222 | B2 | 12/2009 | Reagan et al. |
| 7,680,388 | B2 | 3/2010 | Reagan et al. |
| 7,844,160 | B2 | 11/2010 | Reagan et al. |
| 2006/0291144 | A1 * | 12/2006 | Verding ............... H04Q 1/13 361/600 |
| 2008/0050085 | A1 | 2/2008 | Tinucci |
| 2008/0224006 | A1 | 9/2008 | Call et al. |
| 2008/0292261 | A1 | 11/2008 | Kowalczyk et al. |
| 2009/0238531 | A1 | 9/2009 | Holmberg et al. |
| 2010/0006723 | A1 | 1/2010 | Yan |
| 2010/0027954 | A1 | 2/2010 | Gronvall et al. |
| 2010/0189404 | A1 | 7/2010 | Rudenick et al. |
| 2011/0103760 | A1 * | 5/2011 | Cote ................... G02B 6/4452 385/135 |
| 2011/0123166 | A1 | 5/2011 | Reagan et al. |
| 2019/0248617 | A1 | 8/2019 | Kiziah |

FOREIGN PATENT DOCUMENTS

| | | |
|---|---|---|
| EP | 0932260 A1 * | 7/1999 |
| KR | 2020100001584 U | 2/2010 |
| KR | 200455528 Y1 | 9/2011 |
| WO | 2010/062626 A1 | 6/2010 |
| WO | 2019209645 A1 | 10/2019 |

OTHER PUBLICATIONS

Photo showing admitted prior art as of Apr. 23, 2018, 1 page.
European Search Report, EP Application No. 19792993.8, dated Dec. 21, 2021, 16 pages.
Extended European Search Report for European Patent Application No. 19792993.8 dated Apr. 20, 2022, 15 pages.

* cited by examiner

MOUNTING BRACKET SYSTEM FOR TELECOMMUNICATIONS EQUIPMENT

CROSS-REFERENCE TO RELATED APPLICATIONS

This application is a National Stage Application of PCT/US2019/028252, filed Apr. 19, 2019, which claims the benefit of U.S. Patent Application Ser. No. 62/661,351, filed Apr. 23, 2018, and claims the benefit of U.S. Patent Application Ser. No. 62/683,962, filed Jun. 12, 2018, and claims the benefit of U.S. Patent Application Ser. No. 62/747,731, filed Oct. 19, 2018, and claims the benefit of U.S. Patent Application Ser. No. 62/807,008, filed Feb. 18, 2019, the disclosures of which are incorporated herein by reference in their entireties. To the extent appropriate, a claim of priority is made to each of the above disclosed applications.

TECHNICAL FIELD

The present disclosure relates generally to a mounting bracket system. More particularly, the present disclosure relates to a mounting bracket system for an environmentally sealed telecommunications enclosure.

BACKGROUND

Fiber optic communication systems allow service providers to deliver high bandwidth communication capabilities (e.g., data and voice) to customers. Fiber optic communication systems employ a distribution network of fiber optic cables to transmit large volumes of data and voice signals over relatively long distances. A drop cable is typically the last leg of the distribution network before reaching an end subscriber. Typically, a drop cable is run from a drop terminal before reaching an end subscriber location such as a house, apartment, office, place of business, and the like.

Drop terminals can be mounted on a variety of different structures. For example, drop terminals can be mounted to an outside wall of a building, an overhead cable, a pole, or inside an underground hand hole box. Often, drop terminals are mounted using fasteners that extend through the housing of the terminal. This may involve the use of tools such as hammers that can damage the drop terminal. If the drop terminal is cracked, water may enter the terminal and damage the fiber optic cables inside.

A mounting bracket can be used to mount a drop terminal to a structure. However, mounting brackets are often not suitable for a broad range of drop terminal sizes.

When a drop terminal is mounted to an overhead cable, it may be desirable to adjust a distance between the drop terminal and the overhead cable to improve access and ventilation of the drop terminal so that the drop terminal does not overheat.

Furthermore, it may sometimes be necessary to store excess fiber optic cable at the site of the drop terminal. However, there is often no space for storing or holding excess fiber optic drop cable at the location of the drop terminal.

Therefore, improvements are needed for a mounting bracket arrangement that can accommodate various drop terminal sizes, that can adjust a distance between a drop terminal and an overhead cable when the drop terminal is mounted to the overhead cable, and that can provide storage for excess drop cable in an efficient and safe manner.

SUMMARY

The disclosed technology relates to a fiber optic system that includes a telecommunications enclosure having a cover removably attachable to a base, the base having a first mechanical interface, and a mounting bracket arrangement detachably mountable to the telecommunications enclosure.

In one aspect, a fiber optic system comprises a mounting bracket having a length and a width, the length being larger than the width, the mounting bracket having a first mechanical interface including a first part of a slide interface and a first part of a snap-fit interface; a telecommunications enclosure having a second mechanical interface detachably mountable to the first mechanical interface, the second mechanical interface including a second part of the slide interface and a second part of the snap-fit interface; the first and second mechanical interfaces enabling the telecommunications enclosure to mount to the mounting bracket selectively in a first orientation relative to the mounting bracket and in a second orientation relative to the mounting bracket.

In another aspect, a fiber optic system comprises a telecommunications enclosure having a cover removably attachable to a base, the base having a first mechanical interface; and a mounting bracket arrangement detachably mountable to the telecommunications enclosure, the mounting bracket arrangement including: a main bracket including a second mechanical interface that is mateable with the first mechanical interface, the main bracket defining fastener openings for mounting the main bracket to a structure in the field; an aerial strand mount unit detachably mountable to the main bracket, the aerial strand mount unit including a first strand mount arm and a second strand mount arm, the first and second strand mount arms each project outwardly from the main bracket when the aerial stand mount unit is mounted to the main bracket, the first and second strand mount arms each include a stand clamp; and a cable storage unit detachably mountable to the main bracket, the cable storage unit including a plurality of cable management arms, each cable management arm projects outwardly from the main bracket when the cable storage unit is mounted to the main bracket, and each cable management arm includes a cable support for storing excess cable in a coiled configuration about the cable storage unit.

BRIEF DESCRIPTION OF THE DRAWINGS

FIG. 11 is a schematic diagram illustrating various structures to which the fiber optic system of FIG. 1 can be mounted to.

DETAILED DESCRIPTION

Figure 1:
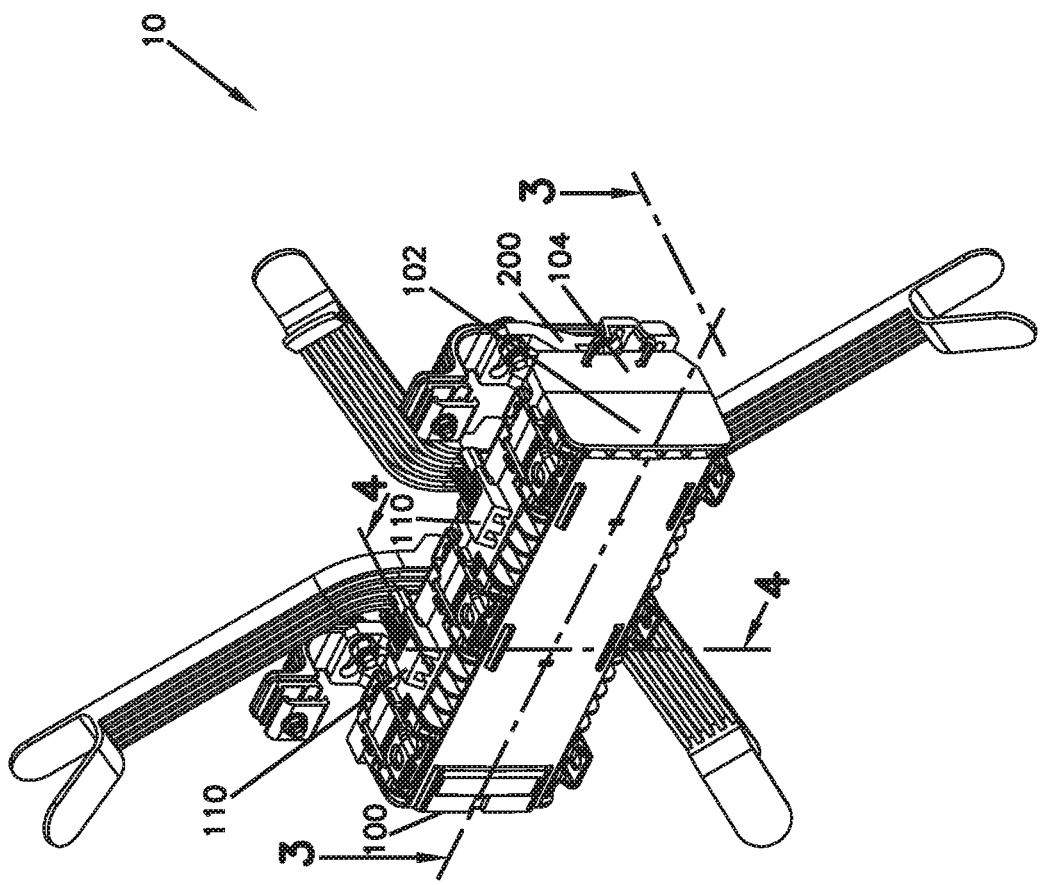
FIG. 1 is a front isometric view of a fiber optic system shown in a horizontal orientation in accordance with a first example of the present disclosure.
Figure 2:
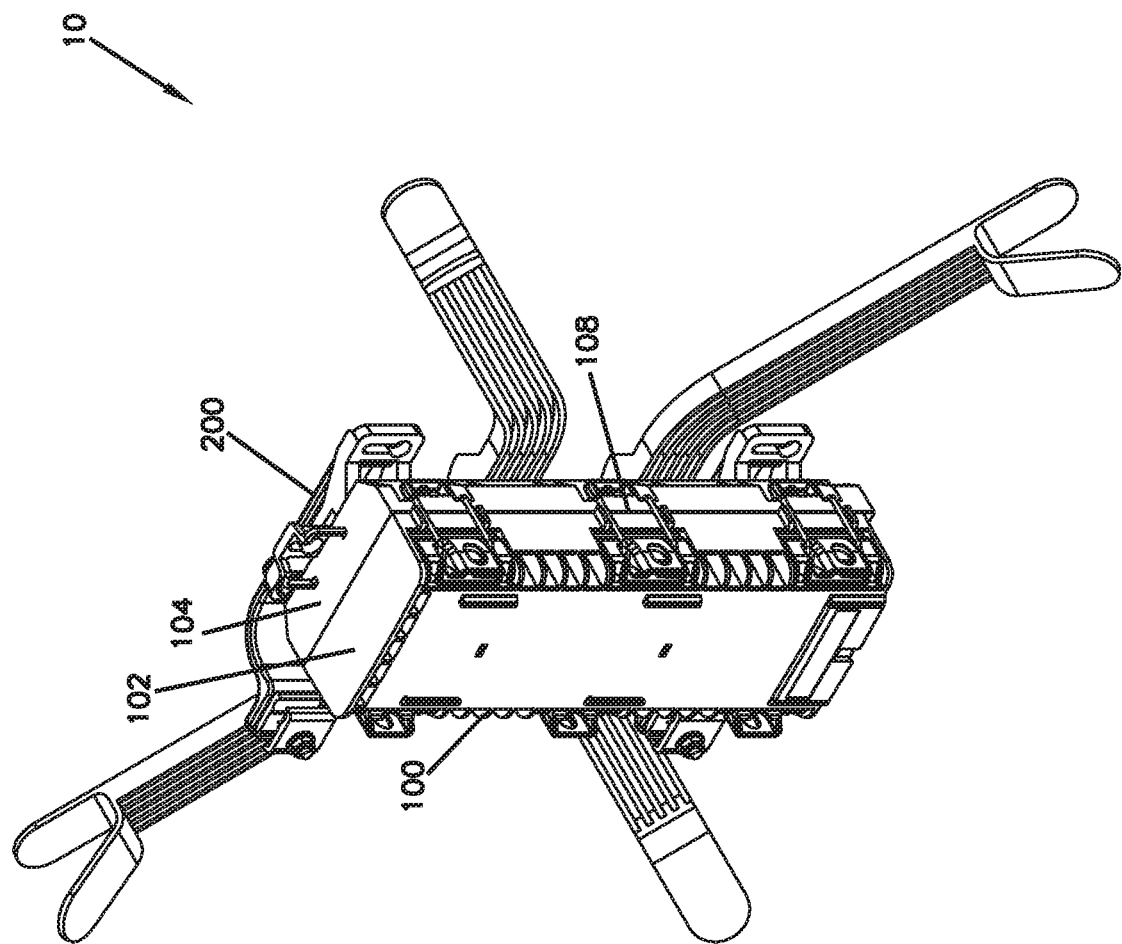
FIG. 2 is a front isometric view of the fiber optic system of FIG. 1, the fiber optic system is shown in a vertical orientation.

FIGS. 1 and 2 show front isometric views of a fiber optic system 10 in accordance with a first example of the present disclosure. In FIG. 1, the fiber optic system 10 is shown in a horizontal orientation. In FIG. 2, the fiber optic system 10 is shown in a vertical orientation. The fiber optic system 10 may be mounted to a structure in the field in either the horizontal orientation or the vertical orientation, as will be described in more detail. As shown in FIGS. 1 and 2, the fiber optic system 10 includes a telecommunications enclosure 100 and a mounting bracket arrangement 200. In certain examples, the telecommunications enclosure 100 is a drop terminal.

Figure 3:
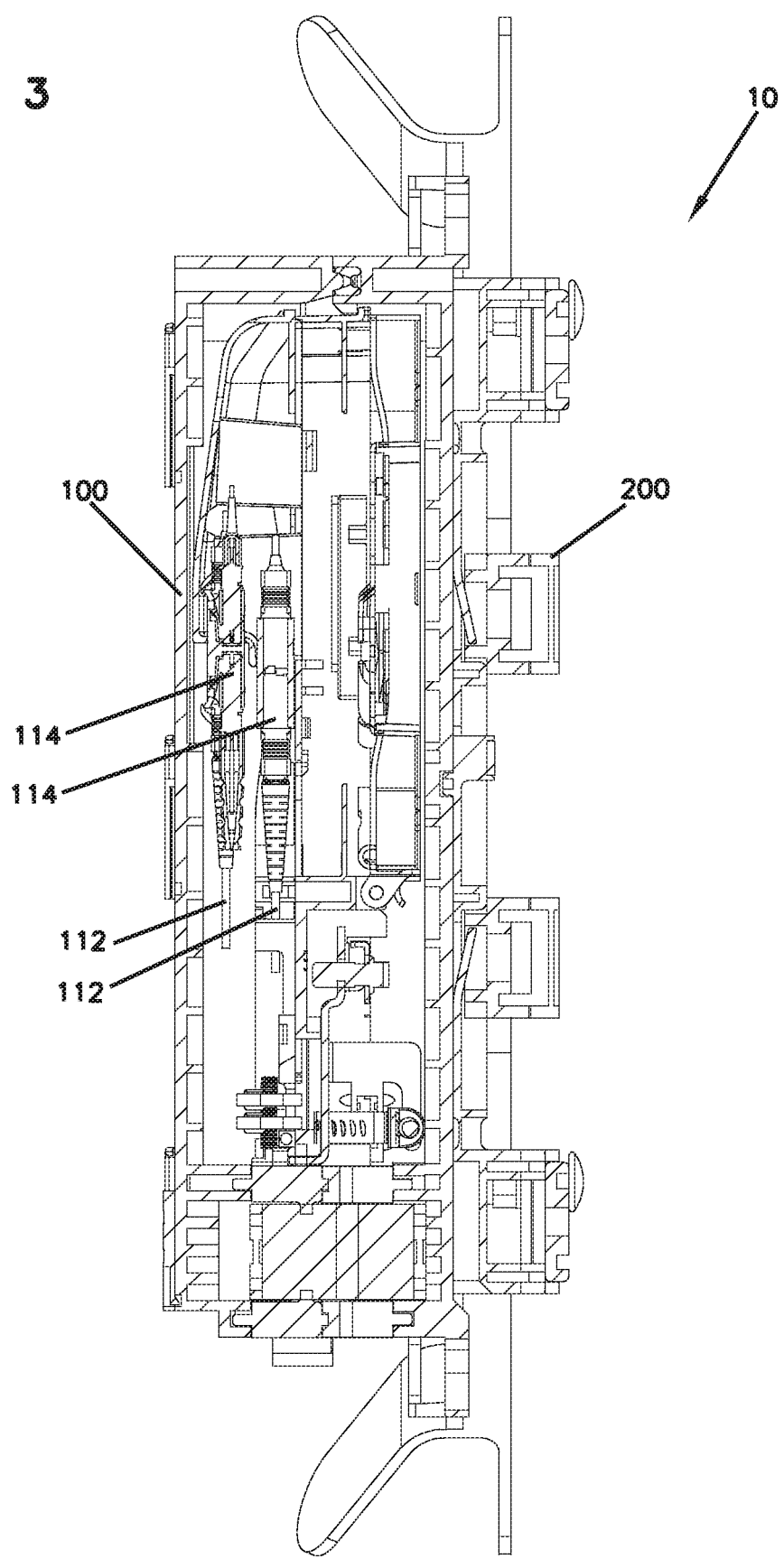
FIG. 3 is a cross-sectional view taken along section line 3-3 of FIG. 1 showing internal components of the fiber optic system of FIG. 1.
Figure 4:
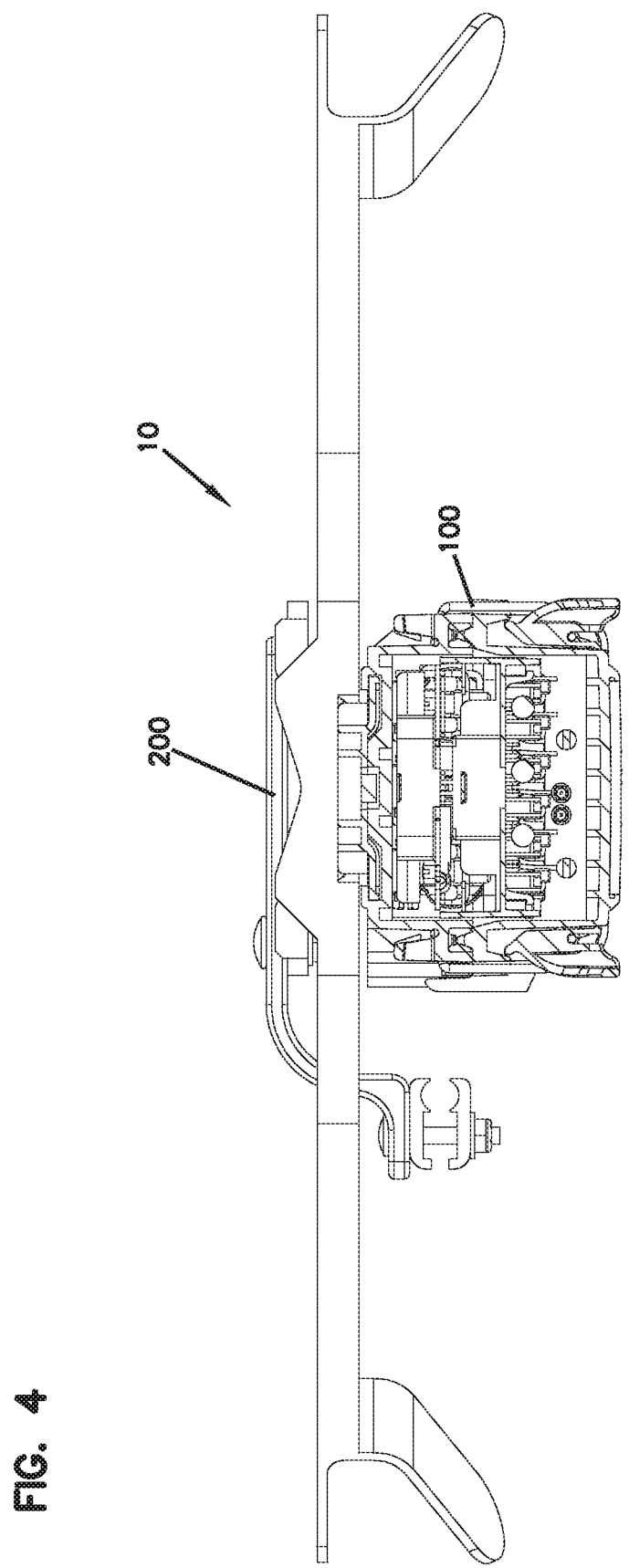
FIG. 4 is a cross-sectional view taken along section line 4-4 of FIG. 1 showing internal components of the fiber optic system of FIG. 1.

FIG. 3 is a cross-sectional view taken along section line 3-3 of FIG. 1 showing internal components of the fiber optic system of FIG. 1. FIG. 4 is a cross-sectional view taken along section line 4-4 of FIG. 1 showing internal components of the fiber optic system of FIG. 1. The telecommunications enclosure 100 includes sealed cable ports that allow cables 112 to be routed into the telecommunications enclosure 100. Inside the telecommunications enclosure 100, optical fibers corresponding to the cables can be accessed for splicing (e.g., splicing fibers from a feeder cable to drop cables), for optical power splitting, for wavelength division multiplexing, or other functions.

The telecommunications enclosure 100 can store fiber optic adapters 114 for making de-mateable connector-to-connector optic connections, optical splices, splice trays, splice holders, passive optical splitters, wavelength division multiplexers, fiber storage trays, and other fiber management structures. The telecommunications enclosure 100 can be environmentally sealed to protect the cables 112 routed inside the enclosure.

Referring back to FIGS. 1 and 2, the telecommunications enclosure 100 includes a cover 102 and a base 104. The base 104 is removably mountable to the mounting bracket arrangement 200. In certain examples, the cover 102 is connected to the base 104 by a hinge 108, and can open from the front of the telecommunications enclosure 100 without detaching the telecommunications enclosure 100 from the mounting bracket arrangement 200. In some examples, latches 110 can be used to hold the telecommunications enclosure 100 closed and to help compress a sealing between the base 104 and the cover 102.

Figure 5:
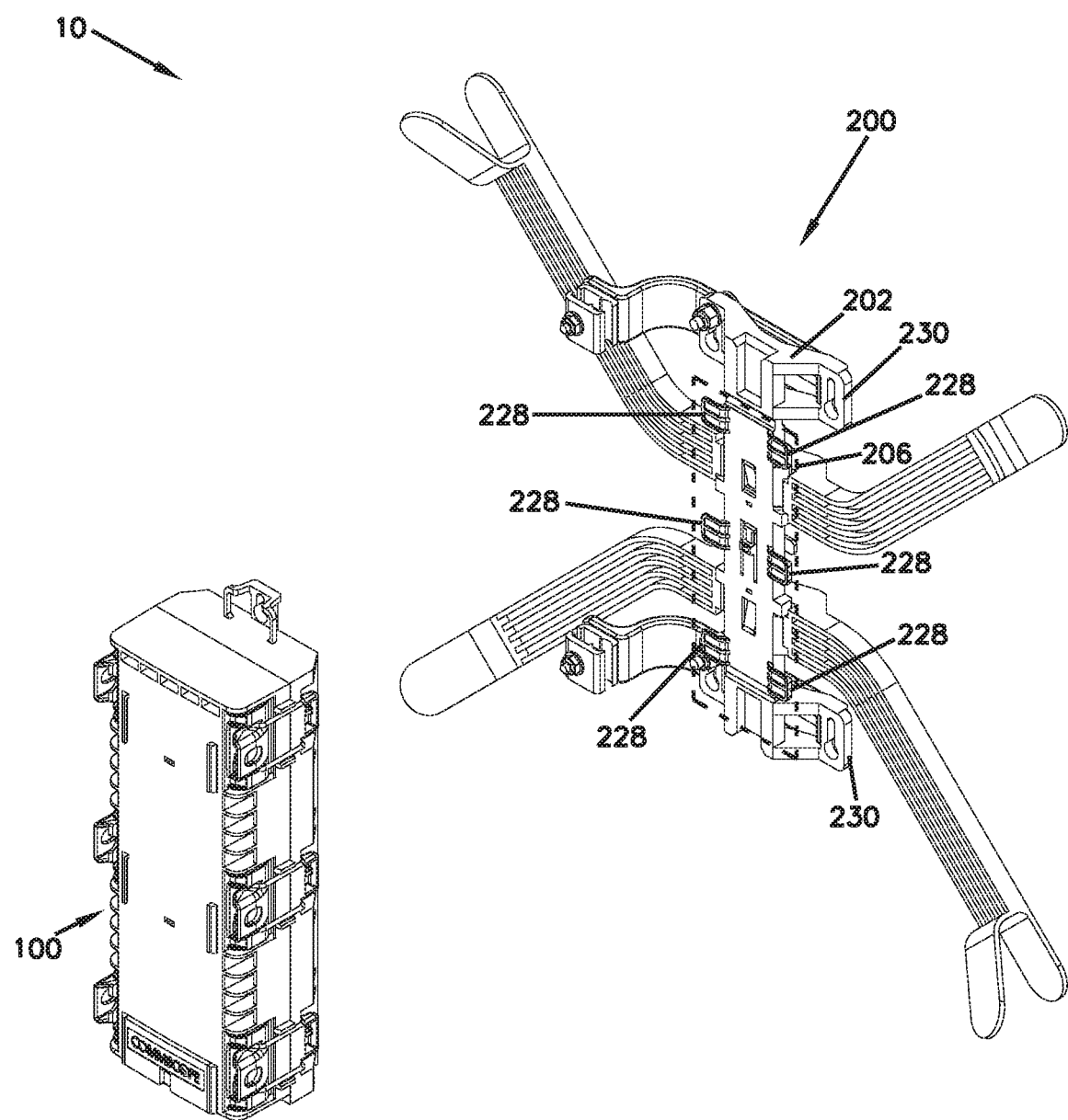
FIG. 5 is a front isometric view of the fiber optic system of FIG. 1 showing a telecommunications enclosure separated from a mounting bracket arrangement.
Figure 6:
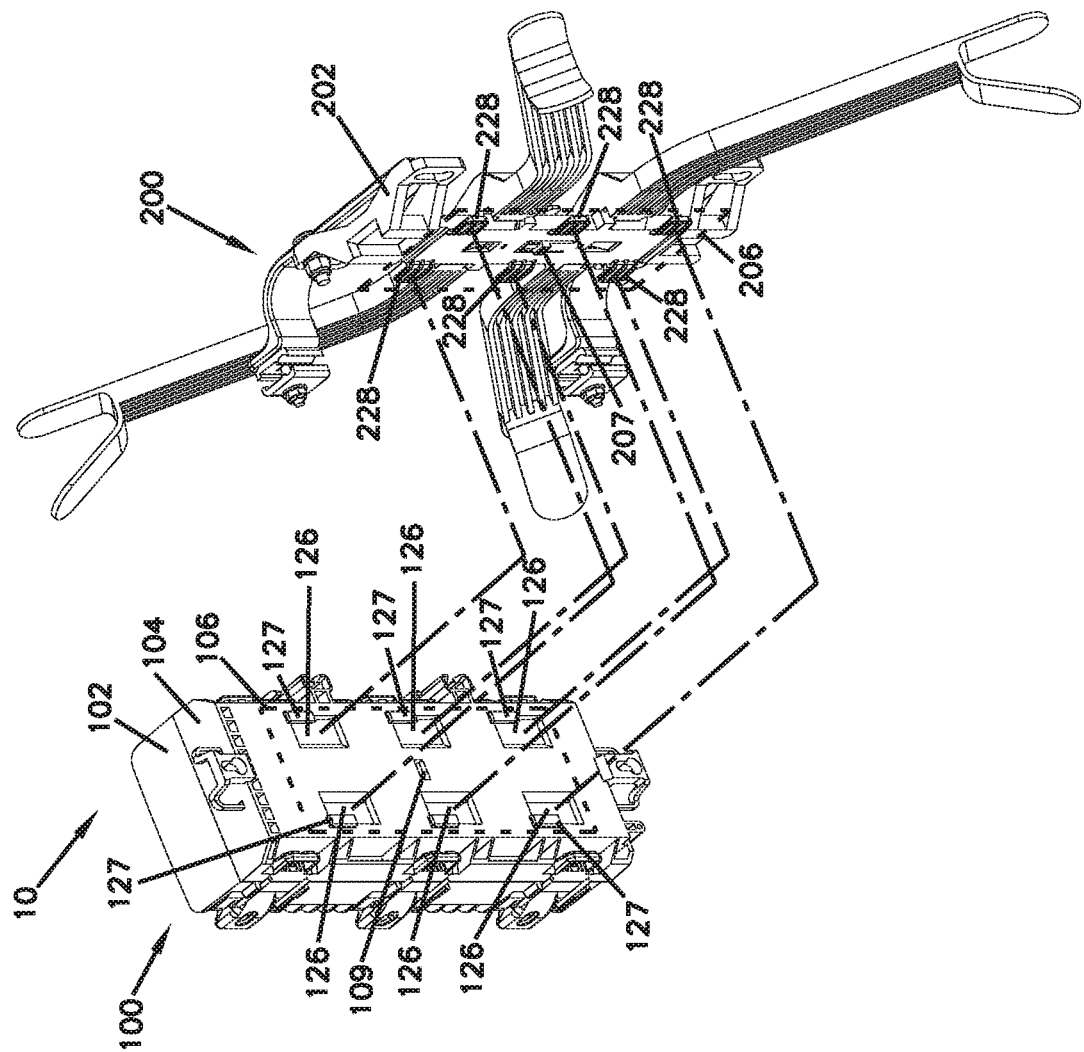
FIG. 6 is an isometric view illustrating a mating between the telecommunications enclosure and the mounting bracket arrangement of FIG. 5.

FIG. 5 shows a front isometric view of the fiber optic system 10 in the vertical orientation, and illustrates the telecommunications enclosure 100 separated from the mounting bracket arrangement 200. FIG. 6 shows an isometric view illustrating a mating between the telecommunications enclosure 100 and the mounting bracket arrangement 200. As shown in FIG. 6, the telecommunications enclosure 100 includes a first mechanical interface 106 on the base 104. In FIG. 6, the first mechanical interface 106 is indicated by a rectangular plane depicted in broken lines on a rear surface of the base 104.

The mounting bracket arrangement 200 includes a second mechanical interface 206. In FIGS. 5 and 6, the second mechanical interface 206 is indicated by a rectangular plane depicted in broken lines on a front surface of the mounting bracket arrangement 200. The first mechanical interface 106 of the telecommunications enclosure 100 is mateable with the second mechanical interface 206 for removably mounting the telecommunications enclosure 100 to the mounting bracket arrangement 200.

In the examples shown in FIGS. 5 and 6, the first mechanical interface 106 includes a plurality of mounting slots 126 covered in part by retainers 127, and the second mechanical interface 206 includes a plurality of mounting tabs 228. The mounting tabs 228 fit within open portions of the mounting slots 126 and slide within the mounting slots 126 to positions behind the retainers 127 to mate the telecommunications enclosure 100 and the mounting bracket arrangement 200 together. In other examples, the first mechanical interface 106 can include a plurality of mounting tabs that slot into a plurality of mounting slots on the second mechanical interface 206.

In certain examples, one of the first and second mechanical interfaces 106, 206 includes a flexible cantilever latch 207, and the other of the first and second mechanical interfaces 106, 206 includes a catch 109 that engages the flexible cantilever latch 207 to retain the first and second mechanical interfaces in a mated state.

Figure 7:
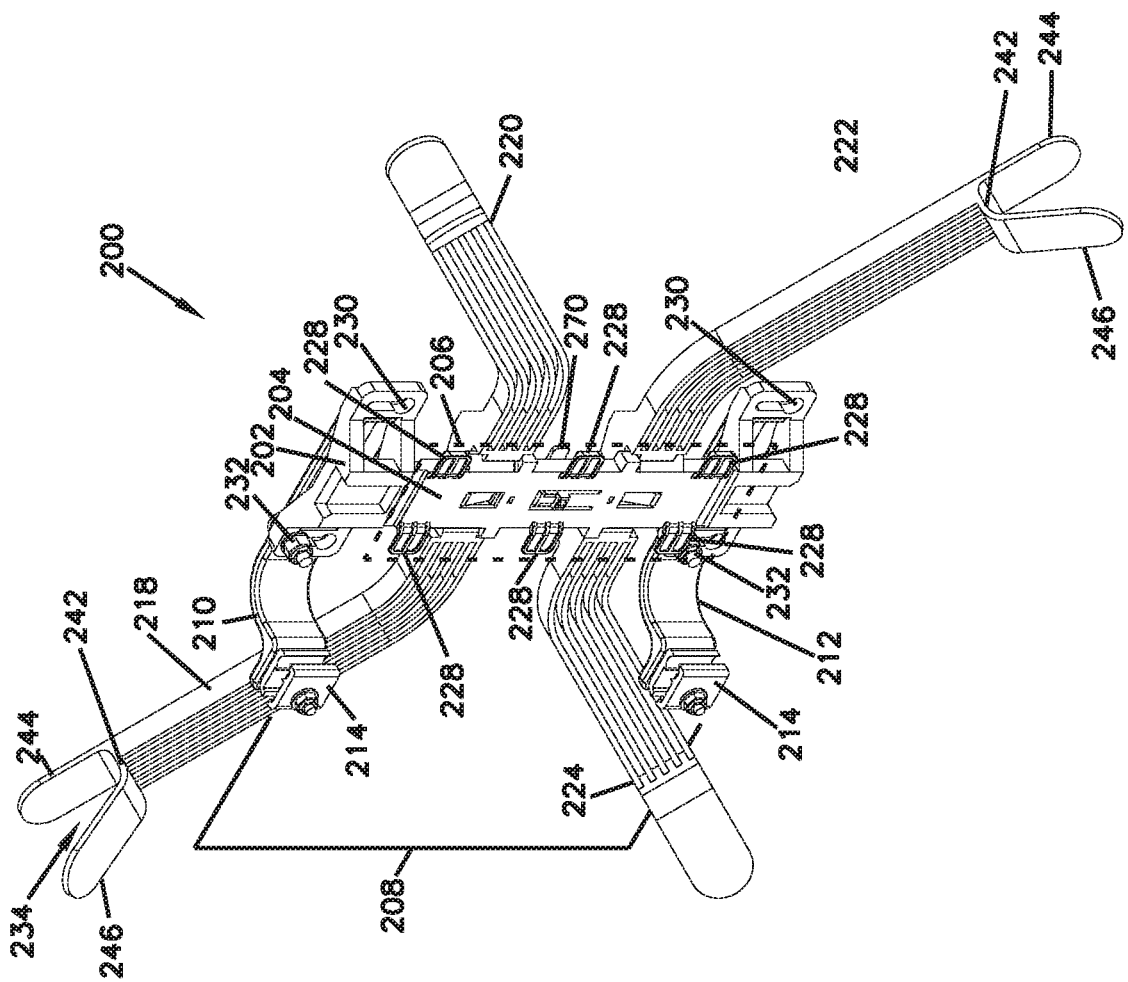
FIG. 7 is a front isometric view of a mounting bracket arrangement in accordance with a first example of the present disclosure.
Figure 8:
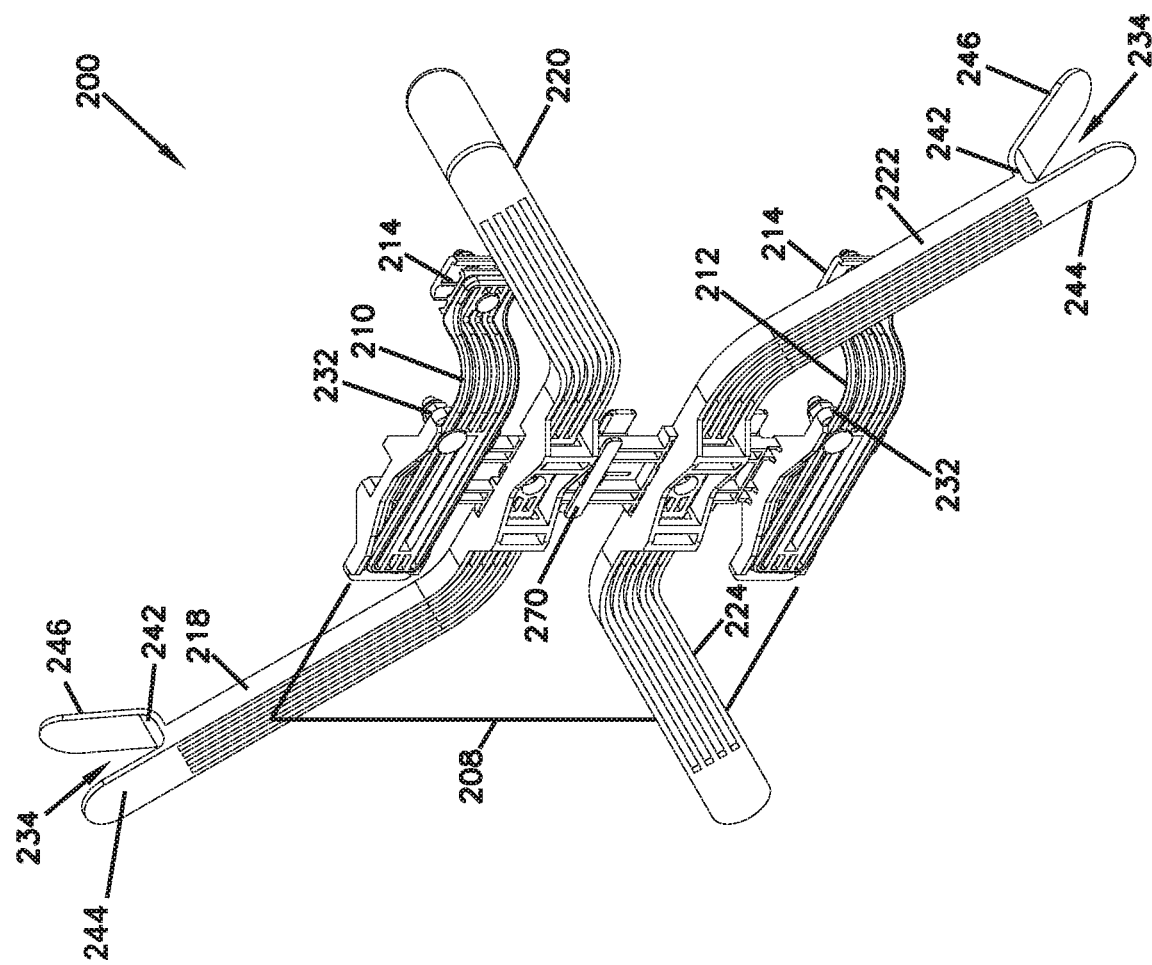
FIG. 8 is a rear isometric view of the mounting bracket arrangement of FIG. 7.
Figure 9:
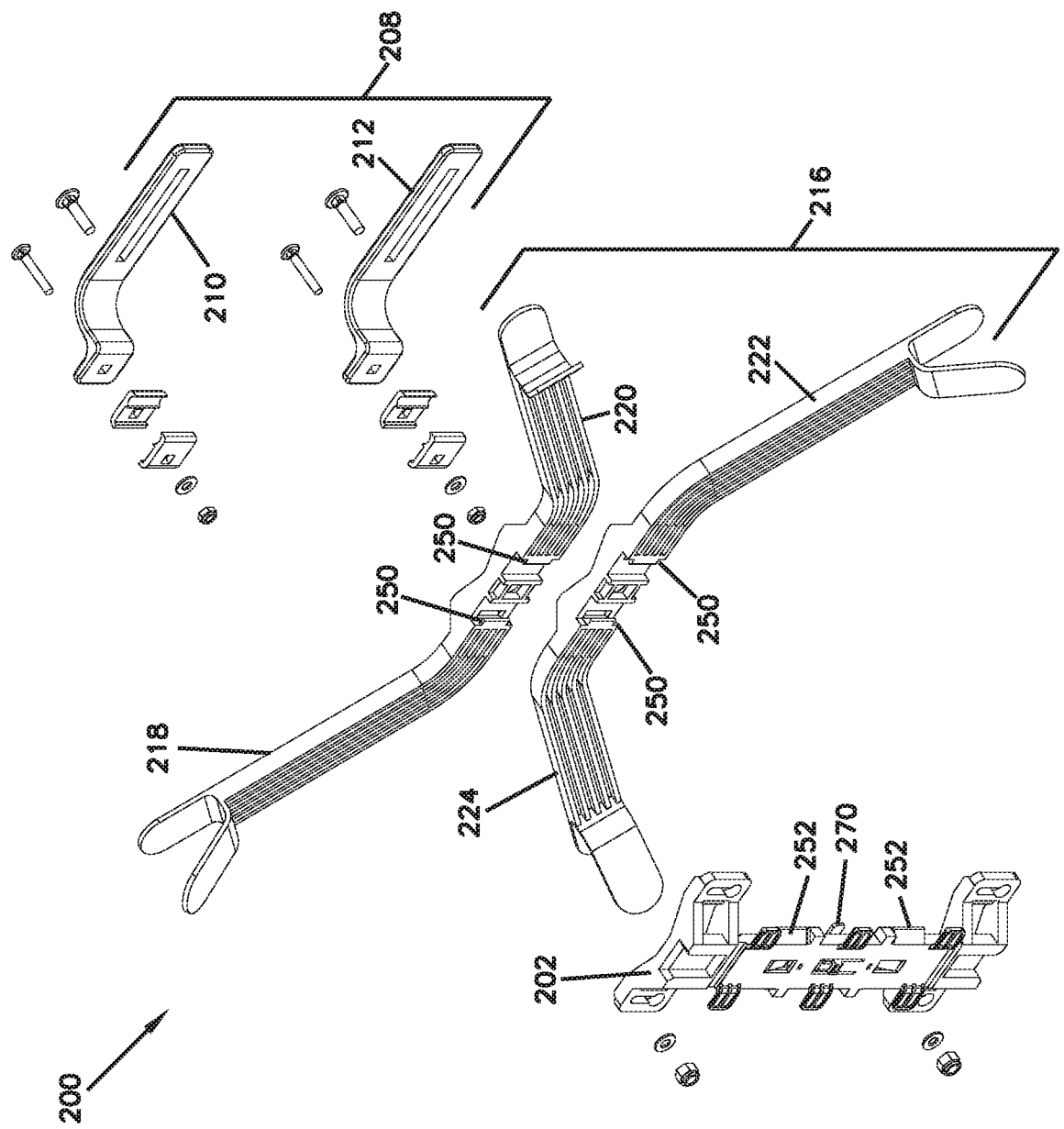
FIG. 9 is a front, exploded view of the mounting bracket arrangement of FIG. 7.
Figure 10:
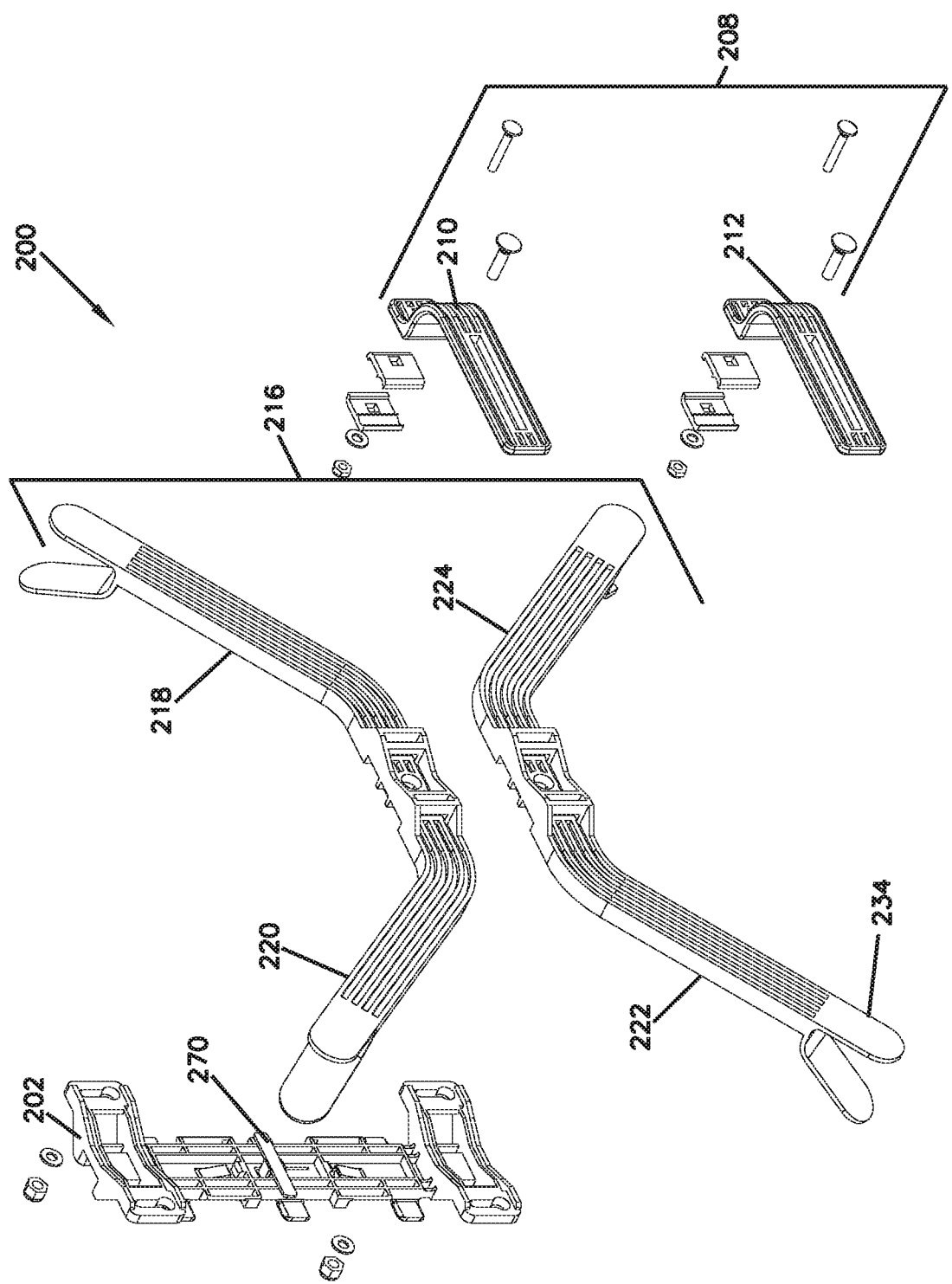
FIG. 10 is a rear, exploded view of the mounting bracket arrangement of FIG. 7.

FIG. 7 shows a front isometric view of the mounting bracket arrangement 200 in a vertical orientation. FIG. 8 shows a rear isometric view of the mounting bracket arrangement 200 in a vertical orientation. FIG. 9 shows a front, exploded view of the mounting bracket arrangement 200 in a vertical orientation. FIG. 10 shows a rear, exploded view of the mounting bracket arrangement 200 in a vertical orientation.

As shown in FIGS. 7-10, the mounting bracket arrangement 200 includes a main bracket 202. The main bracket 202 includes the second mechanical interface 206 described above. As shown in FIGS. 7 and 8, the main bracket 202 also includes a handle 270 that can be activated (e.g., pulled) by a technician to disengage the cantilever latch 207 from the catch 109 to allow the bracket to be slid relative to the enclosure. In this manner, a technician can manually release the telecommunications enclosure 100 from the mounting bracket arrangement 200.

Figure 11:
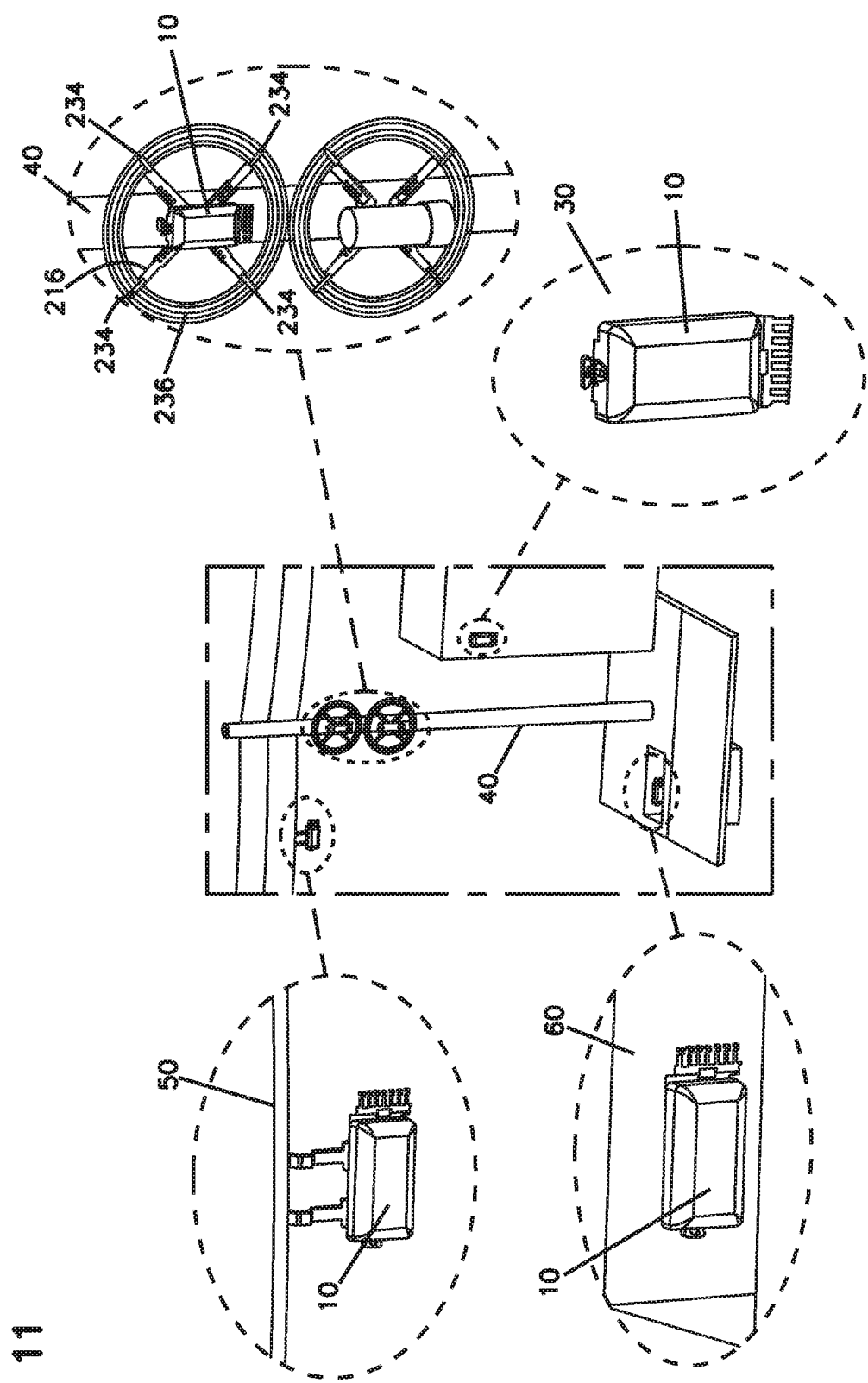

The main bracket 202 also includes fastener openings 230 that can be used to mount the main bracket 202 to a structure in the field. FIG. 11 shows various structures to which the fiber optic system 10 can be mounted to. As described above, the fiber optic system 10 includes the telecommunications enclosure 100 detachably mounted to the mounting bracket arrangement 200. Fasteners such as screws, bolts, nails, etc. can be threaded through the fastener openings 230 for mounting the main bracket 202 to a structure including, but not limited to, a wall 30 of a building, a pole 40 (such as a wooden pole that carries power and telecommunication cables), and/or an underground hand hole box 60. When mounted to a structure in the field, the fiber optic system 10 can be mounted in either a horizontal orientation or a vertical orientation as may be needed or desired for a particular application. For example, FIG. 11 shows the fiber optic system 10 mounted to the wall 30 and the pole 40 in a vertical orientation, and shows the fiber optic system 10 mounted to the underground hand hole box 60 in a horizontal orientation.

As shown in FIGS. 7-10, the mounting bracket arrangement 200 includes an aerial strand mount unit 208 that is detachably mountable to the main bracket 202. As shown in FIGS. 7-10, the aerial strand mount unit 208 includes a first strand mount arm 210 and a second strand mount arm 212. In alternative examples, the aerial strand mount unit 208 may include more than two strand mount arms, or a single stand mount arm. In certain examples, the first strand mount arm 210 and the second strand mount arm 212 are each detachably mounted to the main bracket 202 using fastener 232 such as a bolt.

The first strand mount arm 210 and the second strand mount arm 212 each project outwardly from the main bracket 202 when the aerial strand mount unit 208 is mounted to the main bracket 202. In certain examples, the first and second strand mount arms 210, 212 can move relative to the main bracket 202 to adjust the distance the first and second strand mount arms 210, 212 project from the main bracket 202. The first strand mount arm 210 and the second strand mount arm 212 each include a stand clamp 214.

Referring to FIG. 11, the stand clamps 214 can be used to removably attach the mounting bracket arrangement 200, and the fiber optic system 10, to an overhead cable 50 such as a power or telecommunications cable. As shown in FIG. 11, when attached to the overhead cable 50, the fiber optic system 10 is in a horizontal orientation. As described above, the first and second strand mount arms 210, 212 are moveable relative to the main bracket 202 to adjust a distance between the telecommunications enclosure 100 and the overhead cable 50 as may be needed or desired for a particular application. The distance between the telecommunications enclosure 100 and the overhead cable 50 can be adjusted to improve access and ventilation of the telecommunications enclosure 100.

Referring back to FIGS. 7-10, the mounting bracket arrangement 200 includes a cable storage unit 216 that is detachably mountable to the main bracket 202. As shown in FIG. 9, the cable storage unit 216 can include surfaces 250 that mate with corresponding angled surfaces 252 on the main bracket 202, to form a dovetail joint that detachably mounts the cable storage unit 216 to the main bracket 202.

The cable storage unit 216 includes a plurality of cable management arms such as a first cable management arm 218, a second cable management arm 220, a third cable management arm 222, and a fourth cable management arm 224. Each cable management arm 218, 220, 222, 224 projects outwardly from the main bracket 202 when the cable storage unit 216 is mounted to the main bracket 202.

In the examples shown in FIGS. 7-10, the mounting bracket arrangement 200 includes four cable management arms 218, 220, 222, 224. In alternative examples, it is contemplated that the mounting bracket arrangement 200 may include more than four cable management arms, or may have fewer than four cable management arms.

In the examples shown in FIGS. 7-10, the first and second cable management arms 218, 220 are integral such that they are a single piece that can be detachably mounted to the main bracket 202. Similarly, the third and fourth cable management arms 222, 224 are integral such that they are a single piece that can also be detachably mounted to the main bracket 202. As will be described below, in alternative examples each cable management arm can be a separate piece attached to the main bracket.

As shown in FIGS. 7-10, each cable management arm 218, 220, 222, 224 includes a cable support 234. Each cable support 234 is located at a distal end of a cable management arm and includes a base surface 242, a first side surface 244, and a second side surface 246 that define an open pocket shape. In some examples, at least one side surface of each cable support 234, such as the first side surface 244, is substantially parallel to the cable management arm, and the other side surface, such as the second side surface 246, extends outwardly at an angle from the cable management arm.

The cable supports 234 can hold and support excess cable wound about the cable storage unit 216. For example, referring back to FIG. 11, each cable support 234 can be used for storing excess cable in a coiled configuration 236 about the cable storage unit 216. The cable supports 234 can define a cable wrapping path having a cross-dimension larger than a cross-dimension of the telecommunications enclosure 100. The open pocket shape of the cable supports 234, as defined by the base surface 242, the first side surface 244, and the second side surface 246, can improve the ability to wind and store excess cable around the cable storage unit 216 by allowing a technician to slide the excess cable on the second side surface 246, and to catch the excess cable using the first side surface 244 within the cable support 234. In some examples, each cable management arm 218, 220, 222, 224 can slide relative to the main bracket 202 to adjust the size of the cable wrapping path of the cable storage unit 216.

As described above, FIGS. 1-10 show a first example of the fiber optic system 10 that includes a mounting bracket arrangement 200. In this first example, the mounting bracket arrangement 200 is made from an injection molded plastic material. The injection molded plastic may provide certain advantages such as reducing the weight of the mounting bracket arrangement 200 while maintaining the durability of the bracket arrangement. In the first example of the fiber optic system 10, the mounting bracket arrangement 200 may be particularly well suitable for mounting small to medium sized telecommunications enclosures to a structure in the field.

Figure 12:
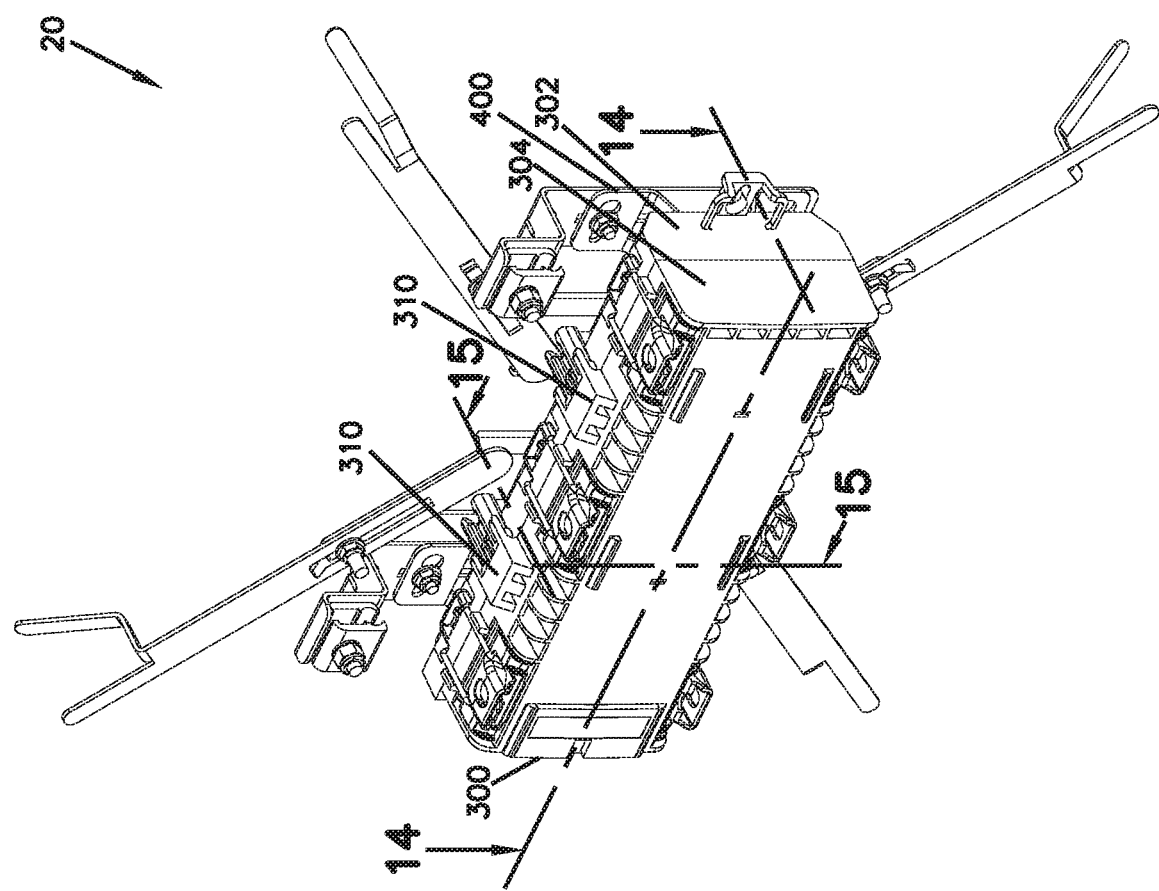
FIG. 12 is a front isometric view of a fiber optic system shown in a horizontal orientation in accordance with another example of the present disclosure.
Figure 13:
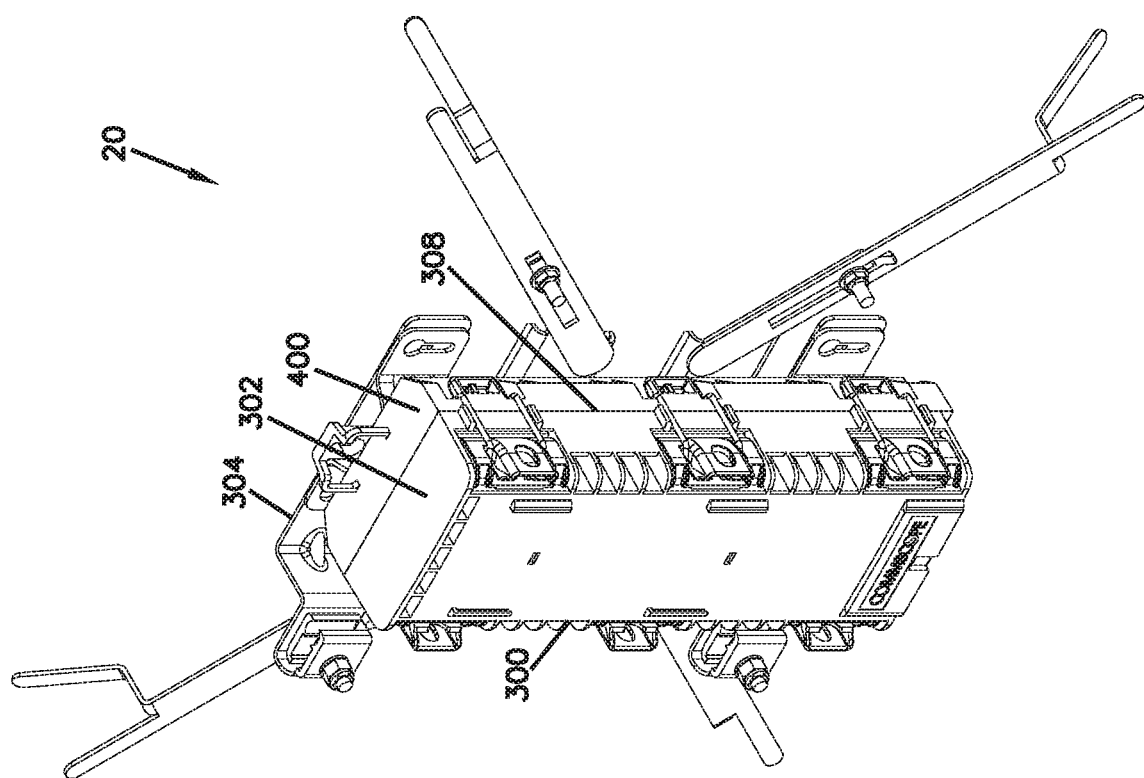
FIG. 13 is a front isometric view of the fiber optic system of FIG. 12, the fiber optic system is shown in a vertical orientation.

FIGS. 12 and 13 show front isometric views of a fiber optic system 20 in accordance with a second example of the present disclosure. In this second example, the fiber optic system 20 includes a telecommunications enclosure 300 and a mounting bracket arrangement 400. In this example, the mounting bracket arrangement 400 is made from a metal material, and may be particularly well suitable for mounting medium to large sized telecommunications enclosures to a structure in the field.

Figure 14:
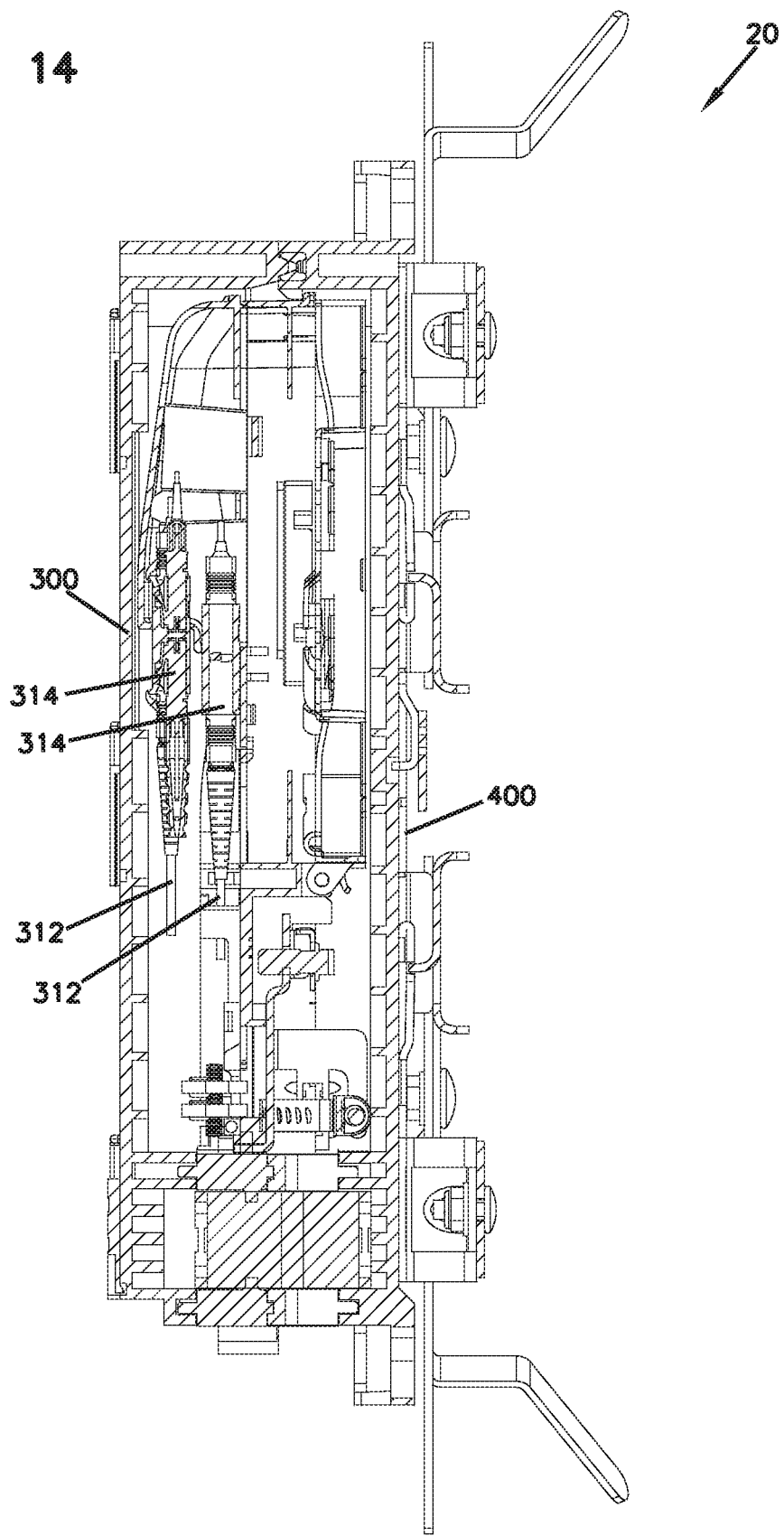
FIG. 14 is a cross-sectional view taken along section line 14-14 of FIG. 12 showing internal components of the fiber optic system of FIG. 12.
Figure 15:
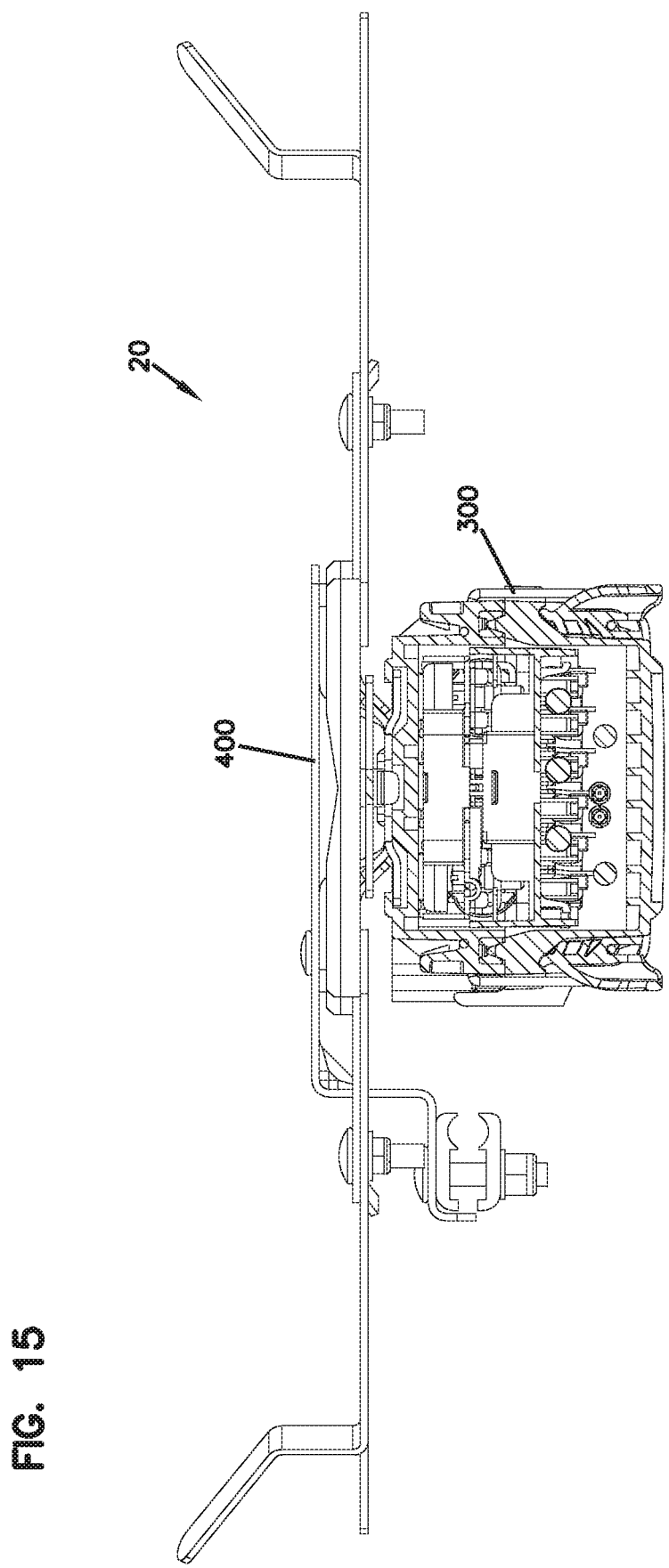
FIG. 15 is a cross-sectional view taken along section line 15-15 of FIG. 12 showing internal components of the fiber optic system of FIG. 12.

FIG. 14 is a cross-sectional view taken along section line 14-14 of FIG. 12 showing internal components of the fiber optic system of FIG. 12. FIG. 15 is a cross-sectional view taken along section line 15-15 of FIG. 12 showing internal components of the fiber optic system of FIG. 12. The telecommunications enclosure 300 is similar to the telecommunications enclosure 100 described above with references to FIGS. 1-10.

The telecommunications enclosure 300 includes sealed cable ports that allow cables 312 to be routed into the telecommunications enclosure 300. The telecommunications enclosure 300 can also store fiber optic adapters 314 for making de-mateable connector-to-connector optic connections, optical splices, splice trays, splice holders, passive optical splitters, wavelength division multiplexers, fiber storage trays, and other fiber management structures. The telecommunications enclosure 300 can be environmentally sealed to protect the cables routed inside the enclosure.

Referring back to FIGS. 12 and 13, the telecommunications enclosure 300 includes a cover 302 and a base 304. The base 304 is removably mountable to the mounting bracket arrangement 400. In some examples, the cover 302 is connected to the base 304 by a hinge 308, and can open from the front of the telecommunications enclosure 300 without detaching the telecommunications enclosure 300 from the mounting bracket arrangement 400. In some examples, latches 310 can be used to hold the telecommunications enclosure 300 closed and to help compress a sealing between the base 304 and the cover 302.

Figure 16:
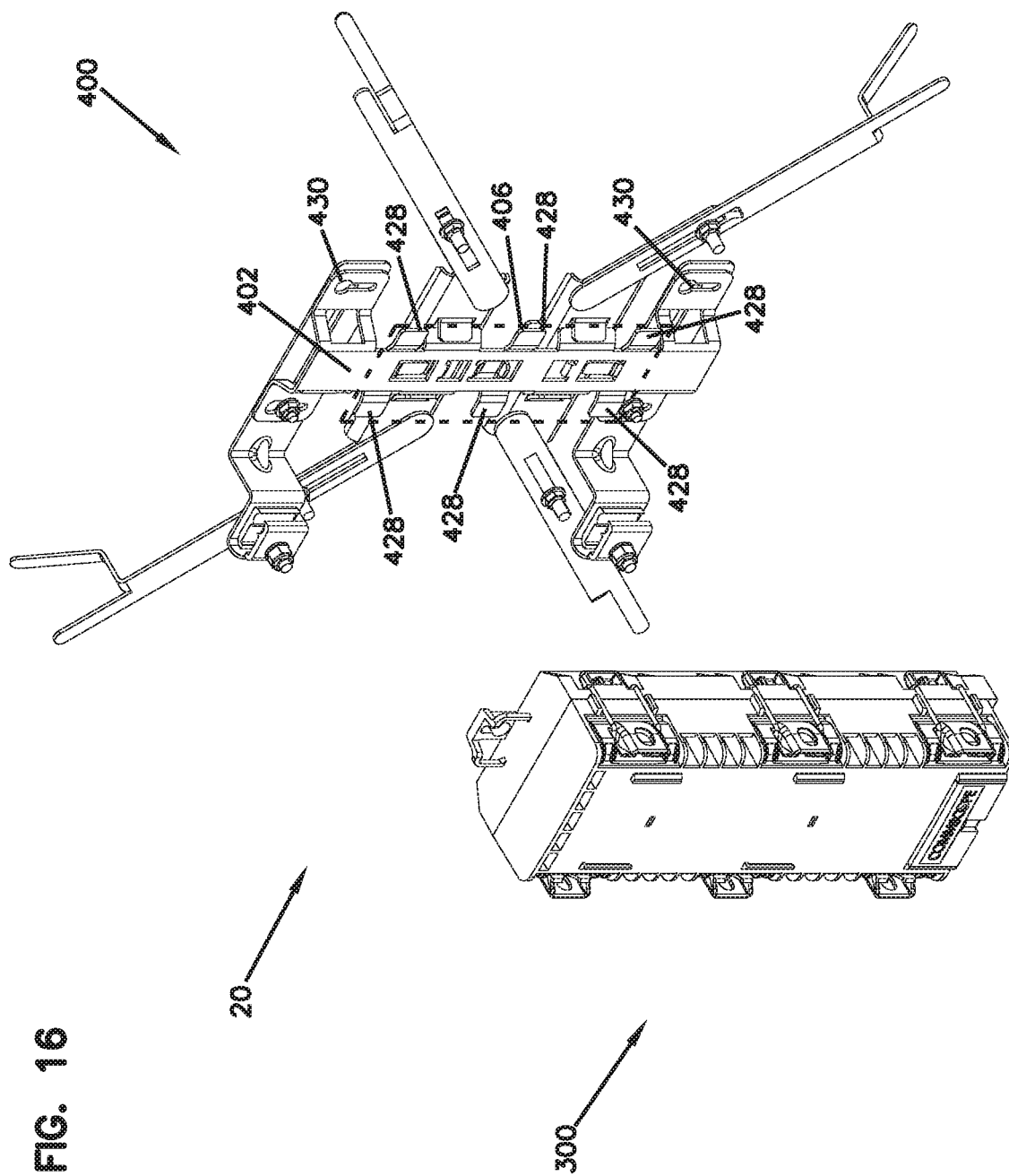
FIG. 16 is a front isometric view of the fiber optic system of FIG. 12 showing a telecommunications enclosure separated from a mounting bracket arrangement.
Figure 17:
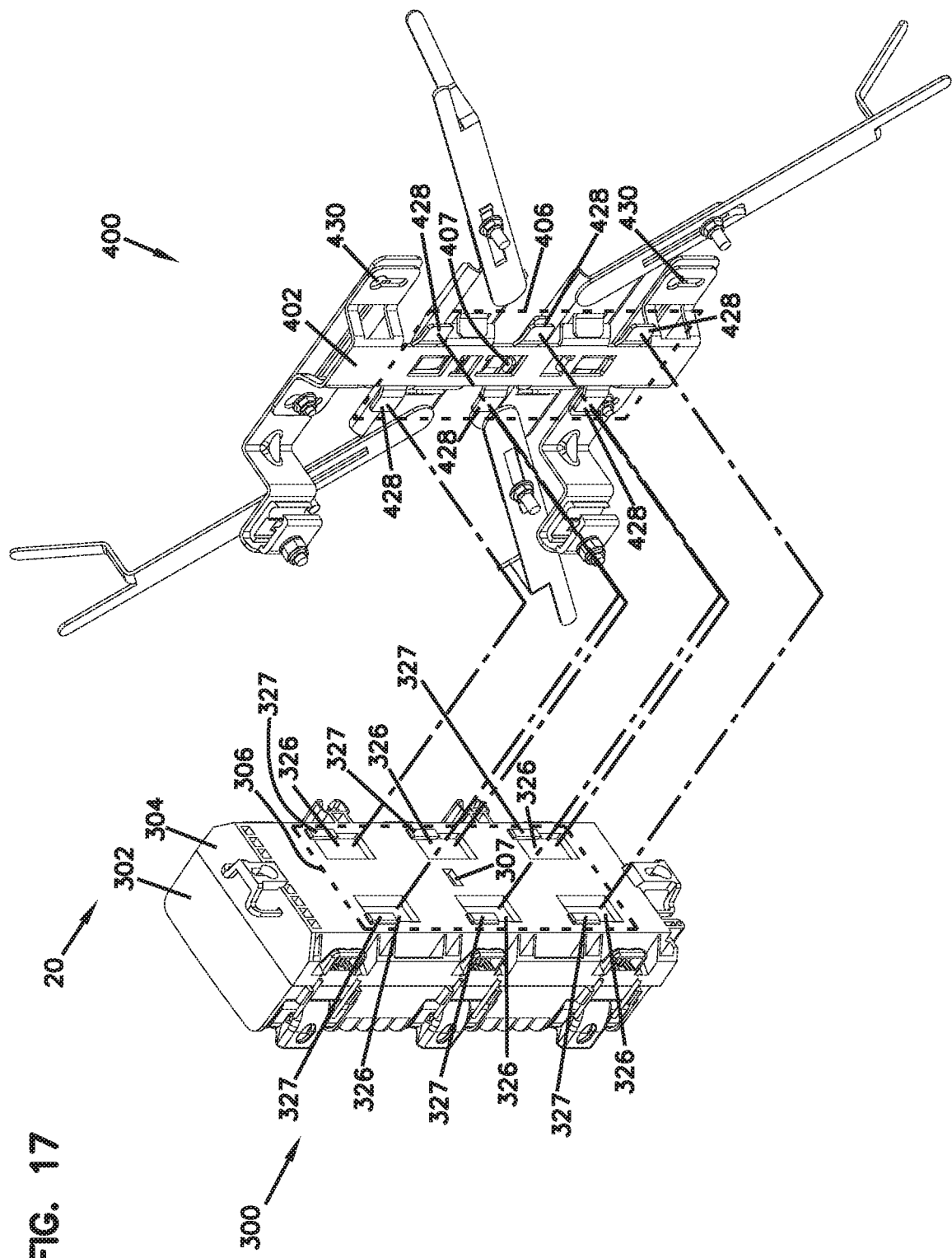
FIG. 17 is an isometric view illustrating a mating between the telecommunications enclosure and the mounting bracket arrangement of FIG. 16.

FIG. 16 shows a front isometric view of the fiber optic system 20 in the vertical orientation, and illustrates the telecommunications enclosure 300 separated from the mounting bracket arrangement 400. FIG. 17 shows an isometric view illustrating a mating between the telecommunications enclosure 300 and the mounting bracket arrangement 400. As shown in FIG. 17, the telecommunications enclosure 300 includes a first mechanical interface 306 on the base 304. In FIG. 17, the first mechanical interface 306 is indicated by a rectangular plane depicted in broken lines on a rear surface of the base 304.

The mounting bracket arrangement 400 includes a second mechanical interface 406. In FIGS. 16 and 17, the second mechanical interface 406 is indicated by a rectangular plane depicted in broken lines on a front surface of the mounting bracket arrangement 400. The first mechanical interface 306 of the telecommunications enclosure 300 is mateable with the second mechanical interface 406 for removably mounting the telecommunications enclosure 300 to the mounting bracket arrangement 400.

In the examples shown in FIGS. 16 and 17, the first mechanical interface 306 includes a plurality of mounting slots 326 covered in part by retainers 327, and the second mechanical interface 406 includes a plurality of mounting tabs 428. The mounting tabs 428 fit within the mounting slots 326 and slide behind the retainers 327 to mate the telecommunications enclosure 300 and the mounting bracket arrangement 400 together. In other examples, the first mechanical interface 306 can include a plurality of mounting tabs that slot into a plurality of mounting slots on the second mechanical interface 406. In certain examples, one of the first and second mechanical interfaces 306, 406 includes a flexible cantilever latch (e.g., latch 407), and the other of the first and second mechanical interfaces 306, 406 includes a catch (e.g., opening 307) that engages the flexible cantilever latch to retain the first and second mechanical interfaces in a mated state.

Figure 18:
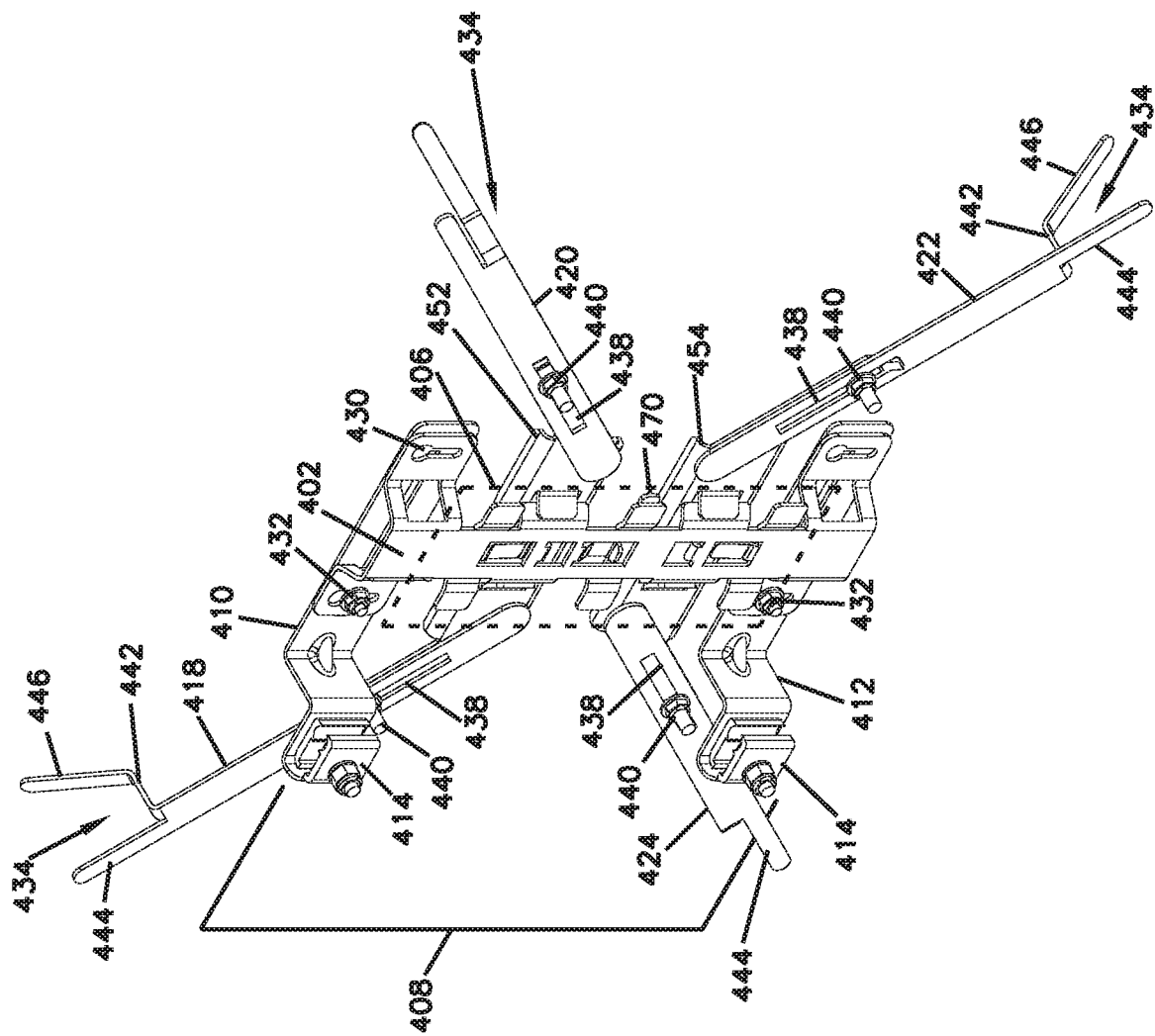
FIG. 18 is a front isometric view of a mounting bracket arrangement in accordance with a second example of the present disclosure, the mounting bracket arrangement is shown in a vertical orientation.
Figure 19:
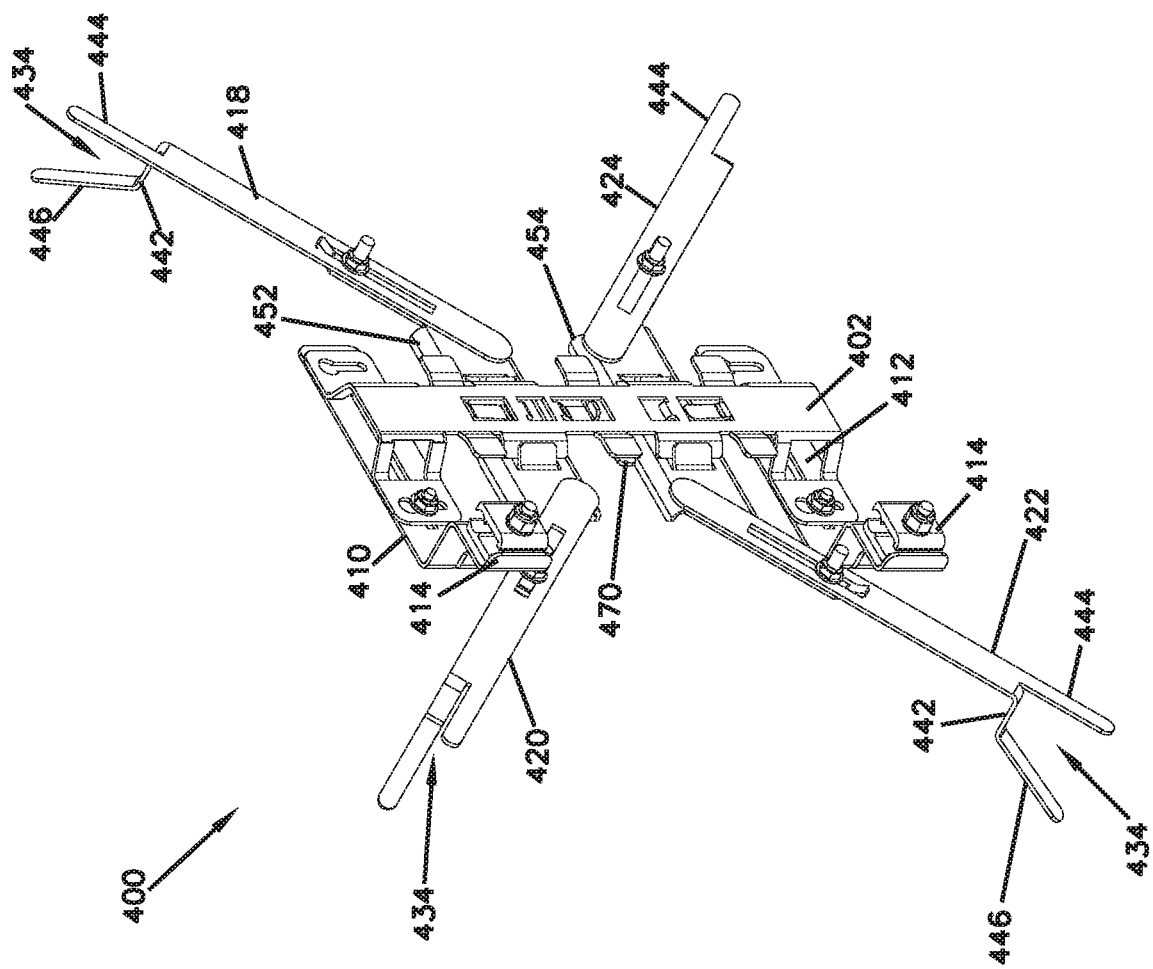
FIG. 19 is another front isometric view of the mounting bracket arrangement in accordance with a second example of the present disclosure.
Figure 20:
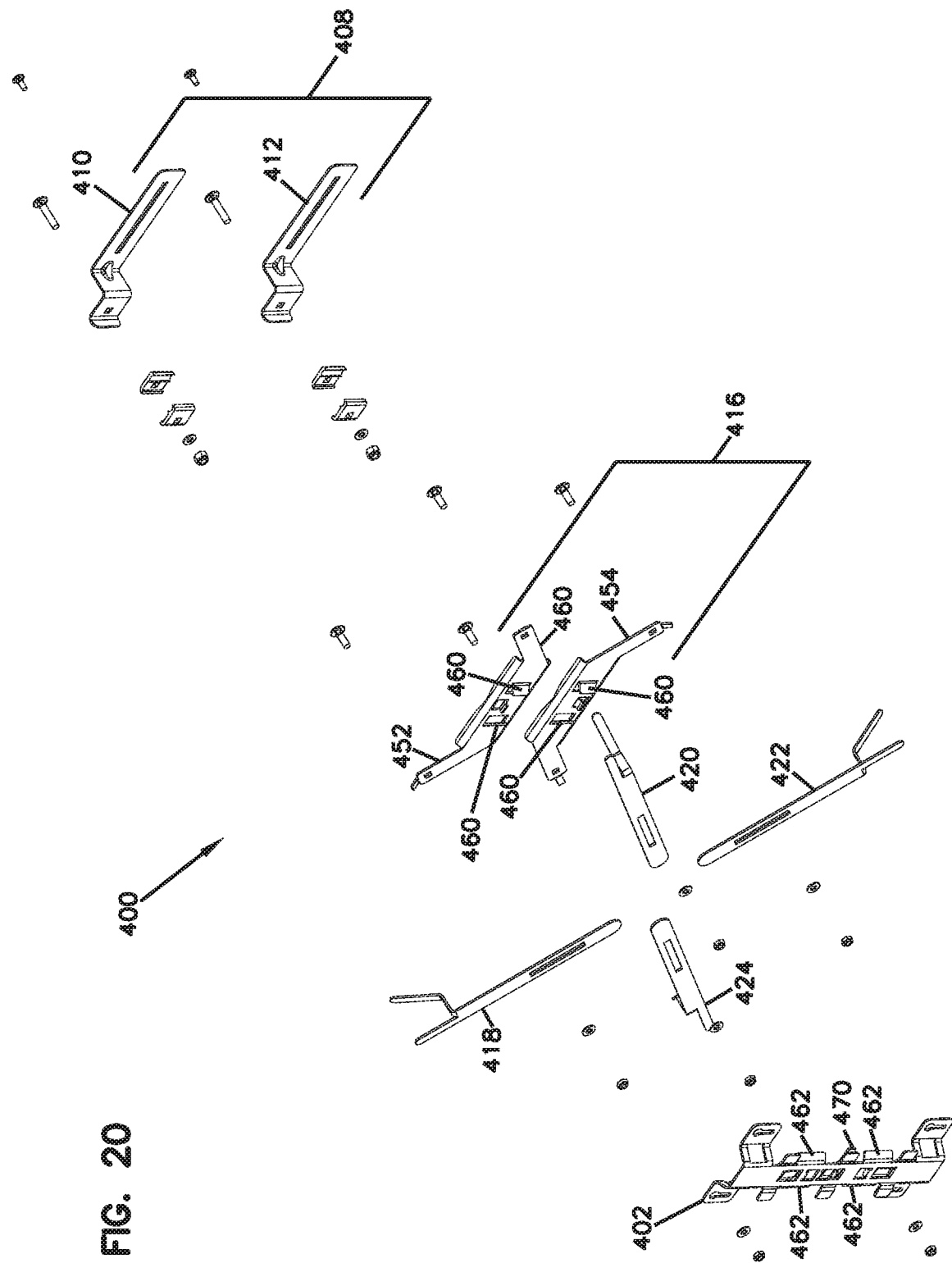
FIG. 20 is a front, exploded view of the mounting bracket arrangement of FIG. 18.
Figure 21:
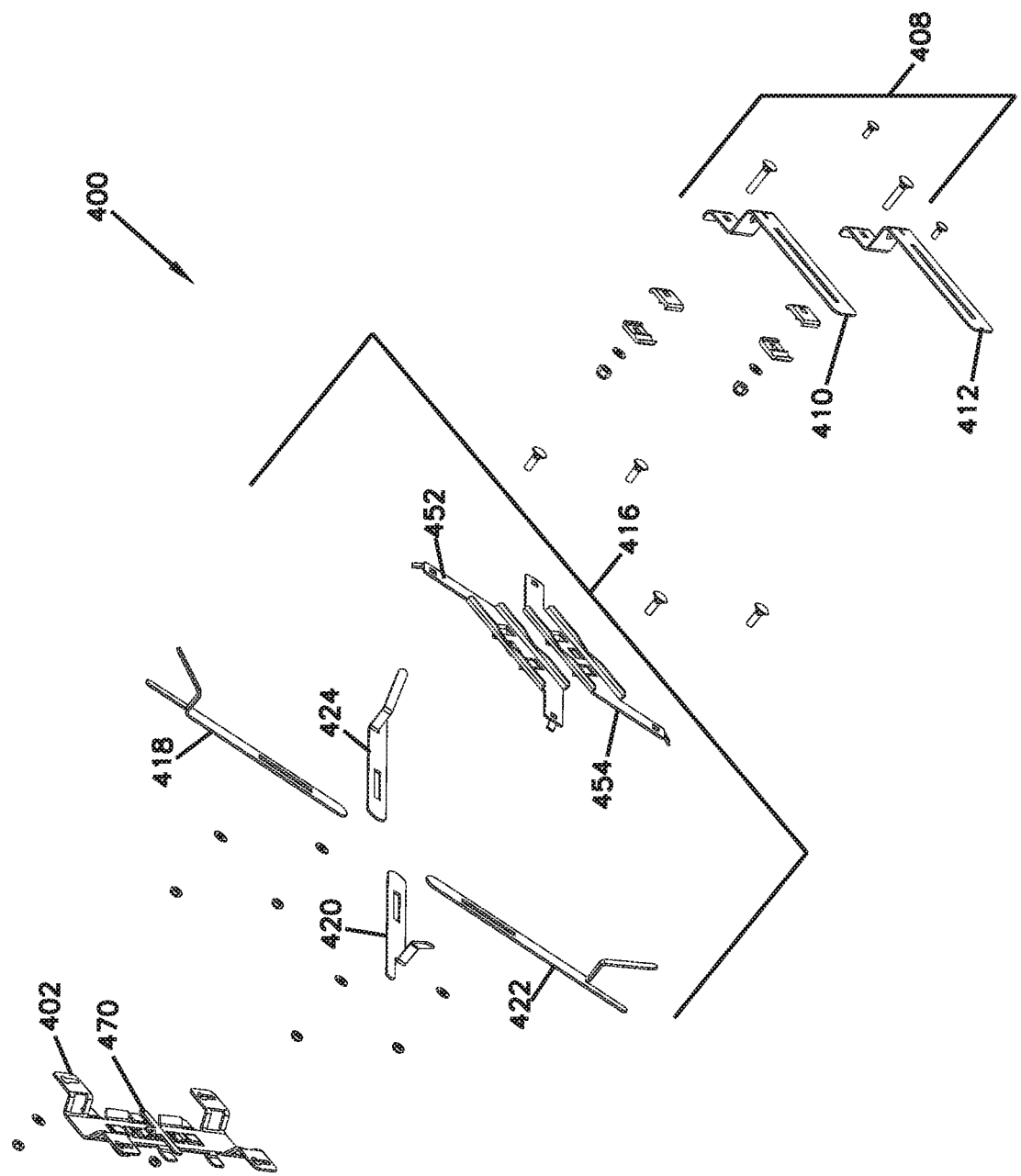
FIG. 21 is a rear, exploded view of the mounting bracket arrangement of FIG. 18.

FIG. 18 shows a front isometric view of the mounting bracket arrangement 400 in a vertical orientation. FIG. 19 shows another front isometric view of the mounting bracket arrangement 400 in a vertical orientation. FIG. 20 shows a front, exploded view of the mounting bracket arrangement 400 in a vertical orientation. FIG. 21 shows a rear, exploded view of the mounting bracket arrangement 400 in a vertical orientation.

As shown in FIGS. 18-21, the mounting bracket arrangement 400 includes a main bracket 402. The main bracket 402 includes the second mechanical interface 406 described above. The main bracket 402 also includes fastener openings 430 that can be used to mount the main bracket 402 to a structure in the field.

Like in the first fiber optic system shown in FIG. 11, fasteners such as screws, bolts, nails, etc. can be threaded through the fastener openings 430 for mounting the main bracket 402 to a structure including, but not limited to, a wall 30 of a building, a pole 40 (such as a wooden pole that carries power and telecommunication cables), and/or an underground hand hole box 60. When mounted to a structure in the field, the mounting bracket arrangement 400, and the fiber optic system 20, can be mounted in the either horizontal or vertical orientations as may be needed for a particular application.

As shown in FIGS. 18-21, the mounting bracket arrangement 400 includes an aerial strand mount unit 408 that is detachably mountable to the main bracket 402. As shown in FIGS. 18-21, the aerial strand mount unit 408 includes a first strand mount arm 410 and a second strand mount arm 412. In alternative examples, the aerial strand mount unit 408 may include more than two strand mount arms, or a single stand mount arm. In certain examples, the first strand mount arm 410 and the second strand mount arm 412 are each detachably mounted to the main bracket 402 using fastener 432 such as a bolt.

The first strand mount arm 410 and the second strand mount arm 412 each project outwardly from the main bracket 402 when the aerial strand mount unit 408 is mounted to the main bracket 402. In certain examples, the first and second strand mount arms 410, 412 can slide relative to the main bracket 402 to adjust the distance the first and second strand mount arms 410, 412 project from the main bracket 402. The first strand mount arm 410 and the second strand mount arm 412 each include a stand clamp 414.

Like in the first fiber optic system shown in FIG. 11, the stand clamps 414 can be used to removably attach the mounting bracket arrangement 400, and the fiber optic system 20, to an overhead cable 50 such as a power or telecommunications cable. When attached to an overhead cable, the fiber optic system 20 is in a horizontal orientation. As described above, the first and second strand mount arms 410, 412 are moveable relative to the main bracket 402 to adjust a distance between the telecommunications enclosure 300 and the overhead cable 50 as may be needed or desired for a particular application. The distance between the telecommunications enclosure 300 and the overhead cable 50 can be adjusted to improve access and ventilation of the telecommunications enclosure 300.

Referring back to FIGS. 18-21, the mounting bracket arrangement 400 includes a cable storage unit 416 that is detachably mountable to the main bracket 402. In the example depicted in FIGS. 18-21, the cable storage unit 416 includes a plurality of cable management arms such as a first cable management arm 418, a second cable management arm 420, a third cable management arm 422, and a fourth cable management arm 424. Each cable management arm 418, 420, 422, 424 projects outwardly from the main bracket 402 when the cable storage unit 416 is mounted to the main bracket 402.

In the examples shown in FIGS. 18-21, the mounting bracket arrangement 400 includes four cable management arms 418, 420, 422, 424. In alternative examples, it is contemplated that the mounting bracket arrangement 400 may include more than four cable management arms, or may have fewer than four cable management arms.

Each cable management arm 418, 420, 422, 424, includes a cable support 434. Each cable support 434 is located at a distal end of a cable management arm and includes a base surface 442, a first side surface 444, and a second side surface 446 that define an open pocket shape. In some examples, at least one side surface of each cable support 434, such as the first side surface 444, is substantially parallel to the cable management arm of the cable support 434, and the other side surface, such as the second side surface 446, extends outwardly at an angle from the cable management arm.

Like in the fiber optic system shown in FIG. 11, each cable support 434 can be used for storing excess cable in a coiled configuration 436 about the cable storage unit 416 by winding the excess cable around the cable supports 434 of each of the cable management arms. In certain examples, the cable supports 434 define a cable wrapping path having a cross-dimension larger than a cross-dimension of the telecommunications enclosure 300. The open pocket shape of the cable supports 434, as defined by the base surface 442, the first side surface 444, and the second side surface 446, can improve the ability to wind and store excess cable around the cable storage unit 416 by allowing a technician to slide the excess cable on the second side surface 446, and to catch the excess cable using the first side surface 444 within the cable support 434.

Each cable management arm 418, 420, 422, 424, also includes a slot 438, and each cable management arm can be individually attached to the main bracket 402. In certain examples, as shown in FIGS. 20 and 21, the cable management arms 418, 420, 422, 424 can be attached to an intermediate upper bracket 452 and an intermediate lower bracket 454 for attachment to the main bracket 402. A fastener 440 such as a bolt can be thread through the slot 438 to tighten a cable management arm 418, 420, 422, 424 to the intermediate upper bracket 452 or the intermediate lower bracket 454.

As shown in FIG. 20, the intermediate upper bracket 452 and the intermediate lower bracket 454 include flaps 460, and the main bracket 402 includes corresponding flaps 462. The flaps 460 of the intermediate upper bracket 452 and the intermediate lower bracket 454 can interface with the flaps 462 to detachably mount the intermediate upper bracket 452 and the intermediate lower bracket 454 to the main bracket 402.

When the intermediate upper bracket 452 and the intermediate lower bracket 454 are attached to the main bracket 402, the distance that each cable management arm 418, 420, 422, 424 extends from the main bracket 402 can be adjusted by changing the location where the fastener 440 is tightened relative to the slot 438 of each cable management arm. Accordingly, the size of the cable wrapping path defined by the cable storage unit 416 can be adjusted by a technician as may be needed or desired.

As shown in FIGS. 20 and 21, the main bracket 402 also includes a lever 470 that can be activated by a technician for pivoting the mounting tabs 428 of the second mechanical interface 406 from an engaged position to a disengaged position. The lever 470 can be activated by, for example, pushing, pulling, or rotating, to pivot the mounting tabs 428 into the disengaged position. In this manner, a technician can manually releasing the telecommunications enclosure 300 from the mounting bracket arrangement 400.

Figure 22:
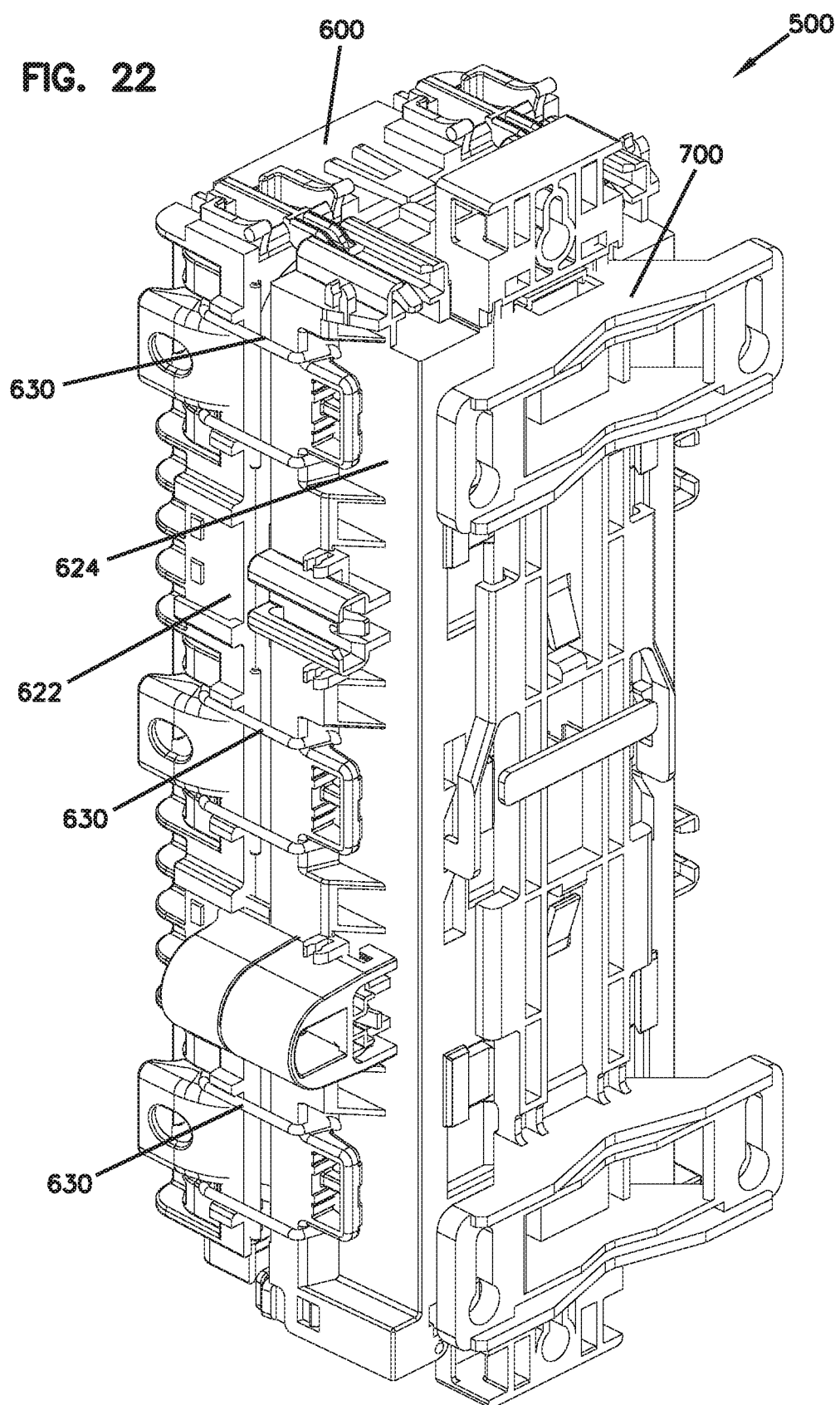
FIG. 22 is a rear isometric view of a fiber optic system shown in a vertical orientation in accordance with another example of the present disclosure.
Figure 23:
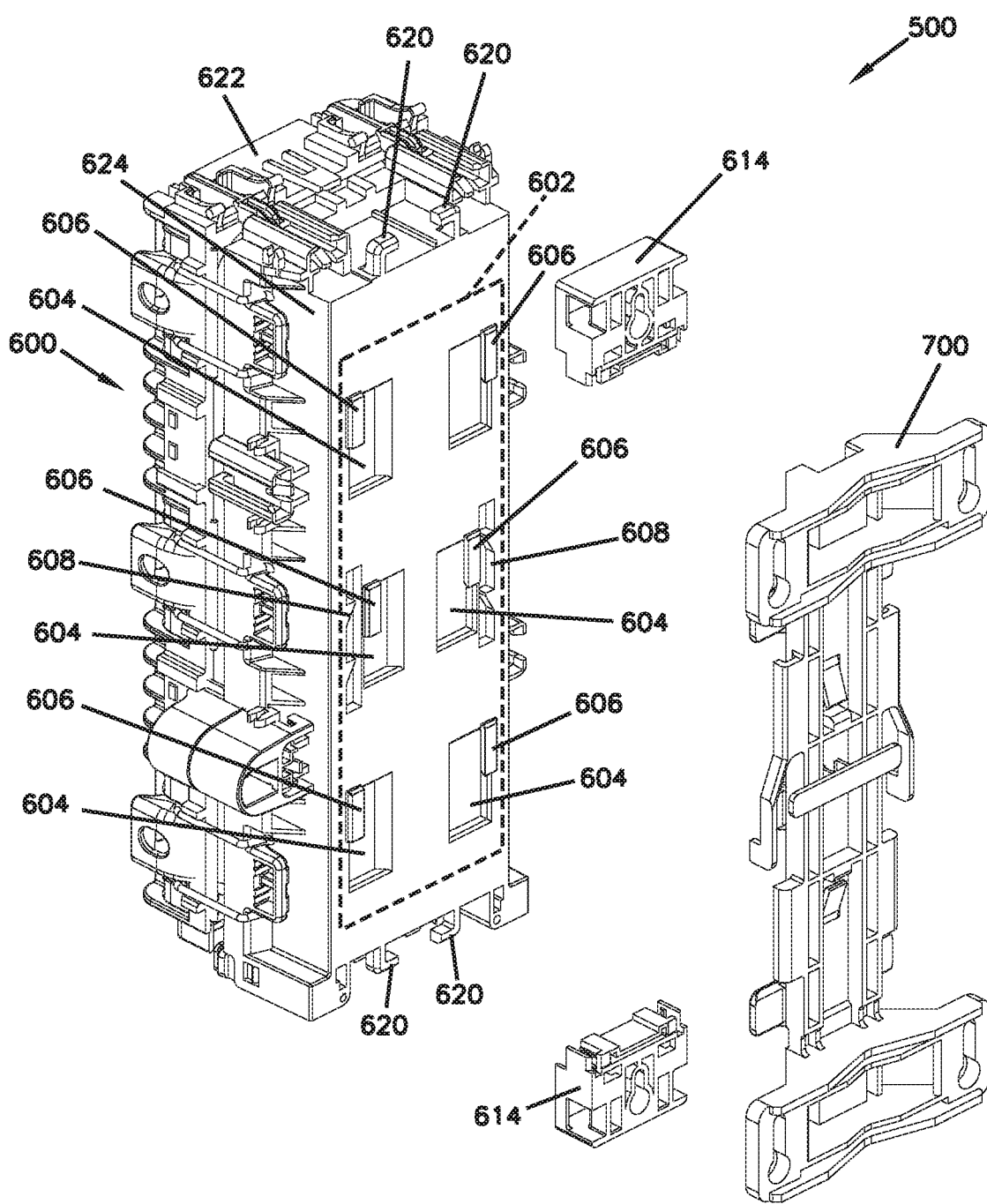
FIG. 23 is an exploded rear isometric view of the fiber optic system of FIG. 22.

FIG. 22 is a rear isometric view of a fiber optic system 500 in accordance with another example of the present disclosure. FIG. 23 is an exploded rear isometric view of the fiber optic system 500. As shown in FIGS. 22 and 23, the fiber optic system 500 includes a telecommunications enclosure 600 and a mounting bracket arrangement 700.

The telecommunications enclosure 600 is similar to the telecommunications enclosures 100 and 300 described above. The telecommunications enclosure 600 can include sealed cable ports that allow cables to be routed into the telecommunications enclosure 600. The telecommunications enclosure 600 can also store fiber optic adapters for making de-mateable connector-to-connector optic connections, optical splices, splice trays, splice holders, passive optical splitters, wavelength division multiplexers, fiber storage trays, and other fiber management structures. The telecommunications enclosure 600 can be environmentally sealed to protect the cables routed inside the enclosure.

As shown in FIG. 22, the telecommunications enclosure 600 includes a cover 622 and a base 624. In some examples, the cover 622 is connected to the base 624 by a hinge, and can open from the front of the telecommunications enclosure 600 without detaching the telecommunications enclosure 600 from the mounting bracket arrangement 700. In some examples, latches 630 can be used to hold the telecommunications enclosure 600 closed and to help compress a sealing between the base 624 and the cover 622.

As shown in FIG. 23, the telecommunications enclosure 600 has a first mechanical interface 602 that includes a plurality of mounting slots 604. Each mounting slot 604 is covered at least in part by a retainer 606. In the example shown in FIG. 23, the first mechanical interface 602 includes six mounting slots 604 and six retainers 606. It is contemplated that in other examples, the number of mounting slots 604 and retainers 606 may vary as may be needed or desired for a particular application, and that therefore the first mechanical interface 602 may include more than or fewer than six mounting slots 604 and associated retainers 606. The first mechanical interface 602 may also have one or more catches 608. In the example depicted in FIG. 23, the mechanical interface 602 includes two catches 608, one on each side of the telecommunications enclosure 600.

Still referring to FIG. 23, the telecommunications enclosure 600 can also include modular mounting features 614. The modular mounting features 614 are snap-fitted onto arms 620 of the telecommunications enclosure 600. The telecommunications enclosure 600 can have arms 620 on a top or bottom (or left and right sides depending on the orientation of the telecommunications enclosure 600) such that the modular mounting features 614 are attachable to a top or bottom (or left and right sides) of the telecommunications enclosure 600. The modular mounting features 614 are described in more detail with reference to FIGS. 27-29.

Figure 24:
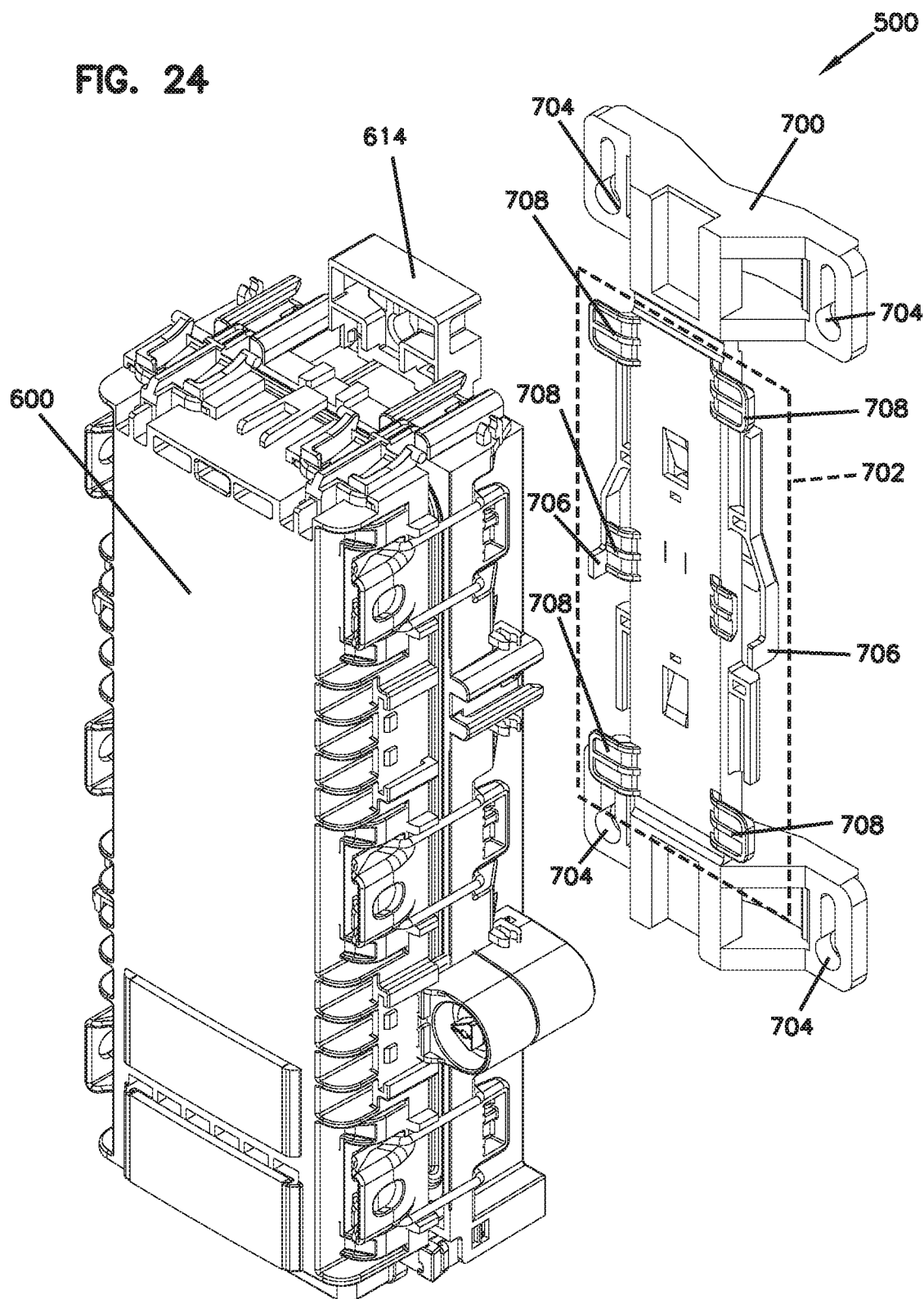
FIG. 24 is a front isometric view of the fiber optic system of FIG. 22 showing a telecommunications enclosure separated from a mounting bracket arrangement.

FIG. 24 is a front isometric view of the fiber optic system 500 showing the telecommunications enclosure 600 detached from the mounting bracket arrangement 700. The mounting bracket arrangement 700 includes a second mechanical interface 702 having one or more side latches 706 and a plurality of mounting tabs 708.

The plurality of mounting tabs 708 are able to slide within the mounting slots 604, and to engage the retainers 606 to hold the telecommunications enclosure 600 together with the mounting bracket arrangement 700.

The one or more side latches 706 are able to engage the one or more catches 608 to prevent the telecommunications enclosure 600 from sliding relative to the mounting bracket arrangement 700, and thereby fix the telecommunications enclosure 600 together with the mounting bracket arrangement 700. The one or more side latches 706 are also able to disengage the one or more catches 608 to allow the telecommunications enclosure 600 to slide relative to the mounting bracket arrangement 700, and thereby release the telecommunications enclosure 600 from the mounting bracket arrangement 700.

The mounting bracket arrangement 700 further includes fastener openings 704 configured to receive fasteners for mounting the mounting bracket arrangement 700 to a structure in the field. Fasteners such as screws, bolts, nails, etc. can be threaded through the fastener openings 704 for mounting the mounting bracket arrangement 700 (and the telecommunications enclosure 600 attached thereto) to structures including a wall of a building, a pole (such as a wooden pole that carries power and telecommunication cables), and/or an underground hand hole box. When mounted to a structure in the field, the fiber optic system 500 can be mounted in either a horizontal orientation or a vertical orientation as may be needed or desired for a particular application.

Figure 25:
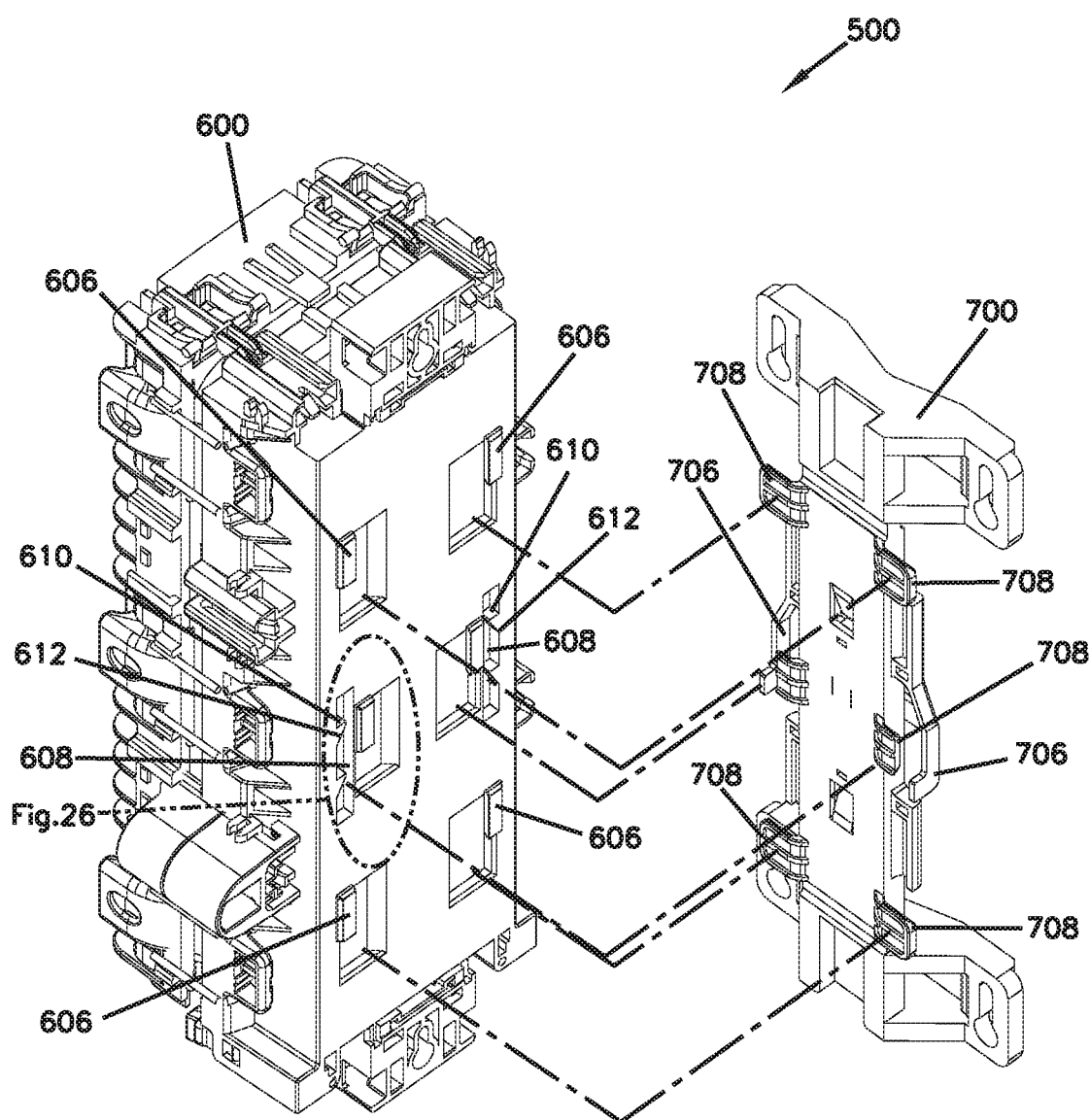
FIG. 25 is an isometric view illustrating a mating between the telecommunications enclosure and the mounting bracket arrangement of FIG. 24.
Figure 26:
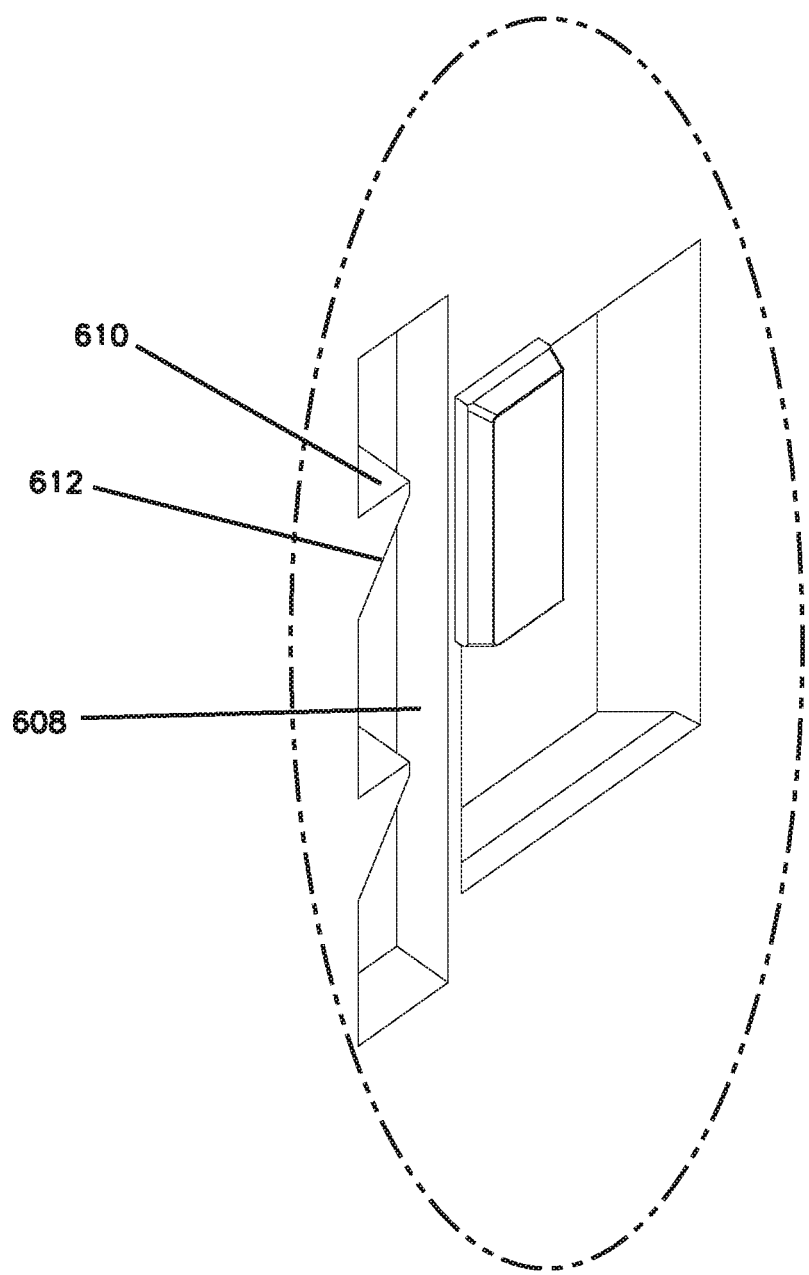
FIG. 26 is a detailed view of FIG. 25.
Figure 27:
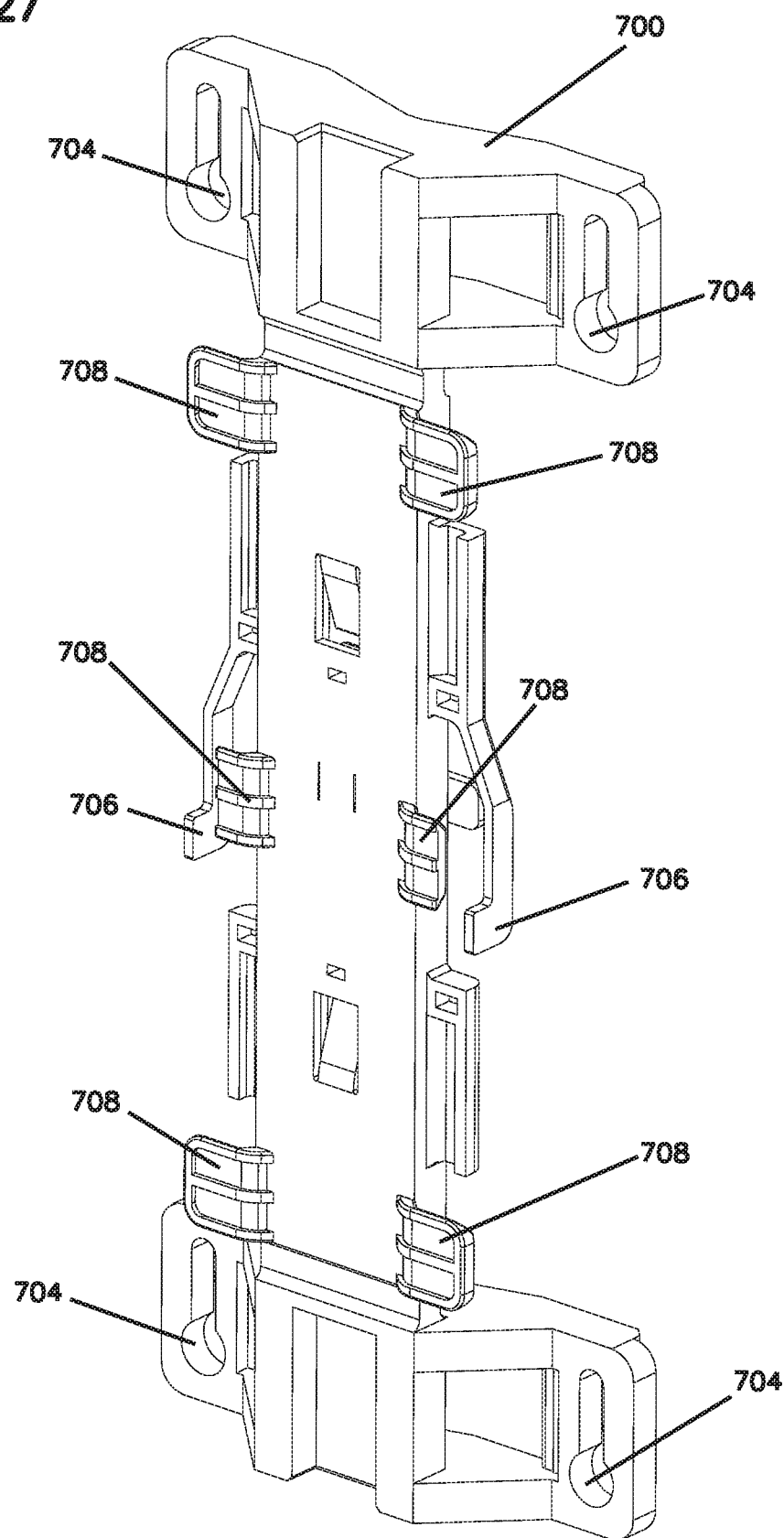
FIG. 27 is a front isometric view of a mounting bracket arrangement in accordance with a third example of the present disclosure.

FIG. 25 is an isometric view illustrating a mating between the telecommunications enclosure 600 and the mounting bracket arrangement 700. FIG. 26 is a detailed view of a catch 608 shown in FIG. 25. FIG. 27 is a front isometric view of the mounting bracket arrangement 700. As shown in FIGS. 25-27, the side latches 706 are flexible arms that are configured to engage and disengage the catches 608 of the telecommunications enclosure 600. Each catch 608 includes at least one orthogonal surface 610 and a sloped surface 612. In the example depicted in the figures, each catch 608 includes two orthogonal surfaces 610 and two sloped surfaces 612. The number of orthogonal surfaces 610 and the number of sloped surfaces 612 may vary as needed or desired. When the side latches 706 engage the orthogonal surfaces 610, the telecommunications enclosure 600 is prevented from sliding with respect to the mounting bracket arrangement 700.

The side latches 706 can flex in a direction toward the center of the mounting bracket arrangement 700 to disengage the orthogonal surfaces 610. When the side latches 706 disengage the orthogonal surfaces 610, the side latches 706 can slide on the sloped surface 612 of each catch 608 such that the telecommunications enclosure 600 can slide relative to the mounting bracket arrangement 700 and thereby allowing the plurality of mounting tabs 708 can disengage the retainers 606 thereby releasing the telecommunications enclosure 600 from the mounting bracket arrangement 700.

Figure 28:
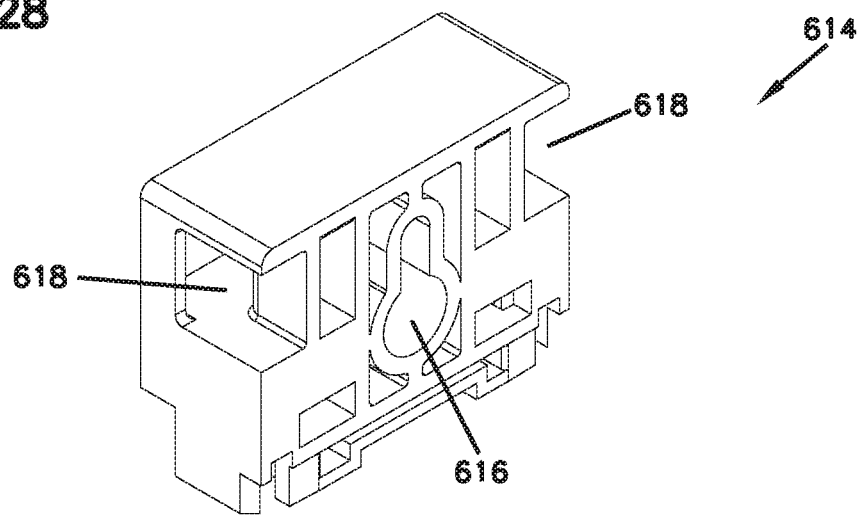
FIG. 28 is a rear isometric view of a mounting feature.
Figure 29:
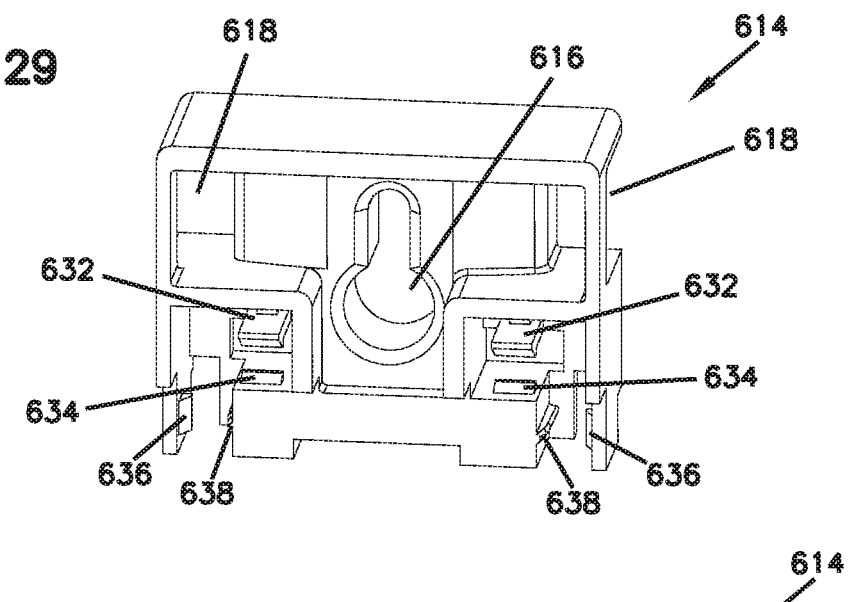
FIG. 29 is a front isometric view of the mounting feature.
Figure 30:
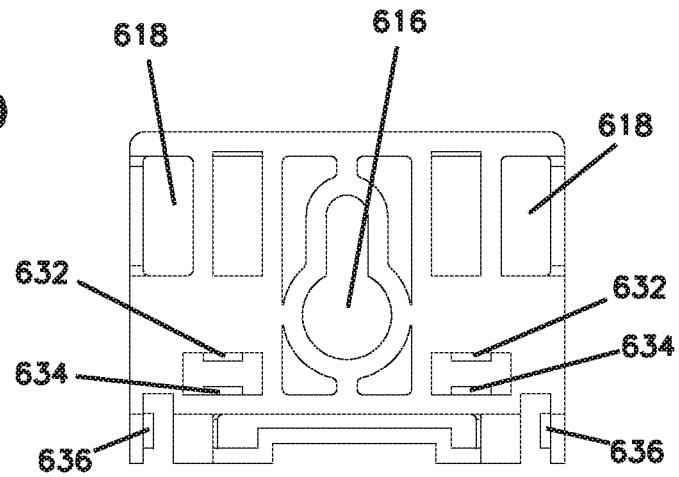
FIG. 30 is a rear view of the mounting feature.
Figure 31:
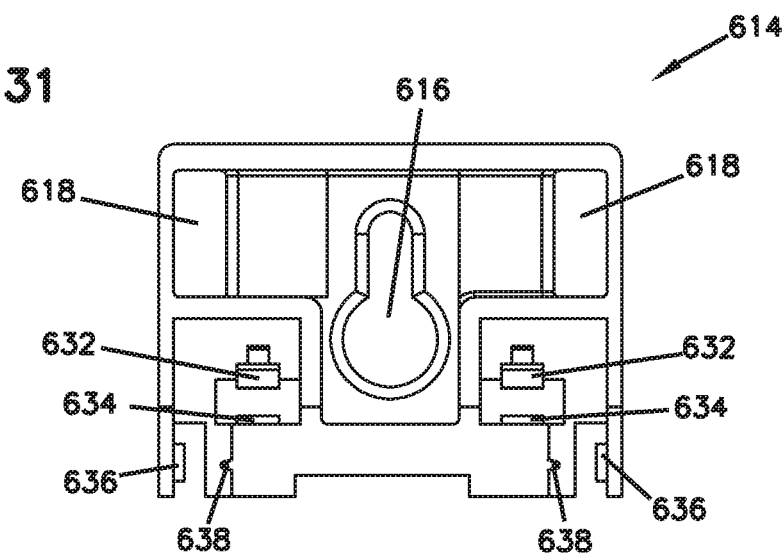
FIG. 31 is a front view of the mounting feature.

FIG. 28 is a rear isometric view of the mounting feature 614. FIG. 29 is a front isometric view of the mounting feature 614. FIG. 30 is a rear view of the mounting feature 614. FIG. 31 is a front view of the mounting feature 614. As shown in FIGS. 28-31, the modular mounting features 614 each define openings 616 that are configured to receive fasteners (e.g., screws, nails, etc.) to help fasten the telecommunications enclosure 600 to a structure in the field. Also, the modular mounting features 614 each define slots 618 that are configured to receive strap clamps.

Figure 32:
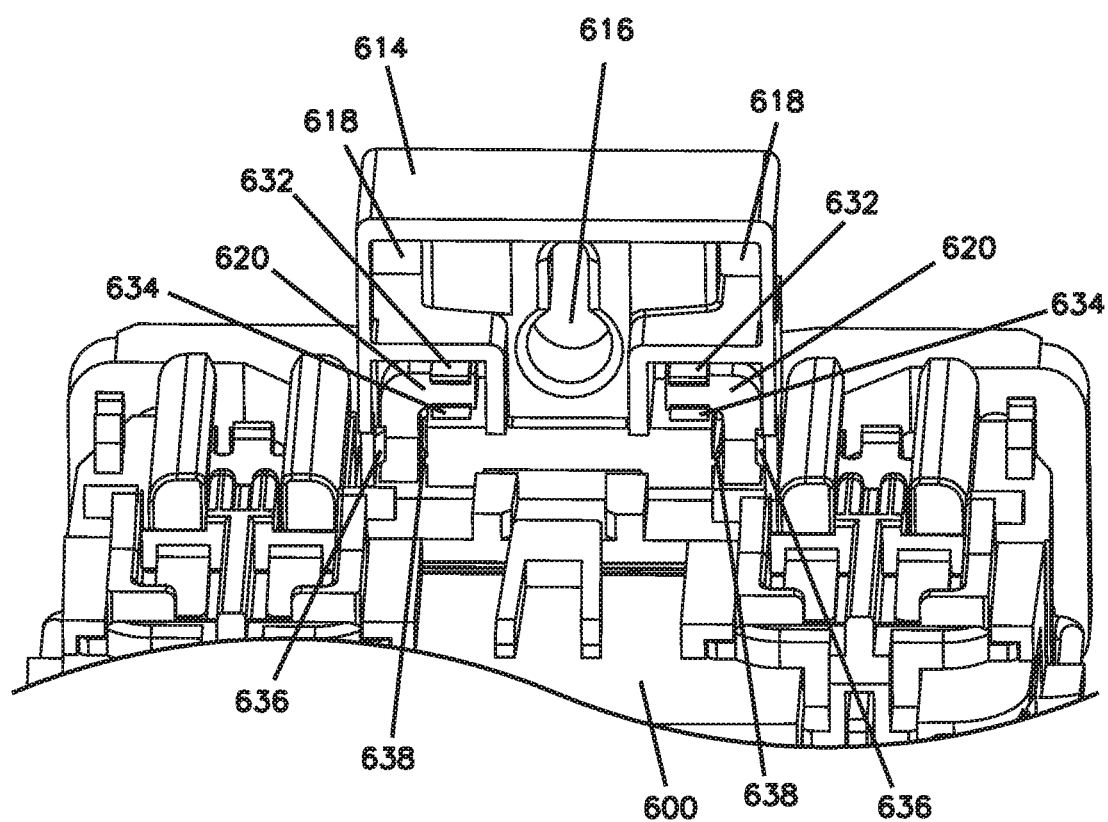
FIG. 32 is a partial isometric view of the mounting feature attached to the telecommunications enclosure.

FIG. 32 is a partial isometric view of the mounting feature 614 attached to the telecommunications enclosure 600. As shown in FIGS. 28-32, the mounting feature 614 includes on each side a beam 632 and a first groove 634. The beam 632 and the first groove 634 are each configured to engage a horizontal portion of an arm 620 of the telecommunications enclosure 600 such that the mounting feature 614 is able to snap-fit onto the telecommunications enclosure 600. Also, the mounting feature 614 includes on each side a second groove 636 and a rail 638. The second groove 636 and the rail 638 are each configured to engage a vertical portion of an arm 620 of the telecommunications enclosure 600 further enhancing the ability of the mounting feature 614 to snap-fit onto the telecommunications enclosure 600. In some examples, the mounting feature 614 is removably attachable to and detachable from the telecommunications enclosure 600.

Figure 33:
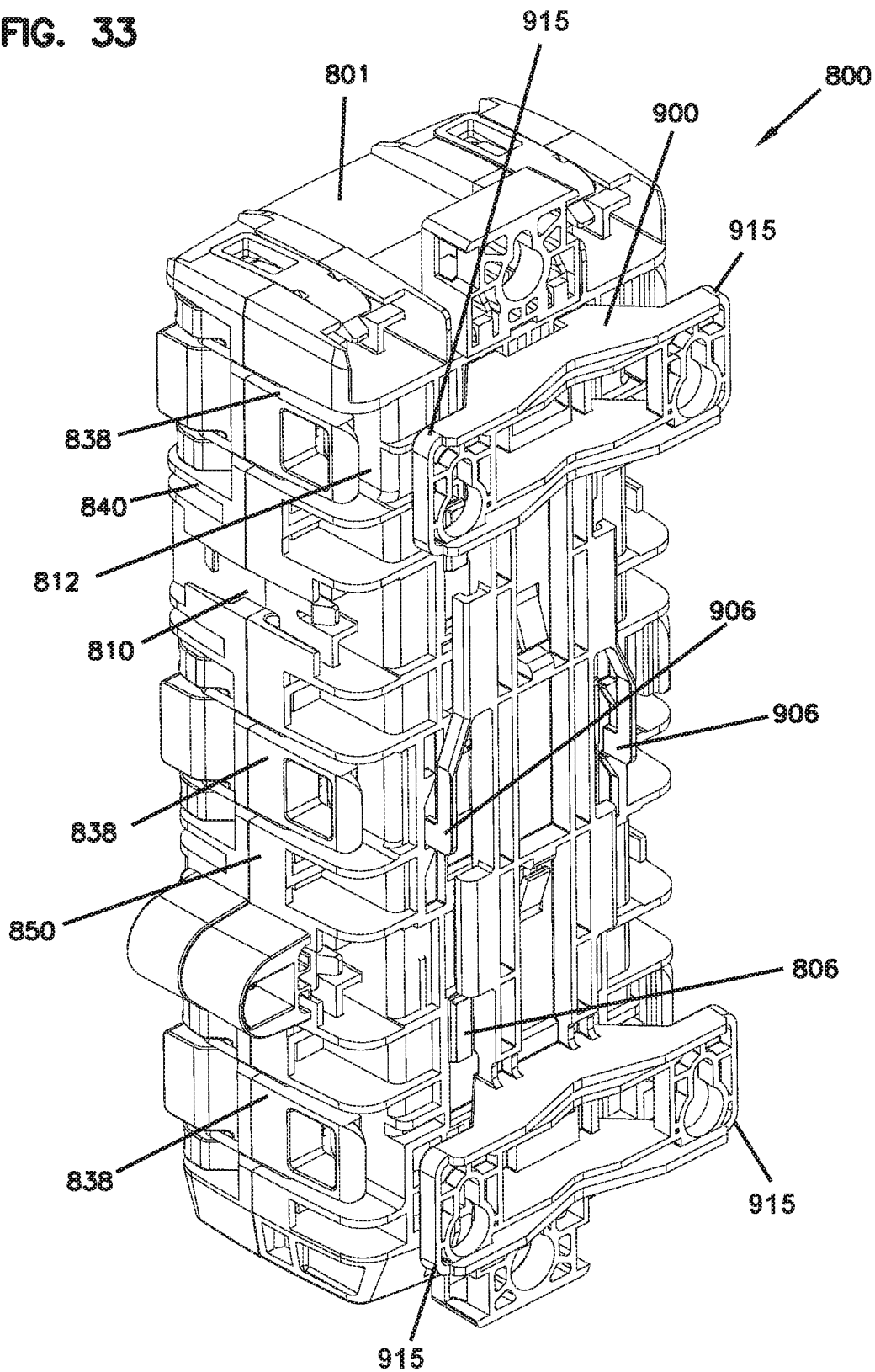
FIG. 33 is a rear isometric view of a fiber optic system shown in a vertical orientation in accordance with another example of the present disclosure.
Figure 34:
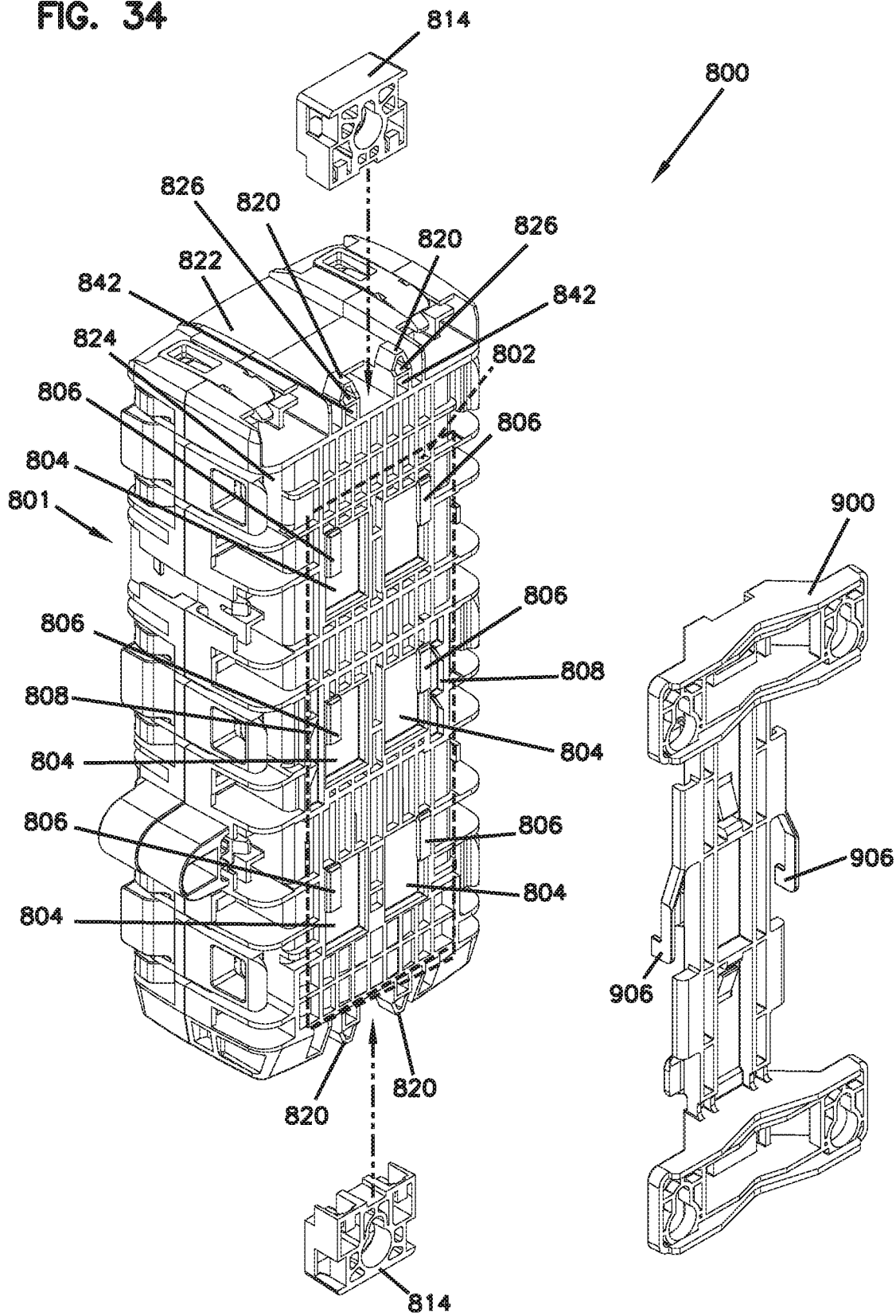
FIG. 34 is an exploded rear isometric view of the fiber optic system of FIG. 33.

FIG. 33 is a rear isometric view of a fiber optic system 800 in accordance with another example of the present disclosure. FIG. 34 is an exploded rear isometric view of the fiber optic system 800. As shown in FIGS. 33 and 34, the fiber optic system 800 includes a telecommunications enclosure 801 and a mounting bracket arrangement 900.

The telecommunications enclosure 801 is similar to the telecommunications enclosures 100, 300, and 600 described above. The telecommunications enclosure 801 includes a cover 810 and a base 812. The cover 810 is connected to the base 812 by a hinge and can open from the front of the telecommunications enclosure 801 without detaching the telecommunications enclosure 801 from the mounting bracket arrangement 900. In some examples, latches 838 can be used to hold the telecommunications enclosure 801 closed and to help compress a sealing between the base 812 and the cover 810.

In some examples, the cover 810 includes security elements positioned on a side surface 840, and the base 812 can include corresponding security elements on a side surface 850. Security elements may also be positioned on the mounting bracket arrangement 900 such as on the corners 915 or elsewhere. The security elements on the cover 810, base 812, and mounting bracket arrangement 900 each have apertures configured to receive a cable tie, wire, cord, string, and the like that can be tied to secure the cover 810 to the base 812, and to secure the cover 810 and the base 812 to the mounting bracket arrangement 900. Also, the security elements when tied together can ensure that the telecommunications enclosure 801 has not been tampered with.

In some examples, the rear portion of the base 812 includes one or more posts and a front portion of the cover 810 includes one or more corresponding apertures configured to receive the posts of the base 812 such that the telecommunications enclosures 801 can be stacked for storage and transport. In some examples, the posts are positioned on the corners of the rear portion of the base 812 and the corresponding apertures on the cover 810 are positioned on the corners of the front portion of the cover 810.

As shown in FIG. 34, the telecommunications enclosure 801 has a first mechanical interface 802 that includes a plurality of mounting slots 804. Each mounting slot 804 is covered at least in part by a retainer 806. In the example shown in FIG. 34, the first mechanical interface 802 includes six mounting slots 804 and six retainers 806. In other examples, the number of mounting slots 804 and retainers 806 may vary as needed such that the first mechanical interface 802 may include more or fewer than six mounting slots 804 and associated retainers 806. The first mechanical interface 802 may also have one or more catches 808. In the example depicted in FIG. 34, the mechanical interface 802 includes two catches 808, one on each side of the telecommunications enclosure 801.

As shown in FIGS. 33 and 34, the fiber optic system 800 includes at least one modular mounting feature 814. Each modular mounting feature 814 is configured to attach onto arms 820 of the telecommunications enclosure 801. In some examples, the modular mounting features 814 are configured to snap-fit onto the arms 820. In the depicted example, two modular mounting features 814 are attached to opposing ends (or sides) of the telecommunications enclosure 801. In other examples, the fiber optic system 800 may include fewer than two modular mounting features 814 or more than two modular mounting features 814 as may be needed or desired. The modular mounting features 814 are described in more detail with reference to FIGS. 37-41.

Figure 35:
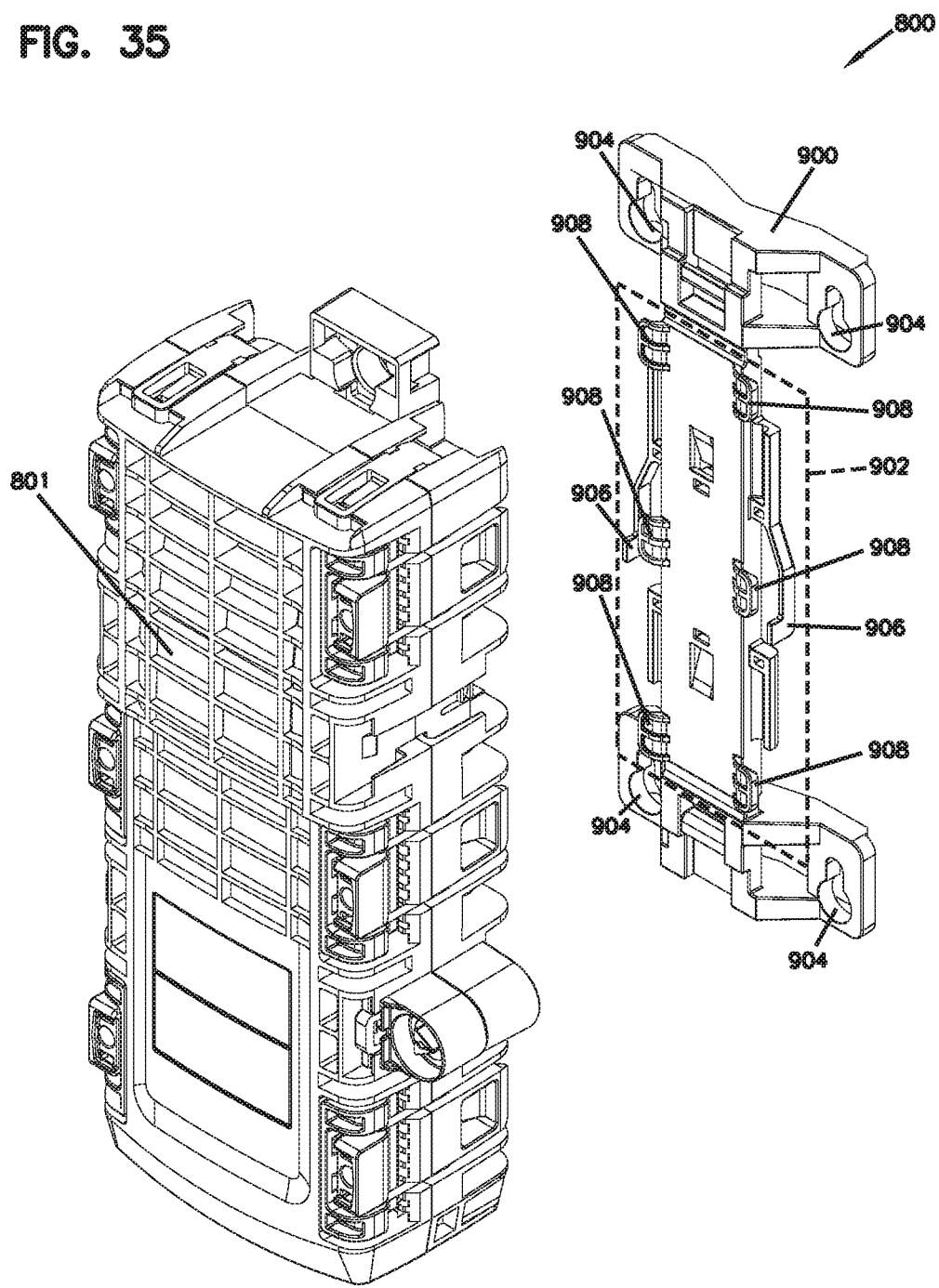
FIG. 35 is a front isometric view of the fiber optic system of FIG. 33 showing a telecommunications enclosure detached from a mounting bracket arrangement.

FIG. 35 is a front isometric view of the fiber optic system 800 showing the telecommunications enclosure 801 detached from the mounting bracket arrangement 900. The mounting bracket arrangement 900 includes a second mechanical interface 902 having one or more side latches 906 and mounting tabs 908. The plurality of mounting tabs 908 are configured to slide within the mounting slots 804 of telecommunications enclosure 801, and to engage the retainers 806 to attach and fix the mounting bracket arrangement 900 to the telecommunications enclosure 801 as shown in FIG. 33.

The side latches 906 are able to flex and engage the catches 808 of the telecommunications enclosure 801 to prevent the mounting bracket arrangement 900 from sliding relative to the telecommunications enclosure 801, and thereby fix the mounting bracket arrangement 900 to the telecommunications enclosure 801. Additionally, the side latches 796 are configured to flex and disengage the catches 808 to allow the mounting bracket arrangement 900 to slide relative to the telecommunications enclosure 801, and thereby release the mounting bracket arrangement 900.

The mounting bracket arrangement 900 further includes fastener openings 904 configured to receive fasteners to attach the mounting bracket arrangement 700 to a structure in the field. Fasteners such as screws, bolts, nails, etc. can be threaded through the fastener openings 904 for mounting the mounting bracket arrangement 900 (and the telecommunications enclosure 801 attached thereto) to structures including a wall of a building, a pole (such as a wooden pole that carries power and telecommunication cables), and/or an underground hand hole box. When mounted to a structure in the field, the fiber optic system 800 can be mounted in either a horizontal orientation or a vertical orientation as may be needed or desired for a particular application.

Figure 36:
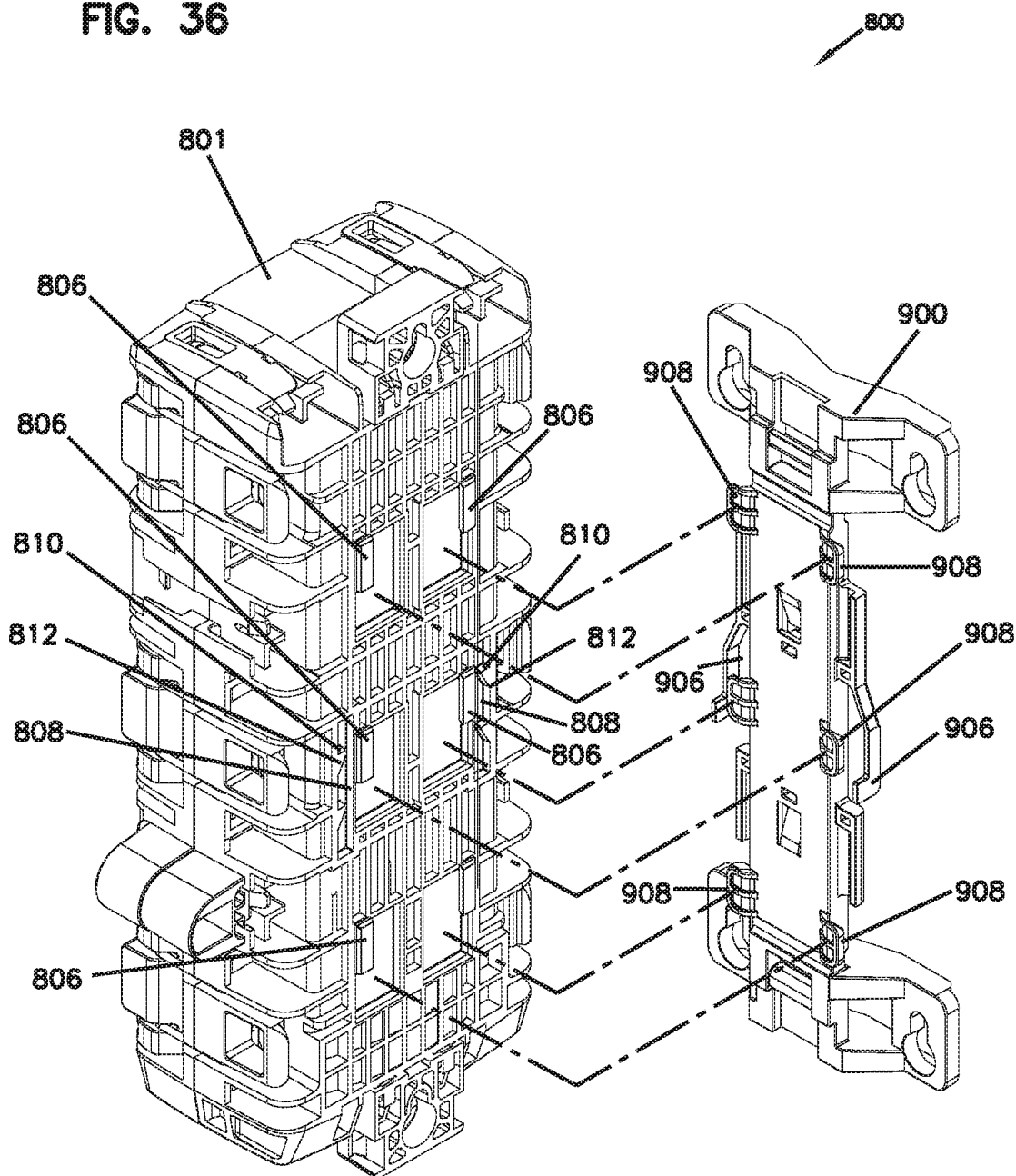
FIG. 36 is an isometric view illustrating a mating between the telecommunications enclosure and the mounting bracket arrangement.
Figure 37:
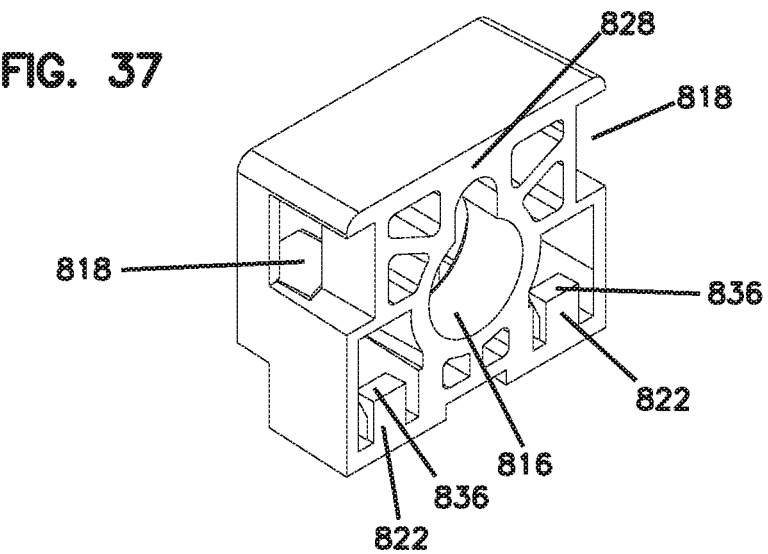
FIG. 37 is a rear isometric view of a mounting feature.
Figure 38:
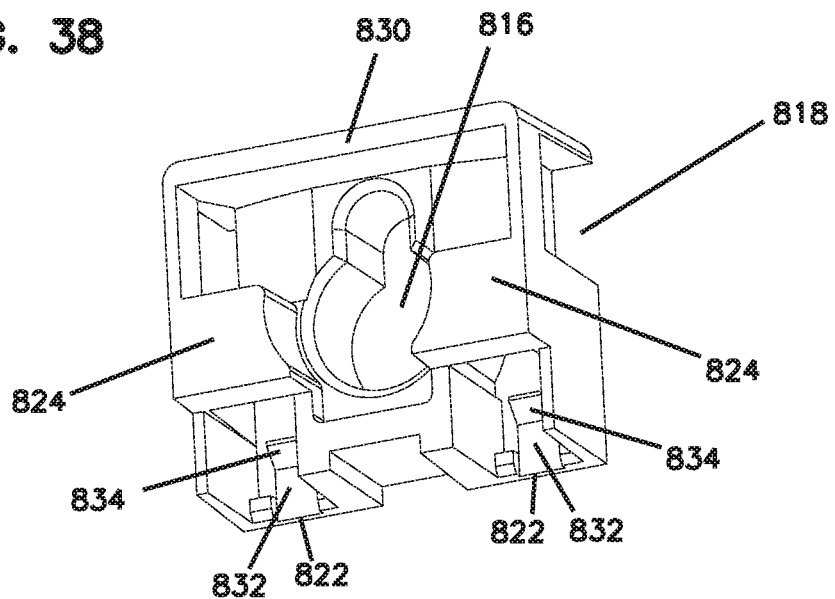
FIG. 38 is a front isometric view of the mounting feature.
Figure 39:
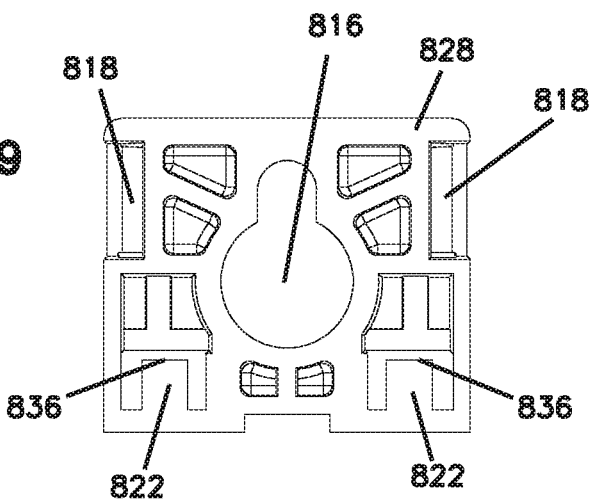
FIG. 39 is a rear view of the mounting feature.
Figure 40:
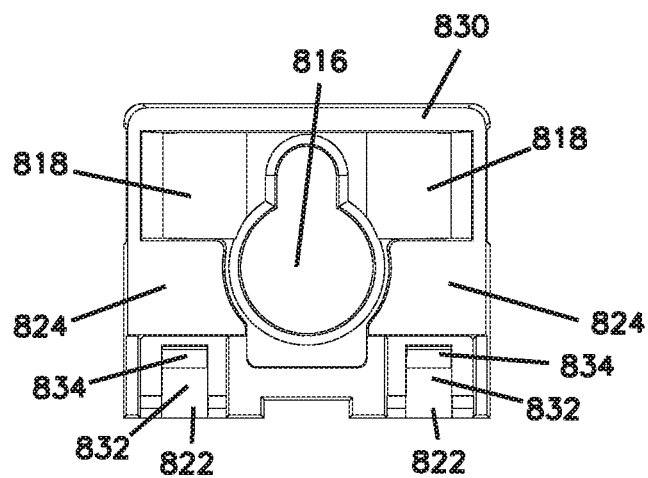
FIG. 40 is a front view of the mounting feature.

FIG. 36 is an isometric view illustrating a mating between the telecommunications enclosure 801 and the mounting bracket arrangement 900. As described above, the side latches 906 are flexible arms that are configured to engage and disengage the catches 808 of the telecommunications enclosure 801. Each catch 808 includes at least one orthogonal surface and a sloped surface like that shown in the detailed view of FIG. 26.

When a side latch 906 engages an orthogonal surface, the mounting bracket arrangement 900 is prevented from sliding with respect to the telecommunications enclosure 801, and is fixed to the telecommunications enclosure 801. The side latches 906 are configured to flex inwardly to disengage the orthogonal surfaces of each catch 808. When the side latches 906 disengage the catches 808, the side latches 906 can slide on the sloped surface of each catch 808 and the mounting bracket arrangement 900 can slide relative to the telecommunications enclosure 801. This allows the mounting tabs 908 to disengage the retainer 806 in each mounting slot 804, and releases the mounting bracket arrangement 900 from the telecommunications enclosure 801.

FIGS. 37-40 are rear isometric, front isometric, rear, and front views, respectively, of the modular mounting feature 814. As shown in FIGS. 37-40, each modular mounting feature 814 has openings 816 that are configured to receive fasteners (e.g., screws, nails, etc.) to fasten the telecommunications enclosure 801 to a structure in the field. Each modular mounting feature 814 also has slots 818 configured to receive strap clamps.

As shown in FIGS. 37-40, each modular mounting feature 814 includes at least one latch 822 positioned on a rear surface 828 and at least one sleeve 824 positioned on a front surface 830. Each latch 822 is flexible and includes an arm portion 832 and a ramp portion 834. Each modular mounting feature 814 is configured to attach to the arms 820 of the telecommunications enclosure 801 in the direction indicated by the arrows shown in FIG. 34. Accordingly, each modular mounting feature 814 is configured to attach to the arms 820 in a direction parallel to the long axis of the telecommunications enclosure 801, and advantageously, access and/or space at the rear of the telecommunications enclosure 801 is not required for attaching the modular mounting features 814.

Figure 41:
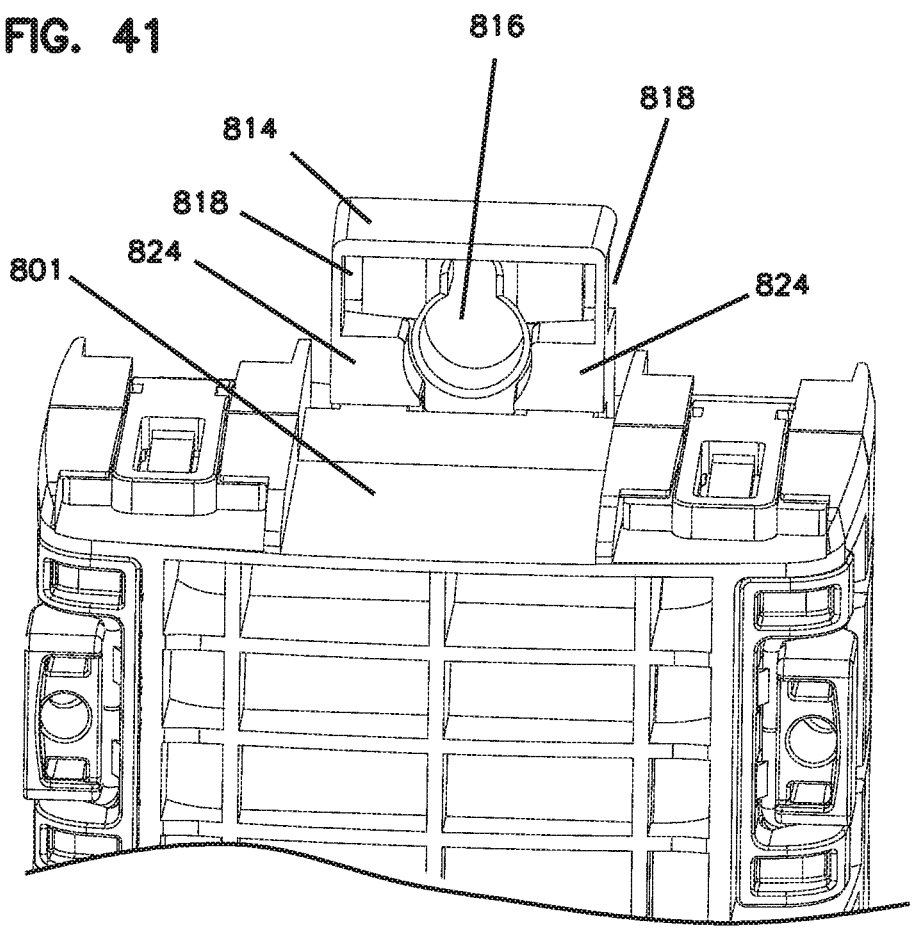
FIG. 41 is a partial isometric view of the mounting feature attached to the telecommunications enclosure.
Figure 42:
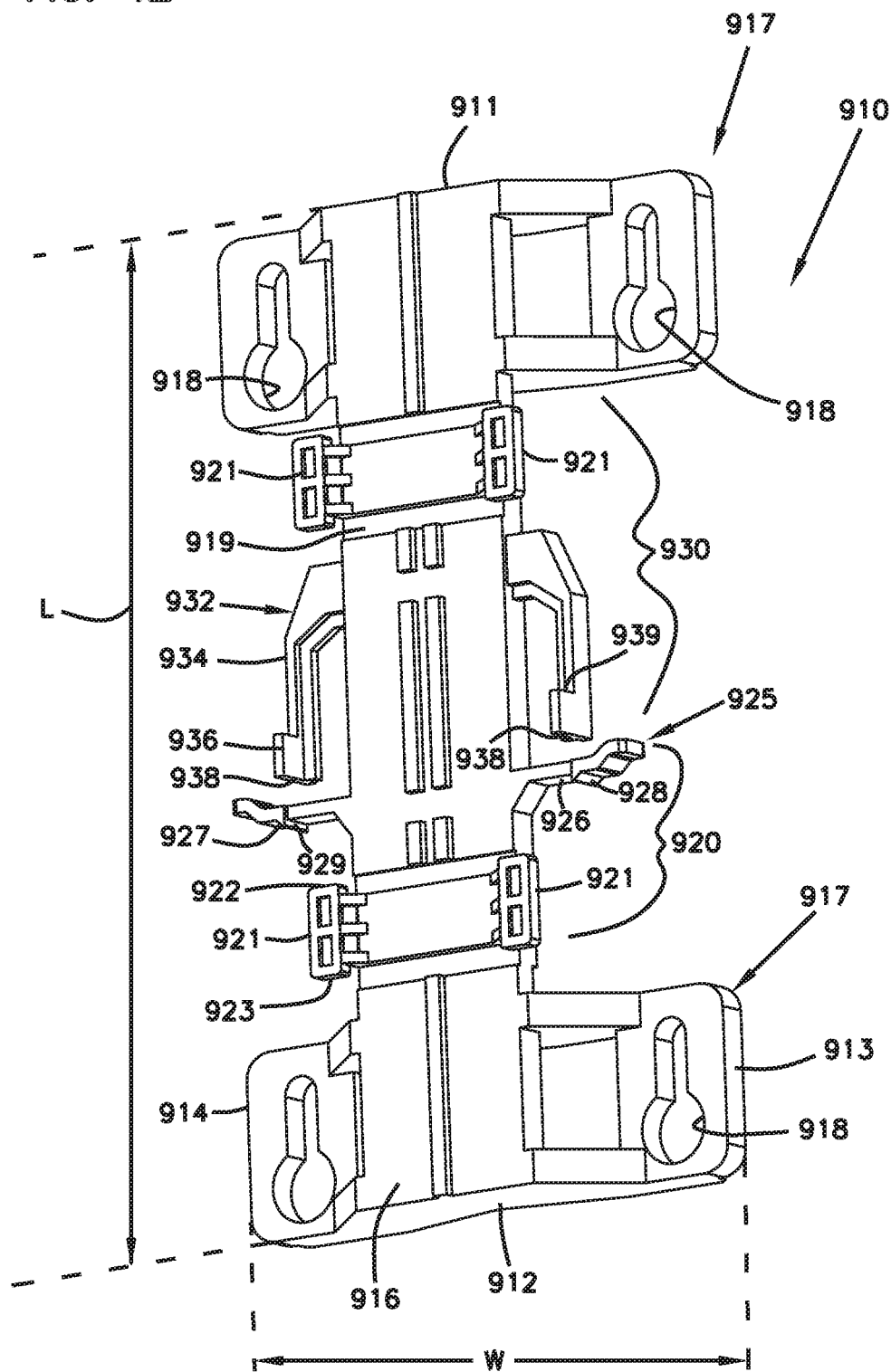
FIG. 42 is an isometric view of an example mounting bracket defining first parts of a slide interface and a snap fit interface for two different mechanical coupling interfaces.

FIG. 41 is a partial isometric view of a modular mounting feature 814 attached to the telecommunications enclosure 801. Referring now to FIGS. 34 and 37-41, each ramp portion 834 is configured to slide against a ledge 826 on each arm 820 of the telecommunications enclosure 801, and each arm portion 832 is configured to flex in a rear direction until the ramp portion 834 slides past the ledge 826 and the latch 822 snaps into an aperture 842 in the arm 820. Simultaneously, each sleeve 824 is slotted parallel to a front surface of each arm 820 such that each sleeve 824 abuts the front surface of the arm 820. An orthogonal surface 836 on each latch 822 prevents the modular mounting feature 814 from being pulled in a direction parallel to the long axis of the telecommunications enclosure 801, and the sleeve 824 prevents the modular mounting feature 814 from being pulled in a direction parallel to the short axis of the telecommunications enclosure 801. Accordingly, each modular mounting feature 814 is configured to snap fit onto the arms 820 of the telecommunications enclosure 801.

FIGS. 42-51 illustrate another fiber optic system 901 that includes a mounting bracket 910 and one or more telecommunications enclosures 950. The mounting bracket 910 has a length L that extends between a first end 911 and a second end 912. The mounting bracket 910 also has a width W that extends between a first side 913 and a second side 914, and a thickness T that extends between a rear 915 and a front 916.

The mounting bracket 910 includes first and second mounting sections 917 spaced apart by an intermediate portion 919. The first and second mounting sections 917 enable the rear 915 (FIG. 44) of the mounting bracket 910 to be secured to a surface (e.g., a wall). Each of the first and second mounting sections 917 defines one or more apertures 918 through which one or more fasteners can be inserted to mount the mounting bracket 910 to the surface. In certain examples, the apertures 918 are keyhole shaped to facilitate the mounting of the mounting bracket 910. Other attachment mechanisms are possible.

A rear 956, 976 of the telecommunications enclosure 950, 970 mounts to the front 916 of the mounting bracket 910. The telecommunications enclosure 950, 970 extends along a length between a first end 951, 971 and a second end 952, 972, along a width between a first side 953, 973 and a second side 954, 974, and along a depth between a front 955, 975 and the rear 956, 976. The enclosure 950, 970 defines an interior accessible through an access aperture at the front 955, 975 of the enclosure 950, 970. Various components (e.g., cable management guides, cable storage spools, optical adapters, optical splices, optical power splitters, optical couplers, wave division multiplexers, active-to optical converters, etc.) can be mounted within the interior.

The telecommunications enclosure 950, 970 and the mounting bracket 910 together define a mechanical coupling interface for securing the telecommunications enclosure 950, 970 and the mounting bracket 910 together. The mechanical coupling interface includes a slide interface that mates together by a sliding motion in a first dimension D1 and that prevents relative movement between the mounting bracket 910 and the telecommunications enclosure 950, 970 in second and third dimensions D2, D3 when the slide interface is mated together.

The mechanical coupling interface also includes a snap-fit interface that snaps from an unlatched configuration to a latched configuration when the slide interface is mated together by the sliding motion in the first dimension D1. The telecommunications enclosure 950, 970 and the mounting bracket 910 are moveable relative to one another along the first dimension D1 when in the unlatched configuration to allow the telecommunications enclosure 950, 970 and the mounting bracket 910 to be disconnected from one another. The snap-fit interface prevents relative movement between the mounting bracket 910 and the telecommunications enclosure 950, 970 along the first dimension D1 when in the latched configuration. The snap-fit interface is moveable between the latched configuration and the unlatched configuration by flexing a resilient latch arrangement 925, 932 of the snap-fit interface.

The mechanical coupling interface allows the telecommunications enclosure 950, 970 to be mounted to the mounting bracket 910 in first and second enclosure mounting orientations. The telecommunications enclosure 950, 970 is rotated 180 degrees relative to the mounting bracket 910 about the second dimension D2 when in the first enclosure mounting orientation as compared to the second enclosure mounting orientation.

In certain examples, the first, second, and third dimensions are all perpendicular relative to one another. In some examples, the first dimension D1 is parallel to the width of the enclosure 950, the second dimension D2 is parallel to the depth of the enclosure 950, and the third dimension D3 is parallel to the length of the enclosure 950 (see FIGS. 43-45). In other examples, the first dimension D1 is parallel to length of the enclosure 970, the second dimension D2 is parallel to the depth of the enclosure 970, and the third dimension D3 is parallel to the width of the enclosure 970 (see FIGS. 46-51).

Referring back to FIGS. 42 and 43, the mounting bracket 910 includes a first mechanical interface 920 configured to mate with a corresponding mechanical interface 960 (see FIG. 43) at the rear 956 of a first type of enclosure 950 to form an example of the mechanical coupling interface. Each of the mechanical interfaces 920, 960 includes a corresponding part of a slide interface and a corresponding part of a snap-fit interface.

The mounting bracket 910 also includes a second mechanical interface 930 configured to mate with a corresponding mechanical interface 980 at the rear 976 of a second type of enclosure 970 to form another example of the mechanical coupling interface described above. Each of the mechanical interfaces 930, 980 includes a corresponding part of a slide interface and a corresponding part of a snap-fit interface.

The first mechanical interface 920 of the mounting bracket 910 includes a tab arrangement that forms the first part of the slide interface. The tab arrangement includes a tab 921 extending outwardly from the intermediate portion 919 of the mounting bracket 910. In some examples, the tab 921 is stationary relative to the intermediate portion 919. In some examples, the tab 921 can flex along a thickness T of the mounting bracket 910. In other examples, the tab 921 cannot flex along the length L or width W of the mounting bracket 910. The tab 921 defines a first shoulder 922 facing towards the first end 911 of the mounting bracket 910, a second shoulder 923 facing towards the second end 912 of the mounting bracket 910, and an engagement surface 924 (see FIG. 44) facing away from the enclosure 950, 970 when mounted to the mounting bracket 910.

The tab arrangement includes multiple tabs 921. In certain examples, first and second tabs 921 extend outward from opposite sides of the intermediate portion 919. In certain examples, a first set of tabs 921 is spaced along the length L of the mounting bracket 910 from a second set of tabs 921. Each set of tabs 921 includes first and second tabs 921 extending outwardly from opposite sides of the intermediate portion 919.

The first mechanical interface 920 also includes a resilient latch arrangement 925 that forms the first part of the snap-fit interface. In certain examples, the resilient latch arrangement 925 includes a latch arm 926 that extends outwardly from the intermediate portion 919 of the mounting bracket 910. The latch arm 926 is resiliently flexible relative to the intermediate portion 919. The latch arm 926 carries a latch member 927 so that the latch member 927 moves at least partially along the length L of the mounting bracket 910 when the latch arm 926 flexes. The latch member 927 includes an outwardly-facing ramped surface 928 that faces away from the intermediate portion 919 and an inwardly-facing shoulder 929 that faces towards the intermediate portion 919 (see FIG. 42).

In certain examples, the resilient latch arrangement 925 includes two latch arms 926 extending from opposite sides of the intermediate portion 919. In certain examples, the two latch arms 926 are located between the first set of tabs 921 and the second set of tabs 921 of the slide interface. In certain examples, the latch member 927 of each latch arm 926 extends in a common direction (e.g., down in FIG. 42) so that the shoulders 929 of the latch members 927 laterally align with each other.

In certain implementations, the second mechanical interface 930 of the mounting bracket 910 includes a tab arrangement that forms the first part of the slide interface. In certain examples, the tab arrangement of the second mechanical interface 930 is the tab arrangement of the first mechanical interface 920.

The second mechanical interface 930 includes a resilient latch arrangement 932 that forms the first part of the snap-fit interface. In certain examples, the resilient latch arrangement 932 includes a latch arm 934 that extends outwardly from the intermediate portion 919 of the mounting bracket 910. The latch arm 934 is resiliently flexible relative to the intermediate portion 919. The latch arm 934 carries a latch member 936 so that the latch member 936 moves at least partially along the thickness T of the mounting bracket 910 when the latch arm 934 flexes. The latch member 936 has a first shoulder 938 that faces towards the second end 912 of the mounting bracket 910 and a second shoulder 939 that faces towards the first end 911 of the mounting bracket 910.

In certain examples, the resilient latch arrangement 932 includes two latch arms 934 extending from opposite sides of the intermediate portion 919. In certain examples, the two latch arms 934 are located between the first set of tabs 921 and the second set of tabs 921 of the slide interface. In certain examples, the latch member 936 of each latch arm 934 extends in a common direction (e.g., down in FIG. 42) so that the first shoulders 938 of the latch members 936 laterally align with each other and the second shoulders 939 of the latch members 936 laterally align with each other. The second shoulders 939 face in an opposite direction from the first shoulders 938. For example, the first shoulders 938 may face towards the second end 912 of the mounting bracket 910 and the second shoulders 939 may face towards the first end 911 of the mounting bracket 910.

Figure 43:
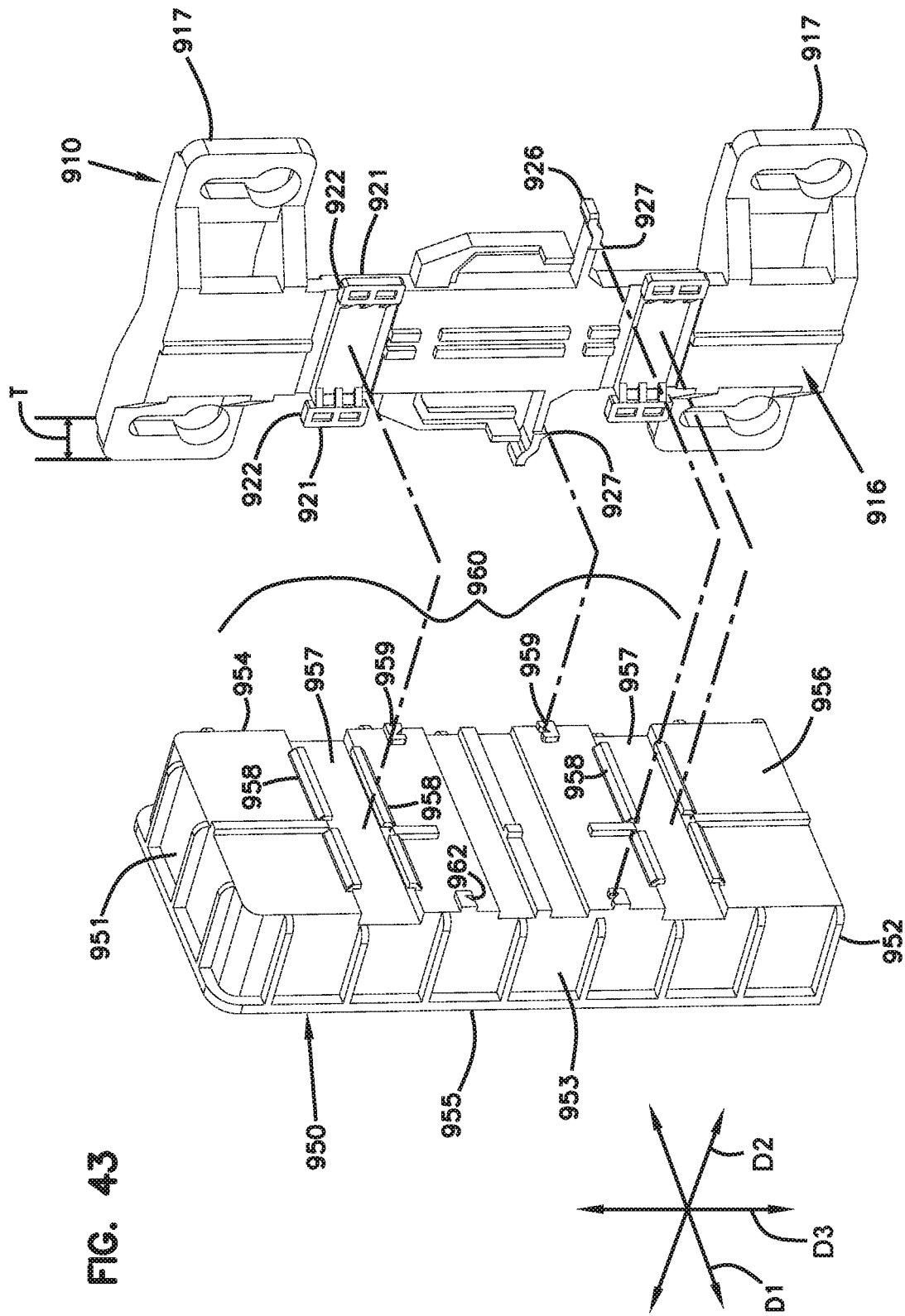
FIG. 43 shows a first type of enclosure exploded outwardly from the mounting bracket of FIG. 42 so that second parts of the slide interface and snap fit interface of a first mechanical coupling interface are visible on the enclosure.
Figure 44:
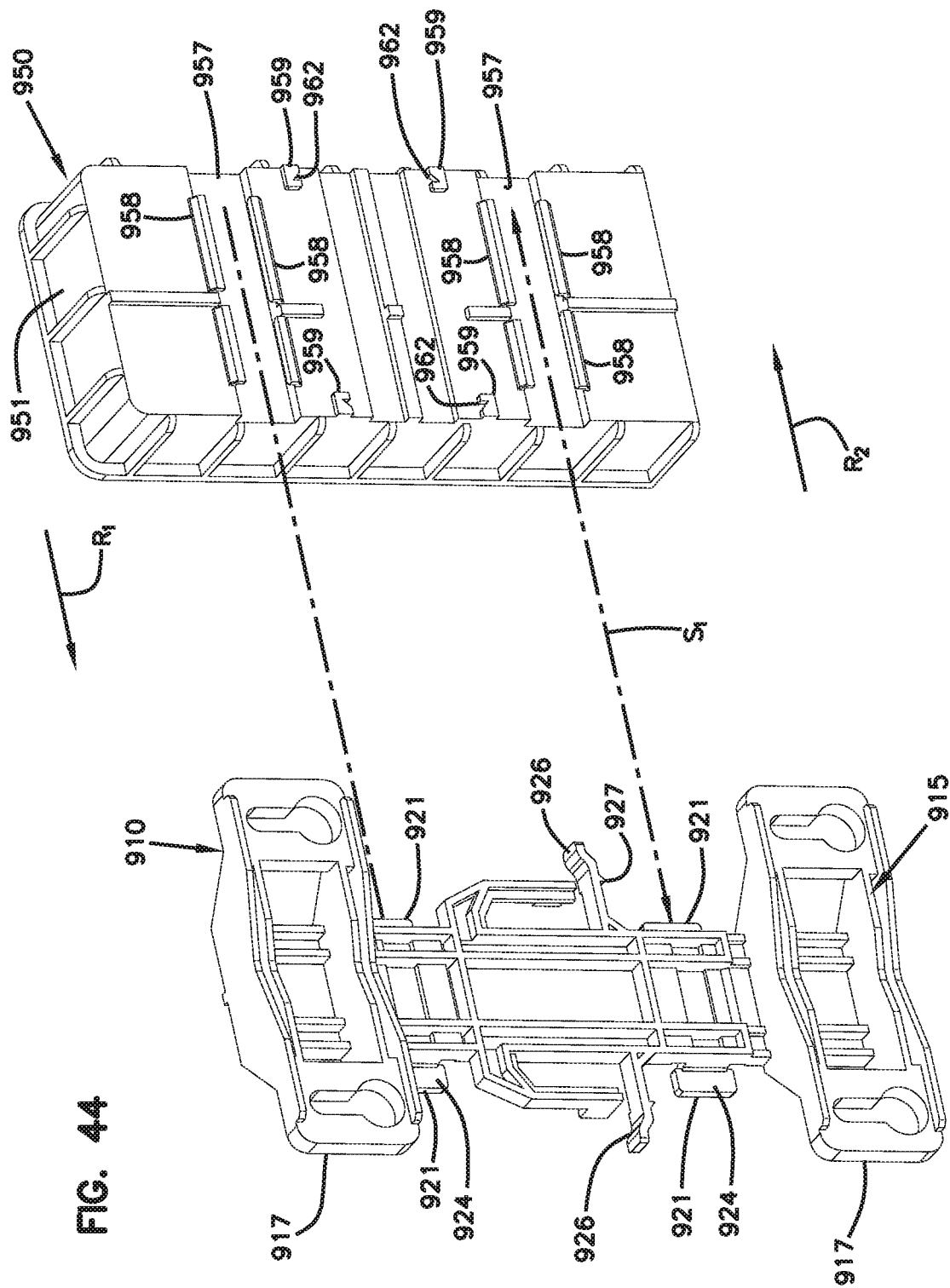
FIG. 44 shows the enclosure sliding onto the mounting bracket of FIG. 43.
Figure 45:
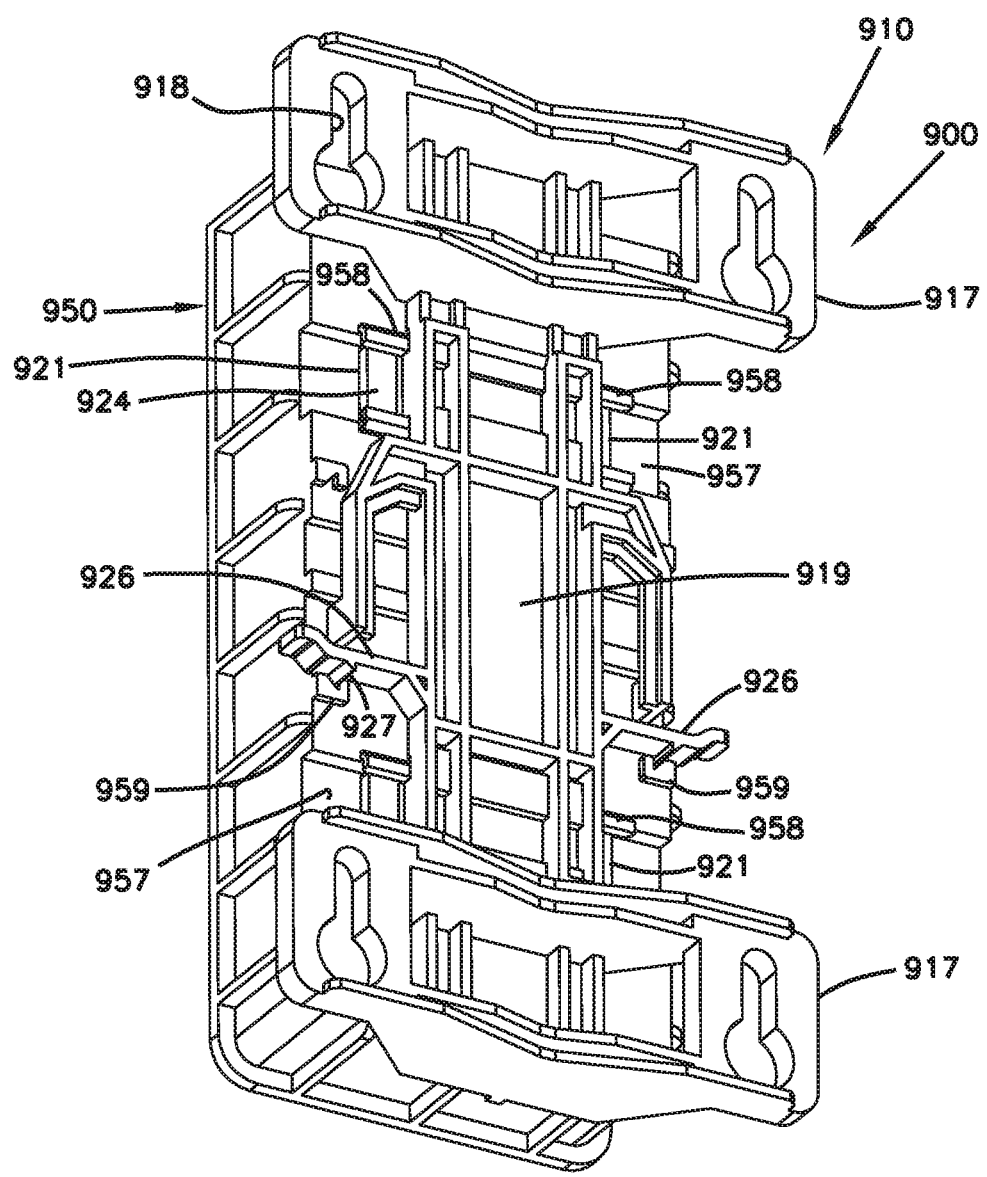
FIG. 45 shows the enclosure and mounting bracket of FIG. 43 in a latched configuration.

Referring to FIGS. 43-45, the mechanical coupling interface between the first mechanical interface 920 of the mounting bracket 910 and a mechanical interface 960 of the first type of enclosure 950 is shown. The first dimension D1 of the first mechanical interface 920 and the mechanical interface 960 extends parallel to the width W of the mounting bracket 910. The second dimension D2 of the first mechanical interface 920 and the mechanical interface 960 extends parallel to the thickness T of the mounting bracket 910. The third dimension D3 of the first mechanical interface 920 and the mechanical interface 960 extends parallel to the length L of the mounting bracket 910.

The mechanical coupling interface allows the telecommunications enclosure 950 to be mechanically coupled to the mounting bracket 910 by sliding the telecommunications enclosure 950 along the first dimension D1 to mate together the slide interface and to snap the snap-fit interface into the latched configuration. In certain implementations, the first mechanical interface 920 and the mechanical interface 960 allow the telecommunications enclosure 950 to be mechanically coupled to the mounting bracket 910 by sliding the telecommunications enclosure 950 in a first direction R1 along the first dimension D1 (e.g., along a first slide axis S1) to mate together the slide interface and to snap the snap-fit interface into the latched configuration. The first mechanical interface 920 and the mechanical interface 960 also allow the telecommunications enclosure 950 to be mechanically coupled to the mounting bracket 910 by sliding the telecommunications enclosure 950 in a second direction R2 along the first dimension D1 (e.g., along the first slide axis S1) to mate together the slide interface and to snap the snap-fit interface into the latched configuration. The second direction R2 is opposite with respect to the first direction R1. In certain examples, the enclosure 950 may be disposed in the same orientation regardless of whether the enclosure 950 is slid along the first direction R1 or the second directions R2.

As shown in FIG. 43, the rear 956 of the enclosure 950 defines the mechanical interface 960. The mechanical interface 960 includes one or more channels 957 along which the tabs 921 of the first mechanical interface 920 of the mounting bracket 910 can slide. The channels 957 extend along the first dimension D1 (e.g., along the width of the enclosure 950). Rails 958 disposed at opposite sides of the channels 957 extend at least partially over the tab(s) 921 (e.g., partially over the engagement surface 924) to retain the tab(s) 921 in the channels 957. The rails 958 inhibit movement of the tab(s) 921 relative to the enclosure 950 in the second dimension D2 (e.g., along the depth of the enclosure 950). The rails 958 and/or recessed channels 957 also may inhibit movement of the tab(s) 921 relative to the enclosure 950 in the third dimension D3 (e.g., along the length of the enclosure 950). Accordingly, the channels 957 and/or rails 958 define the second part of the slide interface of the mechanical coupling interface.

The mechanical interface 960 also includes the second part of the snap-fit interface of the mechanical coupling interface. The second part of the snap-fit interface includes a catch arrangement that engages the latch member(s) 927 of the resilient latch arrangement 925. The catch arrangement includes one or more catches 959 each defining a recessed shoulder 962. The recessed shoulder 962 of each catch 959 faces outwardly towards the closest side 953, 954 of the enclosure 950.

In certain implementations, the catch arrangement includes first and second catches 959 disposed in lateral alignment at the rear 956 of the enclosure 950 towards the first and second sides 953, 954, respectively. When the enclosure 950 is slid onto the mounting bracket 910, the latch member 927 of a first latch arm 926 slides over the first catch 959 at the first side 953 of the enclosure. The ramped surface 928 of the latch member 927 allows the latch member 927 to slide over the first catch 959 without being caught at the recessed shoulder 962. As the enclosure 950 continues to slide relative to the mounting bracket 910, the latch member 927 of the first latch arm 926 engages the second catch 959 and snaps into the recess defined by the second catch 959. The shoulder 929 of the latch member 927 of the first latch arm 926 abuts the recessed shoulder 962 of the second catch 959. A latch member 927 of the second latch arm 926 of the resilient latch arrangement 925 engages the first catch 959 snaps into the recessed defined by the first catch 959. The shoulder 929 of the latch member 927 of the second latch arm 926 abuts the recessed shoulder 962 of the first catch 959. This configuration of the enclosure 950 and mounting bracket 910 is referred to as the latched configuration.

The abutment between the shoulders of the first latch arm 926 and the second catch 959 inhibit movement of the enclosure 950 in a first direction and the abutment between the shoulders of the second latch arm 926 and the first catch 959 inhibit movement of the enclosure 950 in an opposite second direction. Accordingly, the snap-fit interface inhibits movement of the enclosure 950 relative to the mounting bracket 910 along the first dimension D1.

Referring to FIGS. 46-51, the mechanical coupling interface between the second mechanical interface 930 of the mounting bracket 910 and a mechanical interface 980 of the second type of enclosure 970 is shown. The first dimension D1 of the second mechanical interface 930 and the corresponding mechanical interface 980 extends parallel to the length L of the mounting bracket 910. The second dimension D2 of the second mechanical interface 930 and the corresponding mechanical interface 980 extends parallel to the thickness T of the mounting bracket 910. The third dimension D3 of the second mechanical interface 930 and the corresponding mechanical interface 980 extends parallel to the width W of the mounting bracket 910.

The mechanical coupling interface between the second mechanical interface 930 and the corresponding mechanical interface 980 allows the telecommunications enclosure 970 to be mechanically coupled to the mounting bracket 910 by sliding the telecommunications enclosure 970 along the first dimension D1 to mate together the slide interface and to snap the snap-fit interface into the latched configuration. The second mechanical interface 930 and the mechanical interface 980 allow the telecommunications enclosure 970 to be mechanically coupled to the mounting bracket 910 by sliding the telecommunications enclosure 970 in a first direction R3 along the first dimension D1 (e.g., along a second slide axis S2) to mate together the slide interface and to snap the snap-fit interface into the latched configuration. The second mechanical interface 930 and the mechanical interface 980 also allow the telecommunications enclosure 970 to be mechanically coupled to the mounting bracket 910 by sliding the telecommunications enclosure 970 in a second direction R4 along the first dimension D1 (e.g., along the second slide axis S2) to mate together the slide interface and to snap the snap-fit interface into the latched configuration. The second direction R4 is opposite the first direction R3.

Figure 47:
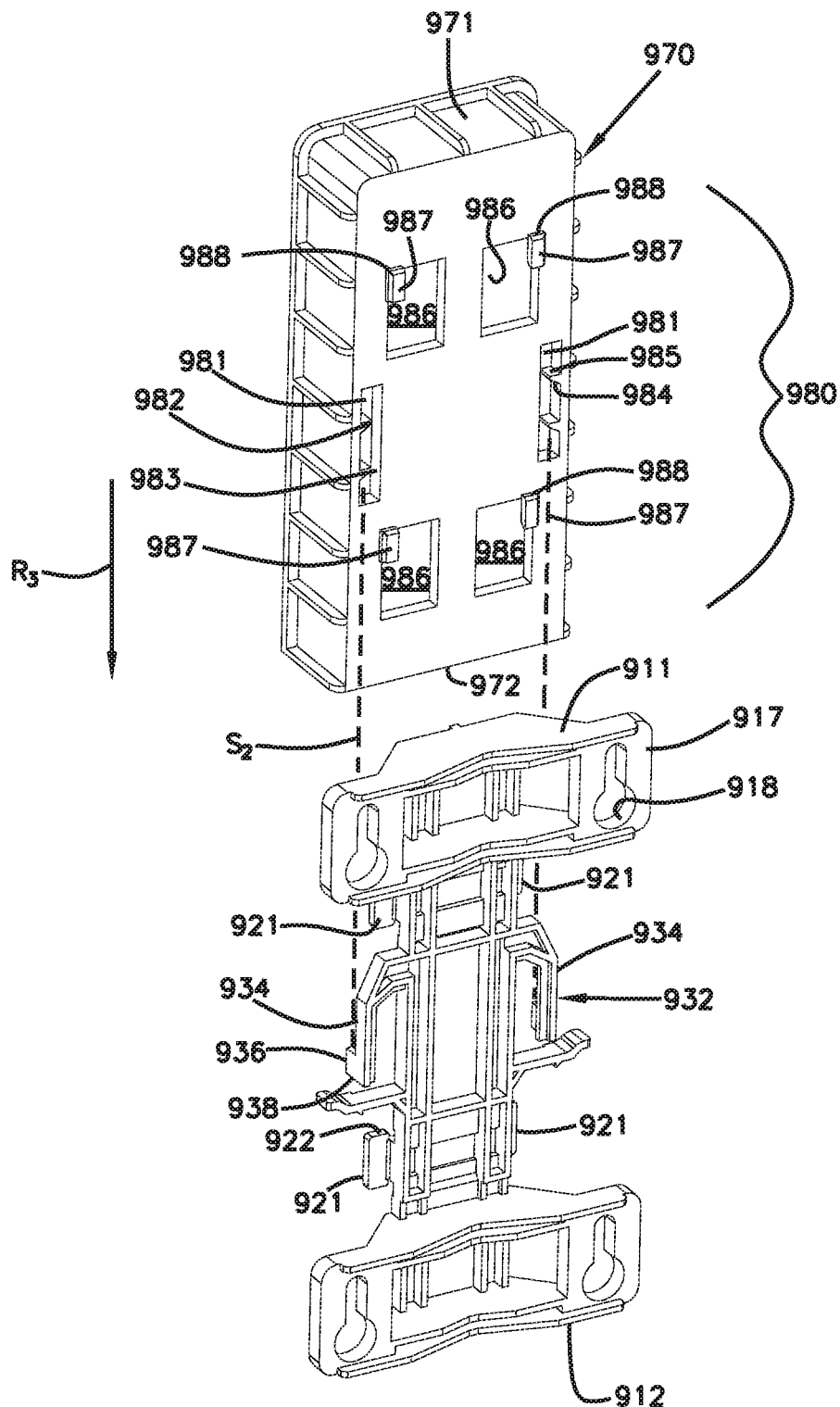
FIG. 47 shows the enclosure sliding onto the mounting bracket of FIG. 46 in a first direction and while in a first orientation.
Figure 50:
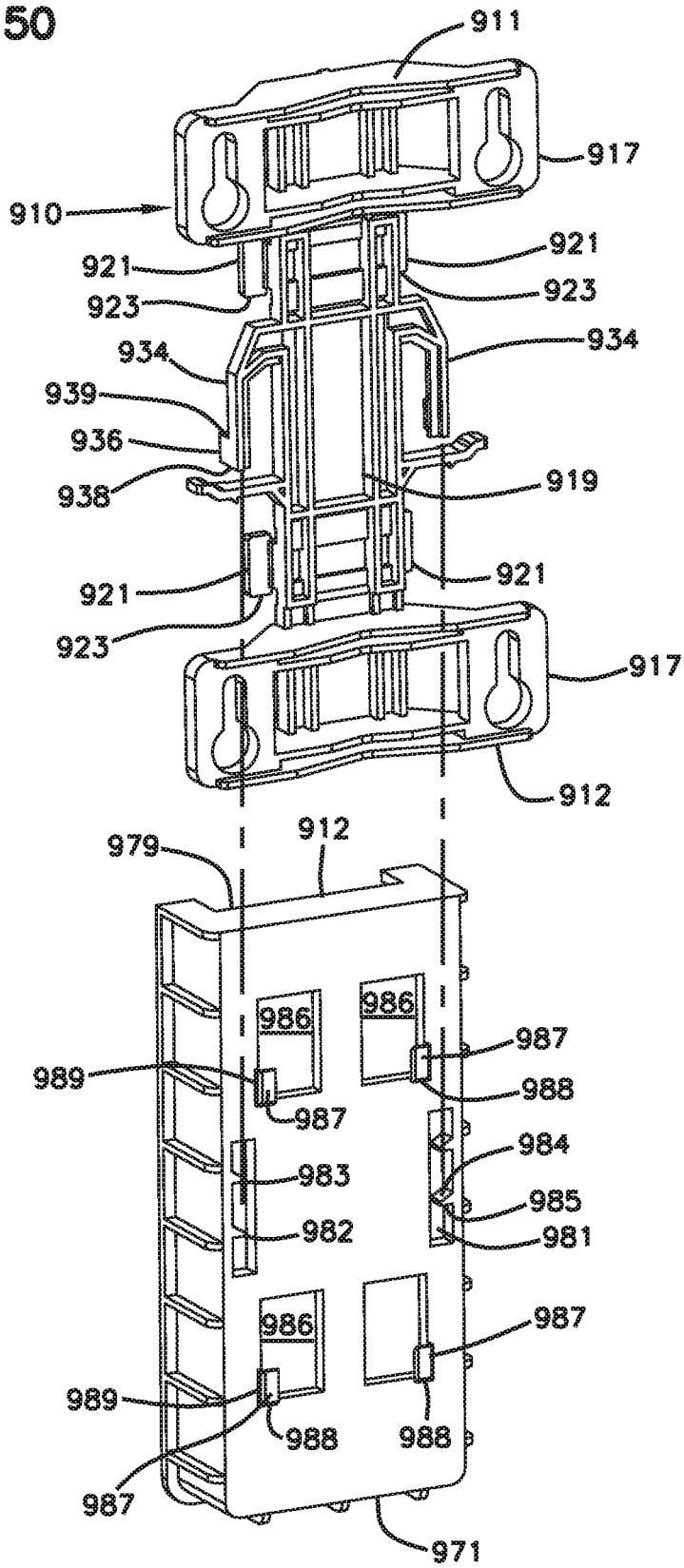
FIG. 50 shows the enclosure sliding onto the mounting bracket of FIG. 46 in a second direction and while in a second orientation.

In FIG. 47, the enclosure 970 is disposed in a first orientation to mount to the mounting bracket along the first direction R3. In FIG. 50, the enclosure 970 is disposed in a second orientation to mount to the mounting bracket along the second direction R4. The enclosure 970 is rotated 180 degrees between the first and second orientations. A cable port 979 defined by the enclosure 970 at the second end 972 faces downwardly in the first orientation (FIG. 47) and faces upwardly in the second orientation (FIG. 50).

Figure 46:
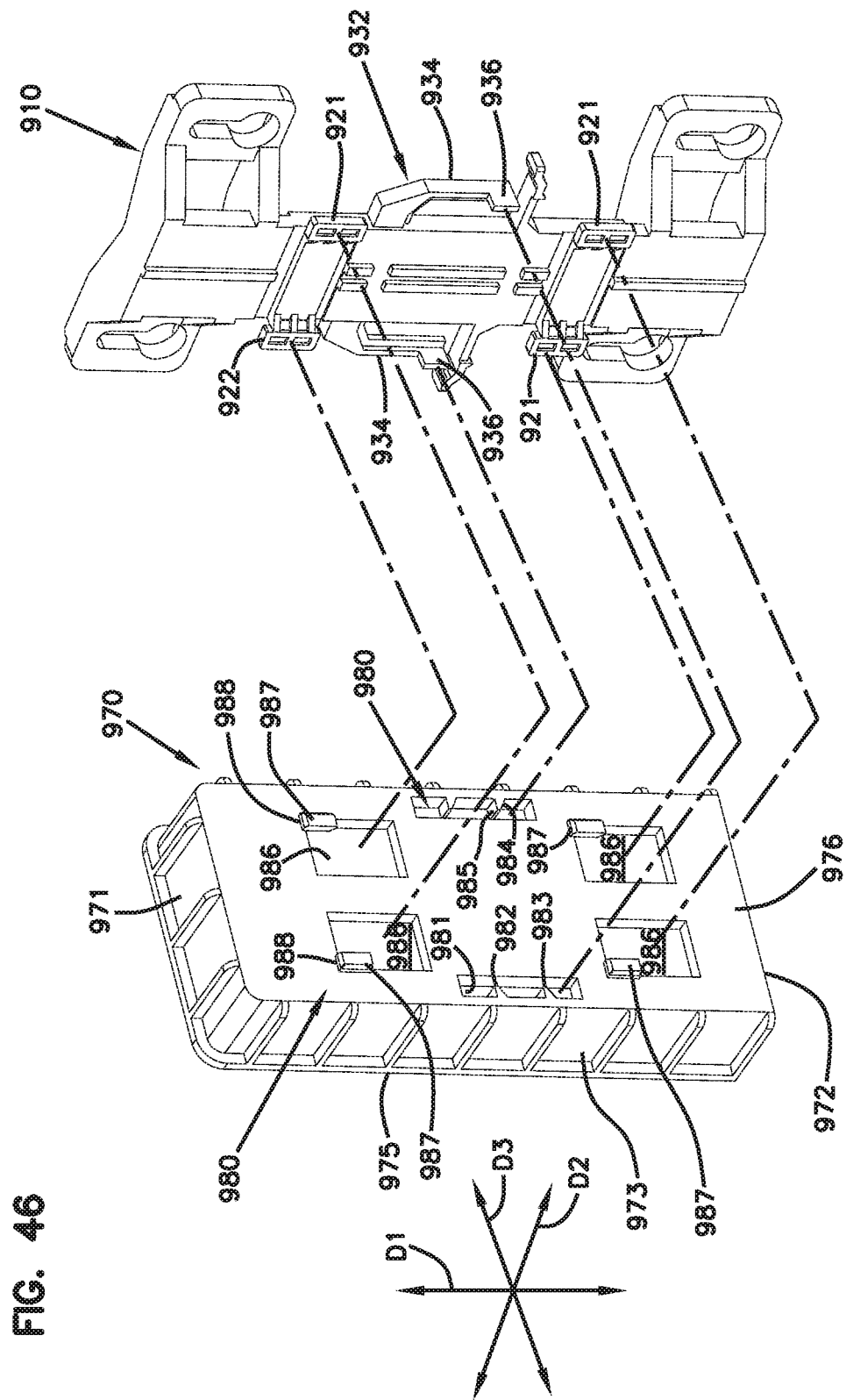
FIG. 46 shows a second type of enclosure exploded outwardly from the mounting bracket of FIG. 42 so that second parts of the slide interface and snap fit interface of a second mechanical coupling interface are visible on the enclosure.

As shown in FIG. 46, the rear 976 of the enclosure 970 defines the mechanical interface 980. The mechanical interface 980 includes a rail arrangement to retain the tab(s) 921 of the mounting bracket 910. Each rail 987 has an overhang portion, a first cap defining a first internal shoulder 988 that is transverse to the overhang portion, and a second cap defining a second internal shoulder 989 (see FIG. 50) that is transverse to the overhang portion. The second internal shoulder 989 is transverse to the first internal shoulder 988. The overhang portion of each rail 987 extends partially over a recessed surface 986. The recessed surface 986 is sufficiently recessed to accommodate the tab 921 between the recessed surface 986 and the overhang portion of the rail 987. In certain examples, each rail 987 may be disposed at a corner of a pocket defining the recessed surface 986. In other examples, the overhang portion of each rail 987 protrudes out from the rear 976 of the enclosure 970 sufficient to accommodate the tab 921.

In certain examples, the mechanical interface 980 has the same number of rails 987 as the second mechanical interface 930 of the mounting bracket 910 has tabs 921. In such examples, the rails 987 are positioned to each receive a corresponding tab 921 of the mounting bracket 910 when the enclosure 970 is mounted to the mounting bracket 910. In certain examples, the rail arrangement includes a first set of rails 987 spaced along the length of the enclosure 970 from a second set of rails 987. Each set of rails includes a first rail 987 having a first orientation and a second rail 987 having a second orientation. The first internal shoulders 988 of the rails 987 face in a common direction (e.g., towards the first end 971 of the enclosure 970) regardless of the orientation of the rails 987. The second internal shoulders 989 of the rails 987 in the first orientation are opposite the second internal shoulders 989 of the rails 987 in the second orientation.

When the enclosure 970 is mounted to the mounting bracket 910 along the second slide axis S2 along one direction R3, R4, each tab 921 of the mounting bracket 910 slides in the first dimension D1 beneath the overhang portion of the corresponding rail 987 until a shoulder 922, 923 (depending on orientation of the enclosure) of each tab 921 engages the first internal shoulder 988 of the corresponding rail 987. Accordingly, abutment between the shoulder 922, 923 of the tab 921 and the first internal shoulder 988 of the rail 987 inhibits continued movement of the enclosure 970 along the first dimension in the one direction R3, R4. However, the rail 987 does not inhibit movement of the enclosure 970 in the opposite direction R4, R3 along the first dimension D1.

The engagement surface 924 of each tab 921 abuts the overhang portion of the corresponding rail 987. Accordingly, abutment between the engagement surface 924 of the tabs 921 and the overhang portions of the rails 987 inhibits movement of the enclosure 970 relative to the mounting bracket 910 along the second dimension D2. An outer edge of each tab 921 engages or at least faces the second internal shoulder 989 of the corresponding rail 987. Accordingly, abutment between the outer edges of the tabs 921 and the second internal shoulders 989 of the rails 987 inhibits movement of the enclosure 970 relative to the mounting bracket 910 along the third dimension D3. Accordingly, the rails 987 define the second part of the slide interface of the mechanical coupling interface.

The mechanical interface 980 also includes the second part of the snap-fit interface of the mechanical coupling interface. The second part of the snap-fit interface includes a catch arrangement that engages the latch member(s) 936 of the resilient latch arrangement 932. The catch arrangement includes one or more catches each defining a shoulder 985 facing towards the first end 971 of the enclosure 970 and a ramped surface 984 facing towards the second end 972 of the enclosure 970. In certain examples, the catch arrangement includes a first set of catches at a first side 973 of the rear 976 of the enclosure 970 and a second set of catches at a second side 974 of the rear 976 of the enclosure 970. Each of the first and second sets includes a first catch 982 and a second catch 983. Each of the first and second catches 982, 983 defines a corresponding shoulder 985 and ramped surface 984. In some examples, the catches 982, 983 are disposed within recessed surfaces 981. In other examples, the catches 982, 983 may protrude rearwardly from the rear 976 of the enclosure 970.

Figure 48:
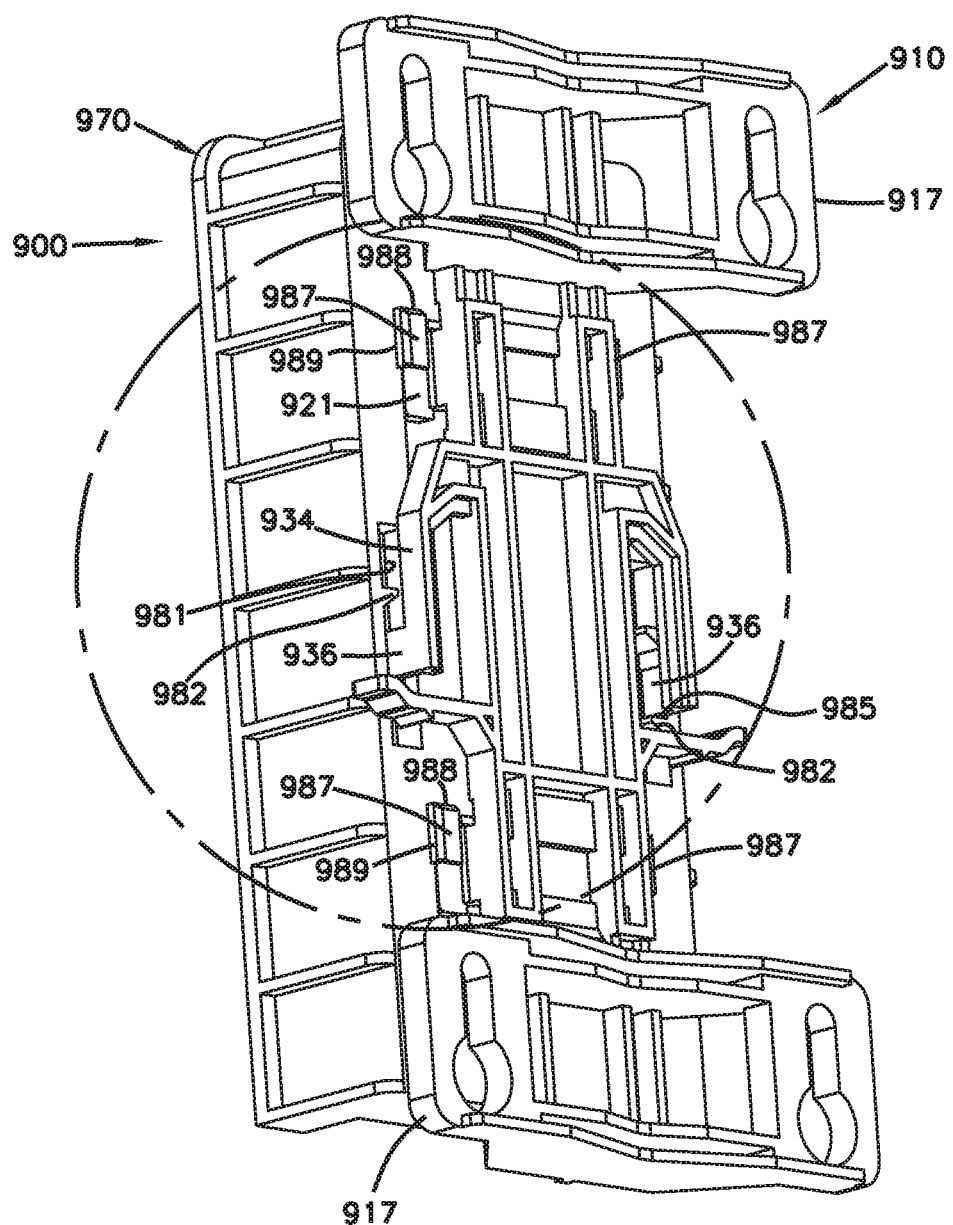
FIG. 48 shows the enclosure and mounting bracket of FIG. 47 in a latched configuration.
Figure 49:
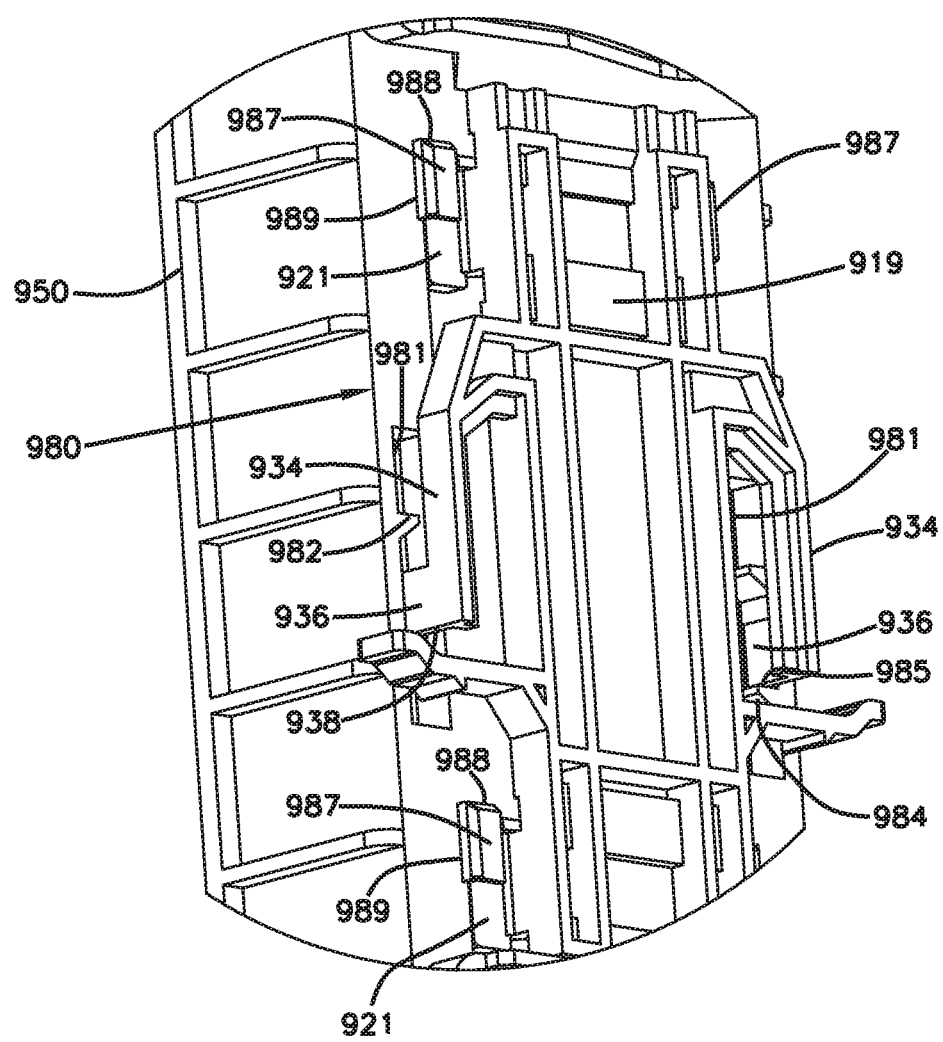
FIG. 49 is an enlarged view of the FIG. 48.

With reference to FIGS. 47-49, when the telecommunications enclosure 970 is slid onto the mounting bracket 910 along the first dimension D1 in the first direction R3, the latch member 936 of each latch arm 934 of the mounting bracket 910 slides over the ramped surface 984 of a corresponding second catch 983. A first shoulder 938 of each latch member 936 abuts the shoulder 985 of the respective second catch 983 to inhibit movement of the telecommunications enclosure 970 relative to the mounting bracket 910 in the second direction R4 (see FIG. 49). This configuration of the telecommunications enclosure 970 and the mounting bracket 910 is referred to as the latched configuration.

As noted above, abutment between the shoulders 922 of the tabs 921 and the first internal shoulders 988 of the rails 987 inhibits continued movement of the enclosure 970 along the first dimension in the first direction R3 (see FIG. 49). Accordingly, the snap-fit interface inhibits movement of the enclosure 970 relative to the mounting bracket 910 along the first dimension D1 when transitioned into the latched configuration.

Figure 51:
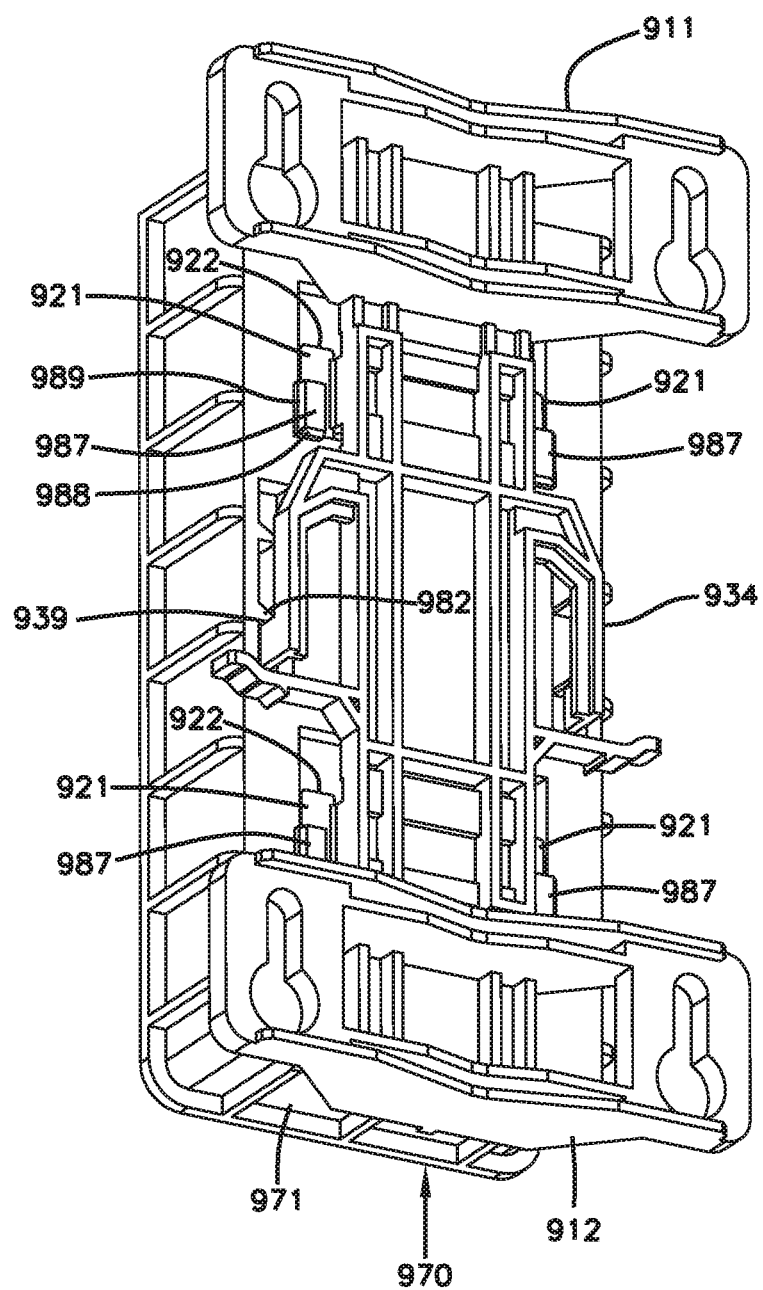
FIG. 51 shows the enclosure and mounting bracket of FIG. 50 in a latched configuration.

With reference to FIGS. 50-51, when the telecommunications enclosure 970 is slid onto the mounting bracket 910 along the first dimension D1 in the second direction R4, the enclosure 970 is first flipped to the second orientation. For example, in the first orientation, the first end 971 of the enclosure 970 is positioned closer to the first end 911 of the mounting bracket and the second end 972 of the enclosure is positioned closer to the second end 912 of the mounting bracket 910 when the enclosure 970 is mounted to the mounting bracket 910; and in the second orientation, the first end 971 of the enclosure 970 is positioned closer to the second end 912 of the mounting bracket and the second end 972 of the enclosure is positioned closer to the first end 911 of the mounting bracket 910 when the enclosure 970 is mounted to the mounting bracket 910.

The latch member 936 of each latch arm 934 of the mounting bracket 910 first slides over the ramped surface 984 of a corresponding second catch 983. However, the tabs 921 of the mounting bracket 910 are still spaced from the rails 987 of the enclosure 970 in this position. Accordingly, the telecommunications enclosure 970 continues to slide along the first dimension D1 in the second direction R4 until the tabs 921 engage the first internal shoulders 988 of the rails 987. Each latch member 936 also slides over the ramped surface 984 of the first catch 982 (see FIG. 51).

A second shoulder 939 of each latch member 936 abuts the shoulder 985 of the first catch 982 to inhibit movement of the telecommunications enclosure 970 relative to the mounting bracket 910 in the first direction R3 (see FIG. 51). This configuration of the enclosure 970 and the mounting bracket 910 is referred to as the latched configuration. As noted above, abutment between the shoulders 923 of the tabs 921 and the first internal shoulders 988 of the rails 987 inhibits continued movement of the enclosure 970 along the first dimension in the second direction R4 (see FIG. 51). Accordingly, the snap-fit interface inhibits movement of the enclosure 970 relative to the mounting bracket 910 along the first dimension D1 when transitioned into the latched configuration.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A fiber optic system comprising:
   a mounting bracket having a length and a width, the length being larger than the width, the mounting bracket having a first mechanical interface including a first part of a slide interface and a first part of a snap-fit interface; and
   a telecommunications enclosure having a second mechanical interface detachably mountable to the first mechanical interface, the second mechanical interface including a second part of the slide interface and a second part of the snap-fit interface;
   wherein the first and second mechanical interfaces enable the telecommunications enclosure to mount to the mounting bracket selectively in a first orientation relative to the mounting bracket and in a second orientation relative to the mounting bracket;
   wherein the first and second mechanical interfaces are configured to detachably mount together when the second mechanical interface slides relative to the first mechanical interface along a slide axis that extends parallel with the width of the mounting bracket; and
   wherein the first and second mechanical interfaces are configured to enable the telecommunications enclosure to detachably mount to the mounting bracket in the first orientation by sliding the telecommunications enclosure relative to the mounting bracket selectively in a first direction along the slide axis or in a second direction along the slide axis, the second direction being opposite the first direction.

2. The fiber optic system of claim 1, wherein the second orientation is flipped 180° from the first orientation.

3. The fiber optic system of claim 1, wherein the telecommunications enclosure defines a cable port, wherein the cable port faces downwardly when the telecommunications enclosure is mounted to the mounting bracket in the first orientation and wherein the cable port faces upwardly when the telecommunications enclosure is mounted to the mounting bracket in the second orientation.

4. The fiber optic system of claim 1, wherein the telecommunications enclosure defines a cable port, wherein the cable port faces transverse to the ground in a first direction when the telecommunications enclosure is mounted to the mounting bracket in the first orientation and wherein the cable port faces transverse to the ground in an opposite second direction when the telecommunications enclosure is mounted to the mounting bracket in the second orientation.

5. The fiber optic system of claim 1, wherein the mounting bracket is mounted to a surface in an orientation such that the slide axis extends vertically.

6. The fiber optic system of claim 1, wherein the mounting bracket is mounted to a surface in an orientation such that the slide axis extends horizontally.

7. The fiber optic system of claim 1, wherein the first and second mechanical interfaces are configured to enable the telecommunications enclosure to detachably mount to the mounting bracket in the second orientation by sliding the telecommunications enclosure relative to the mounting bracket selectively in the first direction along the slide axis or in the second direction along the slide axis.

8. A fiber optic system comprising:
   a mounting bracket having a length and a width, the length being larger than the width, the mounting bracket having a first mechanical interface including a first part of a slide interface and a first part of a snap-fit interface; and
   a telecommunications enclosure having a second mechanical interface detachably mountable to the first mechanical interface, the second mechanical interface including a second part of the slide interface and a second part of the snap-fit interface;
   wherein the first and second mechanical interfaces enable the telecommunications enclosure to mount to the mounting bracket selectively in a first orientation relative to the mounting bracket and in a second orientation relative to the mounting bracket;
   wherein the first and second mechanical interfaces are configured to detachably mount together when the second mechanical interface slides relative to the first mechanical interface along a slide axis that extends parallel with the length of the mounting bracket; and
   wherein the telecommunications enclosure slides in a first direction along the slide axis to detachably mount to the mounting bracket in the first orientation and the telecommunications enclosure slides in a second direction along the slide axis to detachably mount to the mounting bracket in the second orientation, the second direction being opposite the first direction.

9. The fiber optic system of claim 8, wherein the first and second mechanical interfaces are configured to enable the telecommunications enclosure to detachably mount to the mounting bracket in the second orientation by sliding the telecommunications enclosure relative to the mounting bracket selectively in the first direction along the slide axis or in the second direction along the slide axis.

* * * * *